United States Patent
Fanous et al.

(10) Patent No.: US 10,629,894 B2
(45) Date of Patent: *Apr. 21, 2020

(54) CATHODE MATERIAL FOR A LITHIUM-SULPHUR CELL

(71) Applicant: Robert Bosch GmbH, Stuttgart (DE)

(72) Inventors: Jean Fanous, Pfullingen (DE); Bernd Schumann, Rutesheim (DE); Joerg Thielen, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 303 days.

This patent is subject to a terminal disclaimer.

(21) Appl. No.: 15/315,764

(22) PCT Filed: Jun. 5, 2015

(86) PCT No.: PCT/EP2015/062606
§ 371 (c)(1),
(2) Date: Feb. 2, 2017

(87) PCT Pub. No.: WO2015/185740
PCT Pub. Date: Dec. 10, 2015

(65) Prior Publication Data
US 2017/0207448 A1     Jul. 20, 2017

(30) Foreign Application Priority Data

Jun. 6, 2014 (DE) .......... 10 2014 210 917
Oct. 24, 2014 (DE) .......... 10 2014 221 731
Oct. 24, 2014 (DE) .......... 10 2014 221 736
Oct. 24, 2014 (DE) .......... 10 2014 221 737

(51) Int. Cl.
*H01M 4/136* (2010.01)
*H01M 4/137* (2010.01)
(Continued)

(52) U.S. Cl.
CPC .......... *H01M 4/136* (2013.01); *H01M 4/137* (2013.01); *H01M 4/362* (2013.01); *H01M 4/364* (2013.01);
(Continued)

(58) Field of Classification Search
None
See application file for complete search history.

(56) References Cited

U.S. PATENT DOCUMENTS 6,620,546 B1 * 9/2003 Michot ................. C07C 211/63
252/62.2
2011/0053002 A1 * 3/2011 Yamamura ........... C01G 33/006
429/322

(Continued)

FOREIGN PATENT DOCUMENTS

WO     9928292 A1    6/1999
WO    2011023110 A1    3/2011
(Continued)

OTHER PUBLICATIONS

International Search Report dated Sep. 10, 2015 in underlying patent application PCT/EP2015/62606.

*Primary Examiner* — Sin J Lee
(74) *Attorney, Agent, or Firm* — Norton Rose Fulbright US LLP; Gerard Messina

(57) ABSTRACT

A cathode material for an electrochemical cell, in particular a lithium-sulfur cell, including at least one cathode active material and at least one in particular lithium ion-conducting or lithium ion-conductive polymer electrolyte and/or at least one inorganic ion conductor, in particular a lithium ion conductor. The at least one cathode active material includes a polymer containing in particular covalently bound sulfur. Moreover, also described is a cell and a battery equipped with same.

3 Claims, 2 Drawing Sheets

(51) Int. Cl.
  *H01M 4/36*     (2006.01)
  *H01M 4/58*     (2010.01)
  *H01M 4/62*     (2006.01)
  *H01M 4/60*     (2006.01)
  *H01M 10/052*   (2010.01)
  *H01M 4/02*     (2006.01)
  *H01M 10/0525*  (2010.01)
  *H01M 10/0565*  (2010.01)

(52) U.S. Cl.
  CPC ......... *H01M 4/5815* (2013.01); *H01M 4/602* (2013.01); *H01M 4/62* (2013.01); *H01M 4/622* (2013.01); *H01M 10/052* (2013.01); *H01M 10/0525* (2013.01); *H01M 10/0565* (2013.01); *H01M 2004/028* (2013.01)

(56) References Cited

U.S. PATENT DOCUMENTS

2014/0322614 A1* 10/2014 Eitouni ................. H01M 4/624
                                                  429/309
2016/0268629 A1*  9/2016 Tanaka .............. H01M 10/0562

FOREIGN PATENT DOCUMENTS

WO    2012064702 A2    5/2012
WO    2015160381 A1   10/2015

* cited by examiner

CATHODE MATERIAL FOR A LITHIUM-SULPHUR CELL

FIELD OF THE INVENTION

The present invention relates to cathode materials for alkali metal-sulfur cells, in particular for lithium-sulfur cells, and corresponding cells and batteries.

BACKGROUND INFORMATION

Lithium-ion batteries, also referred to as lithium-ion accumulators, are used nowadays in a variety of products as energy stores. Lithium-sulfur battery technology is being researched in order to manufacture batteries having a higher energy density.

Conventional lithium-sulfur cells contain elemental sulfur, and in particular contain ether-based electrolyte solvents to ensure solubility of the sulfur.

SUMMARY OF THE INVENTION

The subject matter of the present invention relates to a cathode material for an electrochemical cell, for example for an alkali metal cell, for example a lithium cell and/or a sodium cell, in particular a lithium cell, for example for an alkali metal-sulfur cell, for example a lithium-sulfur cell and/or a sodium-sulfur cell, in particular a lithium-sulfur cell, which includes at least one in particular sulfur-containing cathode active material and at least one in particular lithium ion-conducting or lithium ion-conductive polymer electrolyte, and/or at least one inorganic ion conductor, in particular a lithium ion conductor.

Due to the at least one polymer electrolyte and/or the at least one inorganic ion conductor, the ion conductivity and ionic bonding, and thus the ionic contacting of the cathode active material, may advantageously be improved. As a result, increased ion conduction for the ion of the alkali metal, in particular increased lithium ion conduction, in the cathode, i.e., the positive electrode of the cell, may in turn advantageously be achieved, which allows the cathode material to be advantageously used in a high-current cell or a high-current battery. In addition, in this type of cell or battery, introduction of liquid electrolytes into the cathode may be dispensed with, and in particular the cell may be provided as a solid state cell.

An alkali metal cell may be understood in particular to mean an electrochemical cell, for example a battery cell or accumulator cell, in whose electrochemical reaction alkali ions, for example lithium ions, for example in the case of a lithium cell, or sodium ions, for example in the case of a sodium cell, take part. For example, an alkali metal cell may be a lithium cell and/or a sodium cell.

An alkali metal-sulfur cell may be understood in particular to mean an electrochemical cell, for example a battery cell or accumulator cell, in whose electrochemical reaction alkali ions, for example lithium ions, for example in the case of a lithium cell, or sodium ions, for example in the case of a sodium cell, and sulfur take part. For example, an alkali metal-sulfur cell may be a lithium-sulfur cell and/or a sodium-sulfur cell.

A polymer electrolyte may be understood in particular to mean an ion-conductive or ion-conducting, for example lithium ion-conductive or lithium ion-conducting, polymer. For example, a lithium ion-conductive or lithium ion-conducting, for example lithium ion-conductive or lithium ion-conducting, polymer may also be referred to as a polymer electrolyte. An ion-conductive, for example lithium ion-conductive, electrolyte may be understood in particular to mean an electrolyte which itself may be free of the ions to be conducted, for example lithium ions, but which is designed for coordinating counterions of the ions to be conducted, for example lithium conducting salt anions, or for coordinating and/or solvating the ions to be conducted themselves, for example lithium ions, and to make them ion-conducting, for example lithium ion-conducting, for example by adding the ions to be conducted, for example lithium ions. When used in a cathode material, a polymer electrolyte in particular may also be referred to as a cathode electrolyte or catholyte. For example, the polymer electrolyte may be lithium ion-conductive or lithium ion-conducting and/or sodium ion-conductive or sodium ion-conducting, in particular lithium ion-conductive or lithium ion-conducting. An ion-conducting, for example lithium ion-conducting, electrolyte or polymer may be understood in particular to mean an electrolyte or polymer that is intrinsically ion-conducting, for example lithium ion-conducting, and/or that contains lithium ions. An ion-conductive, for example lithium ion-conductive, electrolyte or polymer may be understood in particular to mean an electrolyte or polymer which itself may be free of the ions to be conducted, for example lithium ions, but which is designed for coordinating and/or solvating the ions to be conducted, for example lithium ions, or for coordinating counterions of the ions to be conducted, for example lithium conducting salt anions, and to make them ion-conducting, for example lithium ion-conducting, for example by adding the ions to be conducted, for example lithium ions.

The at least one cathode active material may in particular contain sulfur. For example, the at least one cathode active material may include, for example contain or be formed from, a sulfur-composite and/or elemental sulfur and/or a sulfur compound.

For example, the at least one cathode active material may include or be a sulfur-carbon composite. A sulfur-carbon composite may in particular be understood to mean a composite which includes sulfur and carbon. In particular, for the sulfur-carbon composite, sulfur may be bound, for example covalently and/or ionically, in particular covalently, to carbon and/or embedded therein. Improved electrical and/or ionic contacting of the sulfur, for example compared to simple mixtures, may advantageously be achieved by bonding or embedding the sulfur, which is neither ionically nor electrically conductive, to or in the carbon of the composite. In addition, (poly)sulfides $S_x^{2-}$ which occur during discharge (reduction) of a cell may be better retained in the cathode, and the sulfur utilization and cycle stability may advantageously be improved in this way. For example, the at least one cathode active material may include a sulfur-carbon composite, for example, in which sulfur is covalently bound, in particular to carbon.

In particular, the at least one cathode active material may [include] a sulfur-polymer composite and/or carbon modification composite. A sulfur-polymer composite may be understood in particular to mean a composite which includes sulfur and at least one polymer or is formed therefrom. A sulfur-carbon modification composite may be understood in particular to mean a composite which includes sulfur and a carbon modification, i.e., elemental carbon or carbon with an oxidation number of zero, for example carbon nanotubes and/or hollow carbon spheres and/or graphene and/or graphite and/or carbon black. The at least one cathode active material may optionally be a sulfur-polymer composite and/or carbon modification composite.

For example, the at least one cathode active material may include a sulfur-polymer composite. For example, the sulfur-polymer composite, in particular in addition to sulfur, may include or be formed from (at least) one, in particular electrically conductive, polymer, for example polyacrylonitrile, in particular cyclized polyacrylonitrile (cPAN), and/or polypyrrole and/or polythiophene and/or polyphenylene, for example, in particular cyclized polyacrylonitrile and/or polyparaphenylene. In particular, sulfur may be bound, for example covalently and/or ionically, in particular covalently, to the in particular electrically conductive polymer and/or embedded in its matrix. Cyclized polyacrylonitrile (cPAN) may in particular have a structure made up of mutually connected, in particular anellated, rings, in particular six-membered rings, and/or a repeating unit which contains three carbon atoms and one nitrogen atom, for example in which adjacent rings contain at least two shared carbon atoms. Improved binding and/or in particular finely distributed embedding of the sulfur as well as improved mechanical properties compared to sulfur-carbon modification composites may advantageously be achieved using sulfur-polymer composites, as the result of which the electrical and/or ionic contacting in addition to sulfur utilization, and thus the energy density, may be further improved.

For example, the at least one cathode active material or the sulfur-polymer composite may include or be a polymer containing sulfur which, for example, is partially or completely bound, for example covalently and/or ionically, in particular covalently.

Within the scope of one specific embodiment, the at least one cathode active material includes a polymer containing in particular covalently bound sulfur. Due to the binding of the sulfur, which is neither ionically nor electrically conductive per se, to the polymer of the composite, polysulfide formation may advantageously be suppressed, and in particular improved electrical and/or ionic contacting of the sulfur, for example compared to simple mixtures, may also be achieved, and sulfur may be even better retained in the cathode, and the sulfur utilization, cycle stability, and energy density may advantageously be improved in this way. For example, the polymer may be electrically conductive or conducting. For example, the at least one cathode active material may include or be a polymer, in particular based on polyacrylonitrile (PAN), in particular cyclized polyacrylonitrile (cPAN), and/or polypyrrole and/or polythiophene and/or polyphenylene, for example, in particular based on polyacrylonitrile (PAN), with in particular covalently bound sulfur, or a sulfur-polyacrylonitrile composite, in particular SPAN. The sulfur-polymer composite may in particular be a sulfur-polyacrylonitrile composite, for example SPAN. In particular, the polymer in the charged state of the cell may include covalently bound sulfur. Alkali metal ions ($Li^+$), for example lithium ions and/or sodium ions, in particular lithium ions, may be bound, in particular ionically, to the sulfur by partial reduction of the sulfur that is bound, in particular covalently, to the polymer, and/or during discharge. During discharge, the covalent bond of the sulfur to the polymer may in particular be at least partially broken.

Within the scope of one embodiment, the polymer is prepared with in particular covalently bound sulfur by sulfidation of a polymer, for example polyacrylonitrile and/or polypyrrole and/or polythiophene and/or polyphenylene, in particular polyacrylonitrile. Sulfidation may be understood in particular to mean a chemical reaction of a sulfur-containing compound, for example elemental sulfur and/or a sulfur-containing compound, with an organic compound, for example a polymer. In particular, a covalent bond between sulfur and the organic compound, for example the polymer, may be formed by sulfidation. For example, the polymer may include, or be, cyclized and for example dehydrogenated polyacrylonitrile, for example SPAN, which is sulfidized with in particular covalently bound sulfur. Sulfidized, cyclized, and for example dehydrogenated polyacrylonitrile, for example SPAN, may in particular have a structure made up of interconnected, in particular anellated, rings, in particular six-membered rings, and/or a repeating unit which contains three carbon atoms and one nitrogen atom, for example in which adjacent rings contain at least two shared carbon atoms.

Within the scope of one particular embodiment, the at least one cathode active material includes polyacrylonitrile containing sulfur which, for example, is partially or completely, in particular completely, for example covalently and/or ionically, in particular covalently, bound, for example SPAN. The sulfur-polymer composite may in particular be a sulfur-polyacrylonitrile composite, for example SPAN. SPAN may be understood in particular to mean a composite or polymer that is based in particular on polyacrylonitrile (PAN), in particular cyclized polyacrylonitrile (cPAN), containing sulfur which is bound, in particular covalently, and which is obtainable in particular by a thermal conversion and/or chemical reaction of polyacrylonitrile in the presence of sulfur. In particular, nitrile groups may react to form a polymer, in particular having a conjugated π system, in which the nitrile groups are converted into linked nitrogen-containing rings, in particular six-membered rings, in particular containing covalently bound sulfur. For example, SPAN may be prepared by heating polyacrylonitrile (PAN) with an excess of elemental sulfur, in particular to a temperature of ≥300° C., for example approximately ≥300° C. to ≤600° C. In particular, the sulfur may on the one hand cyclize the polyacrylonitrile (PAN) to form hydrogen sulfide ($H_2S$), and on the other hand, forming a covalent S—C bond, for example, may be bound in the cyclized matrix in a finely divided manner, for example a cyclized polyacrylonitrile structure with covalent sulfur chains. SPAN is described in Chem. Mater., 2011, 23, 5024, J. Mater. Chem., 2012, 22, 23240, J. Electrochem. Soc., 2013, 160 (8), A1169-A1170, and in the publication WO 2013/182360 A1.

Alternatively or additionally, for this purpose the at least one cathode active material may include a sulfur-carbon modification composite which, in particular in addition to sulfur, includes or is formed from (at least) one carbon modification, for example carbon tubes, for example carbon nanotubes, and/or hollow carbon spheres and/or graphene and/or graphite and/or carbon black, for example in the form of carbon particles and/or carbon fibers. In particular, sulfur may be embedded in the matrix of the carbon modification, for example in the carbon tubes and/or hollow carbon spheres. Improved electrical and/or ionic contacting, for example compared to simple mixtures, as well as improved sulfur utilization may thus advantageously be achieved. The carbon modification may optionally be surface-modified, in particular with a polysulfide-affinic compound, for example with titanium carbide and/or polyethylene glycol and/or polyethylene oxide and/or a polymer electrolyte described below. It is thus advantageously possible to also counteract outward diffusion of polysulfides and to better retain polysulfides in the cathode matrix.

Alternatively or additionally, the at least one cathode active material may include a sulfur-metal compound composite which, in particular in addition to sulfur, includes or is formed from at least one in particular electrically conducting metal compound, for example at least one in particular electrically conducting metal oxide, for example an oxide of tin and/or indium and/or tantalum and/or niobium, for example tin-doped indium oxide and/or tin oxide doped with tantalum, niobium, and/or fluorine, and/or at least one in particular electrically conducting metal carbide, for example titanium carbide, for example in the form of wires and/or fibers and/or a mesh. For example, sulfur may be embedded in the matrix of the metal compound, for example in and/or between fibers and/or wires and/or the mesh. Improved electrical and/or ionic contacting, for example compared to simple mixtures, as well as improved sulfur utilization may thus advantageously be achieved.

Alternatively or additionally, the at least one cathode active material, in particular in the charged state, may include at least one metal sulfide, in particular a transition metal sulfide. A sulfide may be understood to mean, for example, a chemical compound that contains negatively charged sulfur, in particular at least one sulfide anion ($S^{2-}$) and/or disulfide anion ($S_2^{2-}$) and/or polysulfide anion. If the at least one metal sulfide is used as the sole cathode active material, the at least one metal sulfide may include in particular electrochemically active sulfur, in particular which is electrochemically active within the scope of the electrochemical reaction of the cell for which the cathode material is designed, for example at least one disulfide anion ($S_2^{2-}$) and/or at least one polysulfide anion and/or a hyperstoichiometric sulfur portion, for example sulfur which is not directly connected to metal and/or unbound sulfur and/or uncharged sulfur and/or sulfur having an oxidation number of zero, for example sulfur incorporated into the crystal structure thereof.

Within the scope of another specific embodiment, the at least one cathode active material, for example the sulfur-carbon composite, for example the sulfur-polymer composite, in particular the polymer containing in particular covalently bound sulfur, is homogeneously blended with the at least one polymer electrolyte and/or the at least one inorganic ion conductor and/or mixed at the molecular level, for example. In particular, the polymer containing in particular covalently bound sulfur may be homogeneously blended and/or mixed at the molecular level, for example, with the at least one polymer electrolyte. For example, the at least one cathode active material, for example the sulfur-carbon composite, for example the sulfur-polymer composite, in particular the polymer containing in particular covalently bound sulfur, and the at least one polymer electrolyte and/or the at least one inorganic ion conductor may be present uniformly distributed. In this way, it is possible to advantageously achieve homogeneous blending or intermixing of the electrochemical phase which is formed by the sulfur-containing polymer, and the ion-conducting phase which is formed by the at least one polymer electrolyte and/or at least one inorganic ion conductor, and which, for example, conducts only the alkali ions that take part in the electrochemical reaction, in particular lithium ions, and thus to further improve the ionic bonding of the electrochemically active phase.

A mixture at the molecular level or a molecular mixture may be understood in particular to mean that one or a few polymer strands of the at least one polymer electrolyte is/are situated between polymer strands of the polymer containing in particular covalently bound sulfur (see FIGS. 1a through 1c). For example, the ratio of the number of polymer strands of the polymer containing in particular covalently bound sulfur to the number of polymer strands may be greater than or equal to 2:1, for example 2:1 to 3:1.

Within the scope of another specific embodiment, the cathode material includes particles which include, in particular contain or are formed from, the at least one cathode active material and the at least one polymer electrolyte and/or the at least one inorganic ion conductor, in particular lithium ion conductor. For example, the cathode material may include particles which include, in particular contain or are formed from, the sulfur-carbon composite, for example sulfur-polymer composite, and the at least one polymer electrolyte and/or the at least one inorganic ion conductor, in particular lithium ion conductor. In particular, the cathode material may include particles which include, in particular contain or are formed from, the polymer containing in particular covalently bound sulfur, for example SPAN, and the at least one polymer electrolyte and/or the at least one inorganic ion conductor, in particular lithium ion conductor.

Within the scope of another specific embodiment, the at least one cathode active material, for example the sulfur-carbon composite, for example the sulfur-polymer composite, in particular the polymer containing in particular covalently bound sulfur, together with the at least one polymer electrolyte and/or the at least one inorganic ion conductor is homogeneously blended and/or mixed at the molecular level, for example, into the particles. For example, the at least one cathode active material, for example the sulfur-carbon composite, for example the sulfur-polymer composite, in particular the polymer containing in particular covalently bound sulfur, and the at least one polymer electrolyte and/or the at least one inorganic ion conductor may be present in the particles uniformly distributed. Since the particles themselves are ion-conducting, the ion conduction may advantageously take place directly from particle to particle. The ionic contacting of the at least one cathode active material may thus advantageously be improved. In addition, the quantity of polymer electrolyte used as cathode material binder may advantageously be significantly reduced, or a polymer electrolyte used as cathode material binder may even be dispensed with.

Within the scope of another embodiment, the particles are therefore directly joined together, for example pressed, and/or the cathode material is free of polymer electrolyte used as cathode material binder.

However, within the scope of another embodiment, the particles are incorporated into at least one polymer electrolyte and/or inorganic ion conductor, in particular lithium ion conductor, used as cathode material binder. The at least one polymer electrolyte and/or inorganic ion conductor, in particular of the particles, and the at least one polymer electrolyte and/or inorganic ion conductor used as cathode material binder may be the same or different.

Within the scope of another specific embodiment, the at least one cathode active material, for example the sulfur-carbon composite, for example the sulfur-polymer composite, in particular the polymer containing in particular covalently bound sulfur, and the at least one polymer electrolyte and/or the at least one inorganic ion conductor form, for example at the molecular level, ion-conductive or ion-conducting, in particular lithium ion-conductive or lithium ion-conducting, channels and/or ion-conductive or ion-conducting, in particular lithium ion-conductive or lithium ion-conducting, planes. Due to a formation of, for example, molecular, ion-conductive or ion-conducting, in particular lithium ion-conductive or lithium ion-conducting, channels and/or planes, for example within the particles, the ionic bonding of the at least one cathode active material may advantageously be optimized, and for example the quantity of polymer electrolyte used as cathode material binder may be significantly reduced.

The ion-conductive or ion-conducting, in particular lithium ion-conductive or lithium ion-conducting, channels and/or planes may have an extent of, for example, at least several nanometers, in particular at least several hundred nanometers. Such extents may be achieved by simple polymers, for example homopolymers, for example polyethylene oxides, or also by copolymers, for example block copolymers.

The ion-conductive or ion-conducting, in particular lithium ion-conductive or lithium ion-conducting, channels and/or planes may extend in particular between the polymer containing in particular covalently bound sulfur and the at least one polymer electrolyte and/or the at least one inorganic ion conductor, and/or between polymer sections of the polymer containing in particular covalently bound sulfur.

Within the scope of another specific embodiment, the ion-conductive or ion-conducting, in particular lithium ion-conductive or lithium ion-conducting, channels and/or planes extend continuously through the particles and/or up to the outer surface of the particles. In this way, the ionic bonding of the cathode active material may advantageously be further improved, and, for example, high current-capable ion conduction may be achieved.

For example, the ion-conductive or ion-conducting, in particular lithium ion-conductive or lithium ion-conducting, channels and/or planes may include, for example contain and/or accommodate, the sulfur which is in particular covalently bound to the polymer, and/or sulfides formed therefrom, in particular during discharge, for example polysulfides ($S_x^{2-}$) and/or disulfides ($S_2^{2-}$) and/or monosulfides ($S^{2-}$), and/or alkali metal ions, for example lithium ions and/or sodium ions, in particular lithium ions, and/or anions, in particular of the at least one polymer electrolyte and/or of the at least one inorganic ion conductor, and/or optionally of at least one conducting salt.

Within the scope of another specific embodiment, the ion-conductive or ion-conducting, in particular lithium ion-conductive or lithium ion-conducting channels, extend along the polymer backbone of the polymer containing in particular covalently bound sulfur and/or of the at least one polymer electrolyte.

For example, the ion-conductive or ion-conducting, in particular lithium ion-conductive or lithium ion-conducting, channels and/or planes may be formed in a zone at a phase boundary between the polymer containing in particular covalently bound sulfur and the at least one polymer electrolyte and/or the at least one inorganic ion conductor, and/or in a zone between polymer sections of the polymer containing in particular covalently bound sulfur.

Within the scope of another specific embodiment, the ion-conductive or ion-conducting, in particular lithium ion-conductive or lithium ion-conducting, channels and/or planes are formed by polar areas of the polymer containing in particular covalently bound sulfur, in particular by the sulfur which is in particular covalently bound to the polymer, and polar areas of the at least one polymer electrolyte. The polar areas of the polymer containing in particular covalently bound sulfur may be formed in particular by the sulfur which is in particular covalently bound to the polymer and alkali metal ions ($Li^+$), for example lithium ions and/or sodium ions, in particular lithium ions, which, for example, are coordinated with and/or in particular ionically bound to same.

Within the scope of another specific embodiment, alkali metal ions, for example lithium ions and/or sodium ions, in particular lithium ions, are coordinated with and/or in particular ionically bound to a negatively charged group $Q^-$ and/or an uncharged group Q in the polar areas of the at least one polymer electrolyte. Negatively charged group $Q^-$ and/or uncharged group Q may in particular be covalently bound, optionally via a spacer, to a polymer backbone-forming unit, in particular a polymer backbone-forming unit -[A]-. In particular, the alkali metal ions, for example lithium ions and/or sodium ions, in particular lithium ions, may be bound, in particular ionically, to a negatively charged group $Q^-$. A large transfer number, for example of 1, may thus advantageously be achieved, and for example overvoltages, for example during discharging and/or charging, which may result from poor ion conductivity may be reduced or avoided.

The polymer backbone of the polymer containing in particular covalently bound sulfur, and the polymer backbone, for example polymer backbone-forming unit -[A]-, of the at least one polymer electrolyte may in particular form a structural plane. As a result of the polymer, which contains in particular covalently bound sulfur, already being able to provide mechanical stability, the at least one polymer electrolyte may advantageously be easily designed, for example solely with ion-conductive or ion-conducting, in particular lithium ion-conductive and/or lithium ion-conducting, repeating units and/or in the form of a homopolymer. However, for example to further improve the ion conduction, it is still possible in principle to design the at least one polymer electrolyte in the form of a copolymer, for example a block copolymer.

Within the scope of one embodiment, the at least one cathode active material, in particular the polymer containing in particular covalently bound sulfur, and the at least one polymer electrolyte and/or the at least one inorganic ion conductor form(s) a lamellar arrangement.

Within the scope of another specific embodiment, ion-conductive or ion-conducting, in particular lithium ion-conductive or lithium ion-conducting, lamellar domains are formed by the sulfur which is in particular covalently bound to the polymer, or by polar areas of the polymer containing in particular covalently bound sulfur and polar areas of the at least one polymer electrolyte.

Within the scope of another specific embodiment, the polymer backbone of the polymer containing in particular covalently bound sulfur, and the polymer backbone, for example polymer backbone-forming unit -[A]-, of the at least one polymer electrolyte form a structural lamellar domain.

Within the scope of another specific embodiment, the ion-conductive or ion-conducting, for example lithium ion-conductive or lithium ion-conducting, lamellar domains are formed between structural lamellar domains. For example, the ion-conductive or ion-conducting, for example lithium ion-conductive or lithium ion-conducting, lamellar domains and the structural lamellar domains may be situated in alternation.

The polymer containing in particular covalently bound sulfur, and the at least one polymer electrolyte may be mixed at the molecular level, for example, within the ion-conductive or ion-conducting, for example lithium ion-conductive or lithium ion-conducting, planes, for example within the ion-conductive or ion-conducting, for example lithium ion-conductive or lithium ion-conducting, lamellar domains.

Within the scope of one embodiment, the polymer of the at least one cathode active material and the at least one polymer electrolyte and/or the at least one inorganic ion conductor, in particular the polymer containing in particular covalently bound sulfur and the at least one polymer electrolyte, form a biphase continuous network.

A biphase continuous network may be understood in particular to mean a network in which two phases, for example A and B, are formed, each of which completely permeates the network, in particular so that no isolated or severed areas of only one phase, for example A or B, are present.

Within the scope of another specific embodiment, the ratio of the repetition number of the repeating units of the polymer containing in particular covalently bound sulfur to the repetition number of the at least one polymer electrolyte is 1.5:1 to 6:1, for example 2:1 to 5:1, for example approximately 3:1. A high capacity with sufficient ion conduction may advantageously be achieved in this way.

Within the scope of another specific embodiment, the at least one cathode active material, in particular the polymer containing in particular covalently bound sulfur, based on the sum of the volume occupied by the at least one cathode active material, in particular the polymer containing in particular covalently bound sulfur, and the volume occupied by the at least one polymer electrolyte and/or the volume occupied by the at least one inorganic ion conductor, is greater than 50% by volume, for example ≥60% by volume, for example ≥70% by volume. A high capacity with sufficient ion conduction may likewise advantageously be achieved in this way.

Within the scope of one particular embodiment, the at least one polymer electrolyte is electrically conductive. The electrical bonding of the cathode active material may also advantageously be improved in this way.

The cathode material may be formed, for example, by layer deposition or molecular layer deposition and/or by Langmuir-Blodgett technology, for example in which the electrochemically active phase and the ion-conducting phase are formed one after the other, for example in alternation, and/or produced by a technology known from block copolymer synthesis processes, for example based on an in particular thermal phase separation technology using a solution or suspension, and/or by thermal treatment of a film and reaction of the film with the at least one cathode active material, and/or by self-organization, for example in the direction of a lamellar arrangement and/or a bicontinuous network, and/or by crystallization forces during deposition of at least two phases. By use of these technologies, materials may be advantageously produced down to a range of 20 nm to 500 nm by permeation and/or intermixture of two or more components.

Within the scope of another specific embodiment, the cathode material also includes at least one metal sulfide. The at least one metal sulfide may include or be, for example, at least one transition metal sulfide and/or at least one metal sulfide of at least one metal of the third, fourth, and/or fifth main group, in particular of the periodic table. The at least one metal sulfide may in particular be electrochemically active, in particular within the scope of the electrochemical reaction of the cell for which the cathode material is designed. The at least one metal sulfide may include in particular at least one metal, for example at least one transition metal and/or at least one metal of the third, fourth, and/or fifth main group. In particular, the at least one metal sulfide may contain at least one metal (Mt), for example transition metal and/or metal of the third, fourth, and/or fifth main group, which has a standard electrode potential (Mt$^0$/Mt$^{x+}$) that is more positive or higher, for example by ≥1 V, than the anode active material or alkali metal of the cell, for example lithium. For example, the at least one metal sulfide may contain at least one metal (Mt), for example at least one transition metal and/or at least one metal of the third, fourth, and/or fifth main group, which has a standard electrode potential (Mt$^0$/Mt$^{x+}$) of ≥−2 V in particular with respect to a standard hydrogen electrode (SHE). For example, niobium may have a standard electrode potential (Nb$^0$/Nb$^{3+}$) of −1.099 V, and thus a potential that is 1.9411 V more positive or higher than a lithium anode, compared to the standard electrode potential (Li$^0$/Li$^+$) of lithium of −3.0401 V with respect to a standard hydrogen electrode (SHE). Molybdenum, for example in the form of MoS$_3$ and/or MoS$_2$, may, for example, have a potential that is up to 2.804 V more positive than a lithium anode.

The at least one metal sulfide may include, for example, at least one sulfide anion (S$^{2-}$) and/or at least one disulfide anion (S$_2^{2-}$) and/or at least one higher sulfide and/or at least one polysulfide anion and/or a hyperstoichiometric sulfur portion, for example sulfur which is not directly connected to metal and/or unbound sulfur and/or uncharged sulfur and/or sulfur having an oxidation number of zero, for example sulfur incorporated into the crystal structure thereof.

The at least one metal sulfide may also be, for example, a semiconductor such as copper(II) sulfide (CuS).

During discharge of the cell, the at least one metal of the at least one metal sulfide may advantageously be reduced to the elemental or metallic form. In particular, in the charged state the at least one cathode active material may therefore include the at least one metal sulfide. In the discharged state, the at least one cathode active material may in particular include the at least one metal of the at least one metal sulfide in metallic form. Due to the reduction of the at least one metal sulfide to a subsulfide and/or at least one metal during the discharge, on the one hand the at least one metal of the at least one metal sulfide may advantageously contribute to the capacity of the cathode material and thus to the performance of the cell. On the other hand, the metallic form of the at least one metal of the at least one metal sulfide that is formed may contribute to improved electrical conductivity of the cathode material and thus to the performance of the cell. In the oxidized state of the at least one metal of the at least one metal sulfide, the at least one metal sulfide may optionally increase the electrical conductivity due to semiconducting properties.

Sulfur and sulfide anion/s (S$^{2-}$) and/or polysulfides possibly formed from same, which are released from the at least one metal sulfide, in particular during reduction of the at least one metal of the at least one metal sulfide, may react and/or combine with anode material ions or alkali metal ions, for example lithium ions, and form lithium sulfide (Li$_2$S), lithium disulfide, and/or lithium polysulfide/s, for example, so that only sulfides are formed and side reactions may be avoided.

In addition, the at least one metal sulfide and/or the at least one metal of the at least one metal sulfide may advantageously catalytically accelerate the electrochemical reaction, for example during discharging and/or charging.

If the at least one metal sulfide includes electrochemically active sulfur, in particular which is electrochemically active within the scope of the electrochemical reaction of the cell for which the cathode material is designed, for example at least one disulfide anion (S$_2^{2-}$) and/or at least one polysulfide anion and/or a hyperstoichiometric sulfur portion, for example sulfur which is not directly connected to metal and/or unbound sulfur and/or uncharged sulfur and/or sulfur having an oxidation number of zero, for example sulfur incorporated into the crystal structure thereof, in addition the electrochemically active sulfur of the at least one metal sulfide may also advantageously contribute to the capacity of the cathode material or cell.

For example, the at least one metal sulfide, for example the at least one transition metal sulfide and/or the at least one metal sulfide of at least one metal of the third, fourth, and/or fifth main group, may be contained, for example incorporated and/or embedded, in the at least one cathode active material and/or in a polymer that is in particular ionically and/or electrically conductive or conducting, for example in the at least one polymer electrolyte, and/or in some other ion conductor, for example in the at least one inorganic ion conductor. In particular, the at least one metal sulfide, for example the at least one transition metal sulfide and/or the at least one metal sulfide of at least one metal of the third, fourth, and/or fifth main group, may be used in combination with a cathode active material.

Within the scope of one embodiment, the at least one metal sulfide, in particular the at least one transition metal sulfide and/or the at least one metal sulfide of at least one metal of the third, fourth, and/or fifth main group, is therefore contained, for example incorporated and/or embedded, in the at least one cathode active material, in particular in the sulfur-carbon composite, for example in the sulfur-polymer composite, for example in the polymer containing in particular covalently bound sulfur, for example SPAN. An in particular shared electrochemically active phase having improved electrical conductivity and/or a catalytically accelerated electrochemical reaction, for example during discharging and/or charging, may advantageously be achieved in this way.

For example, the at least one cathode active material may therefore include a sulfur-carbon composite, for example a sulfur-polymer composite, for example a polymer containing in particular covalently bound sulfur, and at least one metal sulfide, in particular the at least one transition metal sulfide and/or the at least one metal sulfide of at least one metal of the third, fourth, and/or fifth main group. A cathode material may thus advantageously be provided in which a portion of the sulfur is bound in and/or to the sulfur-carbon composite, for example the sulfur-polymer composite, for example the polymer containing in particular covalently bound sulfur, for example SPAN, and another portion of the sulfur is bound in and/or to the metal sulfide.

In particular, the at least one cathode active material, in particular the sulfur-carbon composite, for example the sulfur-polymer composite, in particular the polymer containing in particular covalently bound sulfur, for example SPAN, and the at least one metal sulfide, for example the at least one transition metal sulfide and/or the at least one metal sulfide of at least one metal of the third, fourth, and/or fifth main group, in particular the at least one transition metal sulfide, may form a (shared) electrochemically active phase. The at least one polymer electrolyte and/or the at least one inorganic ion conductor may thus form an ion-conducting phase which, for example, may be present in addition to the electrochemically active phase.

Within the scope of one embodiment, the at least one cathode active material, in particular the sulfur-carbon composite, for example the sulfur-polymer composite, for example the polymer containing in particular covalently bound sulfur, for example SPAN, is homogeneously blended and/or mixed with the at least one metal sulfide, in particular the at least one transition metal sulfide and/or the at least one metal sulfide of at least one metal of the third, fourth, and/or fifth main group. For example, the at least one cathode active material, in particular the sulfur-carbon composite, for example the sulfur-polymer composite, for example the polymer containing in particular covalently bound sulfur, and the at least one metal sulfide, for example the at least one transition metal sulfide and/or the at least one metal sulfide of at least one metal of the third, fourth, and/or fifth main group, may be present uniformly distributed. The sulfur-carbon composite, for example the sulfur-polymer composite, in particular the polymer containing in particular covalently bound sulfur, for example SPAN, as well as the at least one metal sulfide, in particular transition metal sulfide, contained therein may thus both advantageously contact the at least one polymer electrolyte and/or the at least one inorganic ion conductor at its boundary surface.

Within the scope of another alternative or additional embodiment, the at least one cathode active material, in particular the sulfur-carbon composite, for example the sulfur-polymer composite, for example the polymer containing in particular covalently bound sulfur, for example SPAN, is enclosed by the at least one metal sulfide, for example the at least one transition metal sulfide and/or the at least one metal sulfide of at least one metal of the third, fourth, and/or fifth main group. For example, the at least one cathode active material, in particular the sulfur-carbon composite, for example the sulfur-polymer composite, for example the polymer containing in particular covalently bound sulfur, for example SPAN, may be coated with the at least one metal sulfide, for example the at least one transition metal sulfide and/or the at least one metal sulfide of at least one metal of the third, fourth, and/or fifth main group. The surface conductivity may thus advantageously be improved, and outward diffusion of polysulfides may optionally be counteracted.

Within the scope of another embodiment, the at least one metal sulfide, for example the at least one transition metal sulfide and/or the at least one metal sulfide of at least one metal of the third, fourth, and/or fifth main group, (in sum) constitutes ≥5% by weight to ≤90% by weight, for example ≥25% by weight to ≤50% by weight related to the weight of the at least one cathode active material, in particular sulfur-carbon composite, for example sulfur-polymer composite, for example the polymer containing in particular covalently bound sulfur, and of the at least one metal sulfide, for example the at least one transition metal sulfide and/or the at least one metal sulfide of at least one metal of the third, fourth, and/or fifth main group.

For example, the at least one metal sulfide, for example the at least one transition metal sulfide and/or the at least one metal sulfide of at least one metal of the third, fourth, and/or fifth main group, in particular the at least one transition metal sulfide, may include or be a simple metal sulfide such as iron(II) sulfide (FeS) and/or copper(II) sulfide (CuS), for example containing one sulfur atom for each metal atom, for example in which all bonds of the sulfur are to the metal atom, and/or a metal sulfide having a more complex structure, for example in which more than one sulfur atom is bound to each metal atom, for example copper disulfide ($CuS_2$) and/or patronite ($VS_4$, $V^{4+}(S_2^{2-})_2$), and in which optionally part of the sulfur is not directly joined to the metal, but instead, for example, may be incorporated into the crystal structure, for example a metal sulfide having a hyperstoichiometric sulfur portion, and/or in which more metal atoms than sulfur atoms are contained, for example copper(I) sulfide ($Cu_2S$), and/or a metal sulfide having a hyperstoichiometric metal portion, such as $Ni_9S_8$ and/or $Ni_3S_2$.

Within the scope of one embodiment, the at least one metal sulfide, for example the at least one transition metal sulfide and/or the at least one metal sulfide of at least one metal of the third, fourth, and/or fifth main group, in particular the at least one transition metal sulfide, includes electrochemically active sulfur, in particular which is electrochemically active within the scope of the electrochemical reaction of the cell for which the cathode material is designed. For example, the at least one metal sulfide, for example the at least one transition metal sulfide and/or the at least one metal sulfide of at least one metal of the third, fourth, and/or fifth main group, in particular the at least one transition metal sulfide, may contain at least one disulfide anion and/or at least one polysulfide anion and/or a hyperstoichiometric sulfur portion, for example sulfur which is not directly connected to metal and/or unbound sulfur and/or uncharged sulfur and/or sulfur having an oxidation number of zero, for example sulfur incorporated into the crystal structure thereof. In addition, the electrochemically active sulfur of the at least one metal sulfide may also advantageously contribute to the capacity of the cathode material or cell.

Within the scope of one alternative or additional embodiment, the at least one metal sulfide, for example the at least one transition metal sulfide and/or the at least one metal sulfide of at least one metal of the third, fourth, and/or fifth main group, in particular the at least one transition metal sulfide, contains more than one sulfur atom for each metal atom. For example, the at least one metal sulfide, for example the at least one transition metal sulfide and/or the at least one metal sulfide of at least one metal of the third, fourth, and/or fifth main group, in particular the at least one transition metal sulfide, may include or be a metal disulfide and/or a higher metal sulfide, for example a metal trisulfide and/or a metal tetrasulfide and/or a metal pentasulfide, and/or a metal sulfide having a hyperstoichiometric sulfur portion, for example with sulfur incorporated into the crystal structure thereof. Due to the at least one metal sulfide, additional sulfur for the electrochemical reaction and/or for the catalysis may advantageously be provided in this way.

Within the scope of another embodiment, the at least one metal sulfide, for example the at least one transition metal sulfide and/or the at least one metal sulfide of at least one metal of the third, fourth, and/or fifth main group, contains more than one metal atom for each sulfur atom and/or has a hyperstoichiometric metal portion. A higher electrical conductivity and/or catalytic acceleration may thus advantageously be achieved.

Within the scope of one embodiment, the at least one metal sulfide includes or is at least one transition metal sulfide. In particular, the at least one transition metal sulfide may include or be a transition metal sulfide containing electrochemically active sulfur and/or a transition metal sulfide containing more than one sulfur atom for each metal atom and/or a transition metal sulfide containing more than one metal atom for each sulfur atom and/or a transition metal sulfide having a hyperstoichiometric metal portion. By use of transition metal sulfides, it is thus advantageously possible in particular to increase the capacity of the cathode material or of the cell using electrochemically active sulfur, and/or to provide additional sulfur for the electrochemical reaction and/or for the catalysis, and/or to increase the electrical conductivity.

Within the scope of another embodiment, the at least one metal sulfide includes or is at least one metal sulfide of at least one metal of the third, fourth, and/or fifth main group. The at least one metal sulfide of at least one metal of the third, fourth, and/or fifth main group may in particular include or be a metal sulfide of at least one metal of the third, fourth, and/or fifth main group containing more than one sulfur atom for each metal atom, and/or a metal sulfide of at least one metal of the third, fourth, and/or fifth main group containing more than one metal atom for each sulfur atom, and/or a metal sulfide of at least one metal of the third, fourth, and/or fifth main group having a hyperstoichiometric metal portion. By use of metal sulfides of the third, fourth, and/or fifth main group, it is thus advantageously possible in particular to increase the electrical conductivity and/or achieve catalytic acceleration.

Within the scope of another embodiment, the at least one metal sulfide includes or is at least one transition metal sulfide and at least one metal sulfide of at least one metal of the third, fourth, and/or fifth main group.

Within the scope of another embodiment, the at least one metal sulfide or transition metal sulfide includes or is a sulfide of iron, copper, cobalt, nickel, vanadium, niobium, tantalum, chromium, molybdenum, tungsten, zinc, manganese, and/or titanium.

Within the scope of one embodiment, the at least one metal sulfide, for example transition metal sulfide, includes or is (at least) one iron sulfide. For example, the at least one metal sulfide may include or be iron disulfide, or for example the minerals pyrite and/or marcasite ($FeS_2$), in particular having the valence formula: $Fe^{2+}S_2^{2-}$, and/or iron(II) sulfide (FeS).

Within the scope of one alternative or additional embodiment, the at least one metal sulfide, for example transition metal sulfide, includes or is (at least) one copper sulfide. For example, the at least one metal sulfide may include or be copper disulfide ($CuS_2$) and/or an in particular nonstoichiometric copper sulfide, in particular having a hyperstoichiometric metal portion, for example $Cu_9S_8$ and/or $Cu_7S_4$, and/or copper(II) sulfide (CuS) and/or copper(I) sulfide ($Cu_2S$).

Within the scope of one alternative or additional embodiment, the at least one metal sulfide, for example transition metal sulfide, includes or is (at least) one cobalt sulfide. For example, the at least one metal sulfide may include or be cobalt disulfide, or for example the mineral cattierite ($CoS_2$), in particular having the valence formula: $Co^{2+}S_2^{2-}$, and/or an in particular nonstoichiometric cobalt sulfide, in particular having a hyperstoichiometric sulfur portion, for example $Co_3S_4$, and/or having a hyperstoichiometric metal portion, for example $Co_9S_8$, and/or cobalt monosulfide (CoS).

Within the scope of one alternative or additional embodiment, the at least one metal sulfide, for example transition metal sulfide, includes or is (at least) one nickel sulfide. For example, the at least one metal sulfide may include or be nickel disulfide or for example the mineral vaesite ($NiS_2$) and/or an in particular nonstoichiometric nickel sulfide, in particular having a hyperstoichiometric metal portion, for example $Ni_9S_8$ and/or $Ni_3S_2$, and/or nickel(II) sulfide (NiS).

Within the scope of one alternative or additional embodiment, the at least one metal sulfide, for example transition metal sulfide, includes or is (at least) one vanadium sulfide. For example, the at least one metal sulfide may include or be vanadium disulfide ($VS_2$) and/or a higher vanadium sulfide, for example vanadium trisulfide ($VS_3$) and/or vanadium tetrasulfide, or for example the mineral patronite ($VS_4$), for example having the valence formula: $V^{4+}(S_2^{2-})_2$, for example having a tetravalent positive vanadium and two doubly negatively charged $S_2^{2-}$ ions, and/or vanadium monosulfide (VS) and/or vanadium(III) sulfide ($V_2S_3$) and/or vanadium(IV) sulfide ($VS_2$) and/or vanadium(V) sulfide ($V_2S_5$).

Within the scope of one alternative or additional embodiment, the at least one metal sulfide, for example transition metal sulfide, includes or is (at least) one niobium sulfide. For example, the at least one metal sulfide may include or be niobium disulfide ($NbS_2$) and/or a higher niobium sulfide, for example niobium trisulfide ($NbS_3$) and/or niobium tetrasulfide ($NbS_4$) and/or niobium pentasulfide ($NbS_5$), and/or niobium(III) sulfide ($Nb_2S_3$) and/or niobium(V) sulfide ($Nb_2S_5$).

Within the scope of one alternative or additional embodiment, the at least one metal sulfide, for example transition metal sulfide, includes or is (at least) one tantalum sulfide. For example, the at least one metal sulfide may include or be tantalum disulfide ($TaS_2$) and/or a higher tantalum sulfide, for example tantalum trisulfide ($TaS_3$) and/or tantalum tetrasulfide ($TaS_4$) and/or tantalum pentasulfide ($TaS_5$), and/or tantalum(III) sulfide ($Ta_2S_3$) and/or tantalum(V) sulfide ($Ta_2S_5$).

Within the scope of one alternative or additional embodiment, the at least one metal sulfide, for example transition metal sulfide, includes or is (at least) one chromium sulfide. For example, the at least one metal sulfide may include or be chromium trisulfide ($CrS_3$) and/or chromium(III) sulfide ($Cr_2S_3$).

Within the scope of one alternative or additional embodiment, the at least one metal sulfide, for example transition metal sulfide, includes or is (at least) one molybdenum sulfide. For example, the at least one metal sulfide may include or be molybdenum disulfide ($MoS_2$) and/or a higher molybdenum sulfide, for example molybdenum trisulfide ($MoS_3$) and/or molybdenum tetrasulfide ($MoS_4$).

Within the scope of one alternative or additional embodiment, the at least one metal sulfide, for example transition metal sulfide, includes or is (at least) one tungsten sulfide. For example, the at least one metal sulfide may include or be tungsten disulfide ($WS_2$) and/or a higher tungsten sulfide, for example tungsten pentasulfide ($WS_5$) and/or tungsten tetrasulfide ($WS_5$) [sic; $WS_4$] and/or tungsten trisulfide ($WS_3$).

Within the scope of one alternative or additional embodiment, the at least one metal sulfide, for example transition metal sulfide, includes or is (at least) one zinc sulfide. For example, the at least one metal sulfide may include or be zinc(II) sulfide (ZnS).

Within the scope of one alternative or additional embodiment, the at least one metal sulfide, for example transition metal sulfide, includes or is (at least) one manganese sulfide. For example, the at least one metal sulfide may include or be manganese(II) sulfide (MnS) and/or manganese(III) sulfide ($Mn_2S_3$).

Within the scope of one alternative or additional embodiment, the at least one metal sulfide, for example transition metal sulfide, includes or is (at least) one titanium sulfide. For example, the at least one metal sulfide may include or be titanium(IV) sulfide ($TiS_2$).

Within the scope of another embodiment, the at least one metal sulfide, for example transition metal sulfide, includes or is a mixed metal sulfide. For example, the mixed metal sulfide may include at least two metals selected from the group made up of titanium, vanadium, chromium, manganese, iron, cobalt, nickel, copper, zinc, niobium, tantalum, molybdenum, and tungsten.

For example, the at least one metal sulfide may [include or be] a mixed metal sulfide of the general chemical formula: $AB_3S_6$ and/or $A_2BS_4$ and/or $A_4B_6S_8$, where A stands for nickel (Ni) and/or copper (Cu) and/or iron (Fe) and/or manganese (Mn) and/or cobalt (Co) and B stands for vanadium (V) and/or niobium (Nb) and/or tantalum (Ta) and/or molybdenum (Mo) and/or tungsten (W). For example, the at least one metal sulfide may include or be a mixed metal sulfide of the general chemical formula: $AB_3S_6$, where A stands for nickel (Ni) and/or copper (Cu) and/or iron (Fe) and/or manganese (Mn) and/or cobalt (Co) and B stands for vanadium (V) and/or niobium (Nb) and/or tantalum (Ta), for example $NiNb_3S_6$, and/or a mixed metal sulfide of the general chemical formula: $A_2BS_4$ and/or $A_4B_6S_8$, where A stands for copper (Cu) and/or nickel (Ni) and/or iron (Fe) and B stands for molybdenum (Mo) and/or tungsten (W), for example $Cu_2MoS_4$ and/or $Cu_4Mo_6S_8$.

For example, the at least one metal sulfide, for example transition metal sulfide, may be selected from the group made up of FeS, $FeS_2$, CuS, $Cu_2S$, $CuS_2$, $Cu_9S_8$, $Cu_7S_4$, CoS, $CoS_2$, $Co_3S_4$, $Co_9S_8$, NiS, $NiS_2$, $Ni_9S_8$, $Ni_3S_2$, VS, $VS_2$, $V_2S_3$, $V_2S_5$, $VS_4$, $NbS_2$, $NbS_3$, $NbS_4$, $NbS_5$, $Nb_2S_3$, $Nb_2S_5$, $TaS_2$, $TaS_3$, $TaS_4$, $TaS_5$, $Ta_2S_3$, $Ta_2S_5$, $Cr_2S_3$, $CrS_3$, $MoS_2$, $MoS_3$, $MoS_4$, $WS_2$, $WS_3$, $WS_4$, $WS_5$, MnS, $Mn_2S_3$, $TiS_2$, $NiNb_3S_6$, $Cu_2MoS_4$, and/or $Cu_4Mo_6S_8$. In particular, the at least one metal sulfide may be selected from the group made up of $FeS_2$, $CuS_2$, $CoS_2$, $Co_3S_4$, $NiS_2$, $VS_2$, $VS_4$, $NbS_2$, $NbS_3$, $NbS_4$, $NbS_5$, $TaS_2$, $TaS_3$, $TaS_4$, $TaS_5$, $CrS_3$, $MoS_2$, $MoS_3$, $MoS_4$, $WS_2$, $WS_3$, $WS_4$, $WS_5$.

For example, the at least one metal sulfide, in particular transition metal sulfide, may include or be a sulfide of iron, for example iron(II) sulfide (FeS) and/or iron disulfide ($FeS_2$), and/or copper, for example copper(II)sulfide (CuS) and/or copper disulfide ($CuS_2$), and/or chromium, for example chromium(III) sulfide ($Cr_2S_3$), and/or vanadium, for example vanadium(III) sulfide ($V_2S_3$) and/or vanadium (V) sulfide ($V_2S_5$) and/or patronite ($VS_4$), and/or molybdenum, for example molybdenum disulfide ($MoS_2$) and/or molybdenum(VI) sulfide ($MoS_3$).

Within the scope of another embodiment, the at least one metal sulfide or metal sulfide of the third, fourth, and/or fifth main group includes or is a sulfide of indium, gallium, aluminum, tin, germanium, antimony, and/or bismuth. In particular, the at least one metal sulfide or metal sulfide of the third, fourth, and/or fifth main group may include or be a sulfide of indium and/or tin and/or antimony.

Within the scope of another specific embodiment, the cathode material also includes at least one electrically conductive metal compound. The at least one electrically conductive metal compound may include or be, for example, at least one electrically conducting metal oxide and/or at least one electrically conducting metal carbide. For example, the at least one electrically conductive metal oxide may include or be an in particular doped oxide of tin and/or indium and/or tantalum and/or niobium, for example tin-doped indium oxide and/or tin oxide doped with tantalum, niobium, and/or fluorine. The at least one electrically conductive metal carbide may include or be, for example, a carbide of titanium, for example titanium carbide (TiC).

The at least one inorganic ion conductor may in particular be a crystalline ion conductor.

Within the scope of another specific embodiment, the at least one inorganic ion conductor includes or is a sulfidic ion conductor, in particular a lithium argyrodite and/or a sulfidic glass, and/or an ion conductor, in particular a lithium ion conductor, having a garnet-like structure, for example a lithium titanate and/or lithium zirconate, for example a lithium-lanthanum-zirconium garnet, and/or an ion conductor, in particular lithium ion conductor, of the LISICON type and/or the NASICON type and/or lithium phosphorus oxynitride (LIPON).

An ion conductor having a garnet-like crystal structure may be understood in particular to mean an ion conductor whose crystal structure is derivable from the general garnet formula. The general garnet formula may be $A_3B_2[QO_4]_3$, for example, where A, B, and Q stand for different positions in the crystal lattice and may be occupied by one or multiple different ions or elements. For example, A may stand for the dodecahedral position, B for the octahedral position, and Q for the tetrahedral position.

An ion conductor of the lithium superionic conductor (LISICON) type and/or NASICON type may, for example, be an ion conductor of the general formula: $Li_{4-x}M_{1-x}M'_xS_4$ (thio-LISICON type), where M stands for Si and/or Ge and/or P, and M' stands for P and/or Al and/or Zn and/or Ga and/or Sb, for example $Li_{4-x}Ge_{1-x}P_xS_4$ and/or $Li_{4-x}Si_{1-x}P_xS_4$, where $0.5 \le x \le 0.85$, for example $x=0.75$, and/or of the general chemical formula: $AB_2(PO_4)_3$, where A stands for Li and/or Na and B for Ti and/or Al and/or Zr and/or Ge and/or Hf, for example lithium aluminum titanium phosphate (LATP), for example $Li_{1+x}Al_xTi_{2-x}(PO_4)_3$.

For example, the at least one inorganic ion conductor may include or be a sulfidic ion conductor, in particular for lithium ions. Sulfidic ion conductors may advantageously have a large transfer number and high conductivity as well as low contact resistances. Thus, the ionic contacting of the sulfur-containing cathode active material may advantageously be improved and a low polarization transfer voltage achieved by use of sulfidic ion conductors. In addition, due to the large transfer numbers, low polarization voltages and thus high performance of a cell thus equipped may also advantageously be achieved, in particular in the case of high surface current densities during charging/discharging. Furthermore, sulfidic ion conductors advantageously dissolve virtually no sulfur and virtually no polysulfides. This has the advantage that (poly)sulfides $S_x^{2-}$ which occur during discharge (reduction) of a cell, and which possibly may otherwise migrate to the anode, for example the lithium anode, and become reduced there, thus possibly being removed from the electrochemical reaction (also referred to as the shuttle mechanism), are better retained in the cathode, and the sulfur utilization and cycle stability may advantageously be improved in this way.

In addition, sulfur-containing cathode materials may advantageously be chemically compatible with sulfidic ion conductors, so that degradation of the cathode material may be minimized, and the service life of the cell may thus be prolonged. In addition, sulfidic ion conductors are advantageously easily manufacturable.

Sulfidic ion conductors may be used in a particularly advantageous manner in combination with a sulfur-polymer composite containing sulfur that is bound, for example covalently and/or ionically, in particular covalently, since they have virtually no sulfur or polysulfide solubility, so that going into solution and diffusion of sulfur and polysulfides from the polymer of the composite, which could possibly occur in the case of low-molecular ether compounds and/or conventional short-chain polyethers such as pure polyethylene oxide, may be counteracted in this way.

The at least one sulfidic ion conductor may be based on the general chemical formula: $(Li_2S)_x: (P_2S_5)_y: D_z$, for example, where $D_z$ stands for one or multiple additives, for example LiCl and/or LiBr and/or LiI and/or LiF and/or $Li_2Se$ and/or $Li_2O$ and/or $P_2Se_5$ and/or $P_2O_5$ and/or $Li_3PO_4$ and/or one or multiple sulfides of germanium, boron, aluminum, molybdenum, tungsten, silicon, arsenic, and/or niobium, in particular germanium, and x, y, and z may in particular stand for component ratios. Sulfidic ion conductors may be synthesized, for example, from the individual components $Li_2S$ and $P_2S_5$ and optionally D. The synthesis may optionally be carried out under protective gas.

Within the scope of one embodiment, the at least one sulfidic ion conductor includes or is a lithium argyrodite and/or a sulfidic glass. These ion conductors have proven to be particularly advantageous, since they may have a high ion conductivity and low contact resistances at the grain boundaries within the material and with respect to other components, for example the cathode active material. The long-term stability and performance of a cell equipped with the cathode material may advantageously be further improved in this way.

Lithium argyrodites may be understood in particular to mean compounds that are derived from the mineral argyrodite of the general chemical formula: $Ag_8GeS_6$, where silver (Ag) is replaced by lithium (Li), and in particular germanium (Ge) and/or sulfur (S) may also be replaced by other elements, for example of main groups III, IV, V, VI, and/or VII.

Examples of lithium argyrodites are the following:
compounds of the general chemical formula:

$$Li_7PCh_6$$

where Ch stands for sulfur (S) and/or oxygen (O) and/or selenium (Se), for example sulfur (S) and/or selenium (Se), in particular sulfur (S), compounds of the general chemical formula:

$$Li_6PCh_5X$$

where Ch stands for sulfur (S) and/or oxygen (O) and/or selenium (Se), for example sulfur (S) and/or oxygen (O), in particular sulfur (S), and X stands for chlorine (Cl) and/or bromine (Br) and/or iodine (I) and/or fluorine (F), for example X stands for chlorine (Cl) and/or bromine (Br) and/or iodine (I), compounds of the general chemical formula:

$$Li_{7-\delta}BCh_{6-\delta}X_\delta$$

where Ch stands for sulfur (S) and/or oxygen (O) and/or selenium (Se), for example sulfur (S) and/or selenium (Se), in particular sulfur (S), B stands for phosphorus (P) and/or arsenic (As), X stands for chlorine (Cl) and/or bromine (Br) and/or iodine (I) and/or fluorine (F), for example X stands for chlorine (Cl) and/or bromine (Br) and/or iodine (I), and $0 \le \delta \le 1$.

For example, the at least one sulfidic ion conductor may include at least one lithium argyrodite of the chemical formula: $Li_7PS_6$, $Li_7PSe_6$, $Li_6PS_5Cl$, $Li_6PS_5Br$, $Li_6S_5I$, $Li_{7-\delta}PS_{6-\delta}Cl_\delta$, $Li_{7-\delta}PS_{6-\delta}Br_\delta$, $Li_{7-\delta}PS_{6-\delta}I_\delta$, $Li_{7-\delta}PSe_{6-\delta}Cl_\delta$, $Li_{7-\delta}PSe_{6-\delta}Br_\delta$, $Li_{7-\delta}PSe_{6-\delta}I_\delta$, $Li_{7-\delta}AsS_{6-\delta}Br_\delta$, $Li_{7-\delta}AsS_{6-\delta}I_\delta$, $Li_6AsS_5I$, $Li_6AsSe_5I$, $Li_6PO_5Cl$, $Li_6PO_5Br$, and/or $Li_6PO_5I$. Lithium argyrodites are described in the following publications, for example: Angew. Chem. Int. Ed., 2008, 47, 755-758; Z. Anorg. Allg. Chem., 2010, 636, 1920-1924; Chem. Eur. J., 2010, 16, 2198-2206; Chem. Eur. J., 2010, 16, 5138-5147; Chem. Eur. J., 2010, 16, 8347-8354; Solid State Ionics, 2012, 221, 1-5; Z. Anorg. Allg. Chem., 2011, 637, 1287-1294; and Solid State Ionics, 2013, 243, 45-48.

In particular, the lithium argyrodite may be a sulfidic lithium argyrodite, for example in which Ch stands for sulfur (S).

Lithium argyrodites may be prepared in particular by a mechanical-chemical reaction process, for example in which starting materials such as lithium halides, for example LiCl, LiBr, and/or LiI, and/or lithium chalcogenides, for example Li$_2$S and/or Li$_2$Se and/or Li$_2$O, and/or chalcogenides of main group V, for example P$_2$S$_5$, P$_2$Se$_5$, Li$_3$PO$_4$, are ground together in particular in stoichiometric quantities. This may take place in a ball mill, for example, in particular a high-energy ball mill, for example at a speed of 600 rpm. In particular, the grinding may take place under a protective gas atmosphere.

For example, the at least one sulfidic ion conductor may include at least one sulfidic glass of the chemical formula: L$_{10}$GeP$_2$Si$_2$, Li$_2$S—(GeS$_2$)—P$_2$S$_5$, and/or Li$_2$S—P$_2$S$_5$. For example, the at least one sulfidic ion conductor may include a germanium-containing sulfidic glass, for example L$_{10}$GeP$_2$Si$_2$ and/or Li$_2$S—(GeS$_2$)—P$_2$S$_5$, in particular L$_{10}$GeP$_2$Si$_2$. Germanium-containing sulfidic lithium ion conductors may advantageously have a high lithium ion conductivity and chemical stability.

Within the scope of one particular embodiment of this specific embodiment, the at least one sulfidic ion conductor includes or is a lithium argyrodite. Lithium argyrodites are advantageously characterized by particularly low contact resistances at the grain boundaries within the material and with respect to other components, for example the cathode active material. Particularly good ion conduction may advantageously be achieved at and within the grain boundaries. Lithium argyrodites may also advantageously have a low transfer resistance between grains, without a sintering process. This advantageously allows the manufacture of the cathode material and of a cell to be simplified.

When at least one polymer electrolyte and at least one inorganic ion conductor are combined, the at least one inorganic ion conductor, for example sulfidic ion conductor, in particular the ions to be conducted, for example lithium ions, may dissociate and thus [be] provided, whereby the ion mobility may be increased by the at least one polymer electrolyte, and the ion conductivity may thus be increased.

For example, the at least one polymer electrolyte may include or be at least one polymer or polymer electrolyte which includes at least one repeating unit of the general chemical formula:

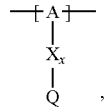

and/or at least one (singly or multiply) fluorinated, for example perfluorinated, and/or lithium sulfonate-substituted polymer, for example a perfluoropolyether and/or a lithium sulfonate-substituted, in particular fluorinated, for example perfluorinated, polyolefin, for example a tetrafluoroethylene polymer, and/or a lithium sulfonate-substituted, in particular fluorinated, for example perfluorinated, polyether, for example a lithium ion-containing, for example lithium ion-exchanged, Nafion, and/or a lithium sulfonate-substituted, in particular fluorinated, for example perfluorinated, polyphenylene.

The at least one polymer electrolyte or the at least one polymer may include or be, for example, a homopolymer and/or a copolymer, for example a block copolymer, optionally a multiblock copolymer, and/or an alternating copolymer and/or a statistical copolymer, and/or a polymer mixture, for example of one or multiple homopolymers and/or one or multiple copolymers, for example a homopolymer-copolymer mixture.

Within the scope of another specific embodiment, the at least one polymer electrolyte or the at least one polymer includes a polyalkylene oxide and/or a polymer containing at least one alkylene oxide group, in particular oligoalkylene oxide group. The ion mobility and thus the ion conductivity may advantageously be increased by use of alkylene oxide units or groups. However, such polymers are only ion-conductive, in particular lithium ion-conductive, and should be used in combination, for example in a mixture, with at least one alkali metal salt, for example alkali metal conducting salt, in particular lithium salt, for example lithium conducting salt.

For example, the at least one polymer electrolyte or the at least one polymer may include a polyethylene oxide (PEO) and/or propylene oxide and/or a polymer containing at least one ethylene oxide group and/or propylene oxide group, for example oligoethylene oxide group and/or oligopropylene oxide group. In particular, the at least one polymer electrolyte may include a polyethylene oxide and/or a polymer containing at least one ethylene oxide group, in particular oligoethylene oxide group.

Within the scope of another, alternative or additional specific embodiment, the at least one polymer electrolyte or the at least one polymer includes at least one repeating unit of the general chemical formula:

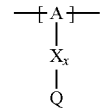

In this regard, -[A]- stands for a unit which forms a polymer backbone. X stands for a spacer, in particular a spacer that is bound, for example covalently, to polymer backbone-forming unit -[A]-. x stands for the number, in particular the presence or the absence, of spacer X. x may in particular be 1 or 0, for example 1. A spacer X may be present in particular in the case x=1. In the case x=0, in particular no spacer may be present. Q stands for a group that is bound, in particular covalently, to spacer X (in the case x=1) or to polymer backbone -[A]- (in the case x=0). In particular, group Q may be bound to polymer backbone-forming unit -[A]- via spacer X. In the case x=1 (presence of the spacer), group Q, for example uncharged group Q or positively charged groups Q$^+$ or negatively charged group Q$^-$ described below, may in particular be bound to spacer X. In the case x=0 (absence of the spacer), group Q, for example uncharged group Q or positively charged groups Q$^+$ or negatively charged group Q$^-$, discussed below may in particular be bound directly to polymer backbone -[A]-. Such polymers may advantageously have an ion conductivity, for example a lithium ion conductivity, in particular as a function of the temperature, of ≥10$^{-5}$ S/cm, possibly even ≥10$^{-4}$ S/cm, and advantageously used as binders as well as ion conductors, for example lithium ion conductors. The polymer or the polymer electrolyte in particular may also be referred to as a cathode electrolyte or catholyte. Increased mechanical stability may advantageously be achieved due to the binder properties. Such polymers or polymer electrolytes may be employed or used in a particularly advantageous manner in alkali metal-sulfur cells, for example lithium-sulfur cells and/or sodium-sulfur cells, in particular lithium-sulfur cells, for example containing a sulfur-carbon composite, for example a sulfur-polymer composite, in particular a polymer containing in particular covalently bound sulfur, for example a sulfur-polyacrylonitrile composite, in particular SPAN, as cathode active material. Due to the bonding of group Q, for example Q or $Q^+$ or $Q^-$, and optionally the spacer, to polymer-forming unit -[A]-, and thus the localization of group Q and optionally spacer X, and in particular due to the increased viscosity compared to liquid electrolytes and/or in particular also a reduced polysulfide solubility of the polymer or polymer electrolyte, in particular compared to polyethylene oxide (PEO), (poly)sulfides may be retained in the vicinity of the carbon of the composite, and for example going into solution and in particular diffusion of polysulfides from the carbon of the composite, which could possibly occur in the case of low-molecular ether compounds and/or conventional short-chain polyethers such as pure polyethylene oxide, may be counteracted, and improved calendrical stability and/or improved energy density preservation may thus be advantageously be achieved Within the scope of one embodiment of this specific embodiment, Q stands for a negatively charged group $Q^-$, for example a negatively charged side group $Q^-$, and a counterion $Z^+$. In particular, negatively charged group $Q^-$ may be bound to polymer backbone-forming unit -[A]- via spacer X. Negatively charged group $Q^-$ may, for example, stand for a group based on a conducting salt anion, in particular a lithium conducting salt anion, for example a sulfonylimide group, for example a trifluoromethanesulfonylimide group (TFSI$^-$: $F_3C$—$SO_2$—$(N^-)$—$SO_2$—) and/or a perfluoroethanesulfonylimide group (PFSI$^-$: $F_5C_2$—$SO_2$—$(N^-)$—$SO_2$) and/or a fluorosulfonylimide group (FSI: F—$SO_2$—$(N^-)$—$SO_2$—), and/or for a group based on an anion of an ionic liquid, for example a pyrazolide group or an imidazolide group, and/or for a sulfonate group, for example a (single) sulfonate group or a trifluoromethanesulfonate group (triflate: $^-SO_3CF_2$—), and/or for a sulfate group and/or for a carboxylate group and/or for a group based on a phosphoric acid-based anion, in particular a phosphate group, and/or for a group based on an anion of an imide, in particular a sulfonylimide group, for example a trifluoromethanesulfonylimide group (TFSI$^-$: $F_3C$—$SO_2$—$(N^-)$—$SO_2$—) and/or a perfluoroethanesulfonylimide group (PFSI$^-$: $F_5C_2$—$SO_2$—$(N^-)$—$SO_2$—) and/or a fluorosulfonylimide group (FSI: F—$SO_2$—$(N^-)$—$SO_2$—), and/or for a group based on an anion of an amide, in particular a group based on an anion of a secondary amide (—R—NHR), and/or for a group based on an anion of a carboxylic acid amide, in particular a group based on an anion of a secondary carboxylic acid amide (—CO—NHR). For example, a cation $Z^+$, in particular a metal cation, for example a lithium ion and/or a sodium ion, in particular lithium, may be contained as a counterion of $Q^-$. In particular alkali metal ions, in particular lithium ions, may be coordinated or solvated by a negatively charged group $Q^-$. A large transfer number close to 1 may result, in particular due to the covalent bonding of negatively charged group $Q^-$ to polymer backbone-forming unit -[A]-. Increased mobility of alkali ions, in particular lithium ions, may thus optionally be achieved. In addition, the dielectric constant may also advantageously be increased in this way, which may have a positive influence on the polysulfide solubility, in particular in such a way that the polysulfide solubility is reduced, which may have a particularly advantageous effect in particular for sulfur-carbon composites, for example sulfur-polymer composites and/or carbon modification composites, in particular sulfur-polymer composites containing sulfur which is, for example, covalently and/or ionically, in particular covalently, bound to the polymer of the composite, for example sulfur-polyacrylonitrile composites, in particular SPAN. In addition, polymers which contain a negatively charged group $Q^-$ and a counterion $Z^+$, for example a lithium ion $Li^+$ and/or a sodium ion $Na^+$, in particular a lithium ion $Li^+$, may already have a sufficient ion conductivity, in particular lithium ion conductivity, due to counterion $Z^+$. Polymers or polymer electrolytes which contain a negatively charged group $Q^-$ and a counterion $Z^+$, for example a lithium ion $Li^+$ and/or a sodium ion $Na^+$, in particular a lithium ion $Li^+$, may therefore be used without adding an alkali metal conducting salt, for example a lithium conducting salt, or may be ion-conducting, in particular lithium ion-conducting. However, polymers containing a negatively charged group Q and a counterion $Z^+$, for example a lithium ion $Li^+$, in combination, for example in a mixture, with at least one alkali metal salt, in particular a lithium salt, for example a lithium conducting salt, may still be used, for example, for reducing the glass transition temperature and/or for increasing the ion mobility and the ion conductivity, in particular the lithium ion conductivity. Polymer backbone-forming unit -[A]- and/or spacer X may also optionally be optimized with regard to other properties.

Within the scope of one, in particular alternative or additional, embodiment of this specific embodiment, Q stands for a positively charged group $Q^+$, for example a positively charged side group $Q^+$, and a counterion $Z^-$. In particular, positively charged group $Q^+$ may be bound to polymer backbone-forming unit -[A]- via spacer X. Positively charged group $Q^+$ may, for example, stand for a group based on a cation of an ionic liquid. In particular a counterion or anion $Z^-$ may be contained as a counterion with respect to the positive charge of $Q^+$. For example, all common counterions of known conducting salts, for example for lithium cells, may be used as counterion $Z^-$. In particular, $Z^-$ may therefore stand for an anion, in particular a conducting salt anion. Due to a positively charged group $Q^+$, in particular anions of conducting salts, in particular lithium conducting salt anions, may be coordinated or solvated, and in particular the dissociation of the conducting salt, in particular lithium conducting salt, may be increased. In turn, the transfer number, in particular due to the covalent bonding of positively charged group $Q^+$ to polymer backbone-forming unit -[A]-, and optionally the mobility of the alkali ions, in particular lithium ions, of the conducting salt, and thus the ion conductivity, in particular the lithium ion conductivity, of the polymer or polymer electrolyte may likewise advantageously be increased. In addition, the dielectric constant may also advantageously be increased, which may have a positive influence on the polysulfide solubility, in particular in such a way that the polysulfide solubility is reduced, which may have a particularly advantageous effect in particular for sulfur-carbon composites, for example sulfur-polymer composites and/or carbon modification composites, for example sulfur-polymer composites containing sulfur which is, for example, covalently and/or ionically, in particular covalently, bound to the polymer of the composite, for example sulfur-polyacrylonitrile composites, for example SPAN. Polymer backbone-forming unit -[A]- and/or spacer X may also optionally be optimized with regard to other properties. In particular, polymers which include a positively charged group $Q^+$ in combination, for example in a mixture, with at least one alkali metal salt, for example an alkali metal conducting salt, in particular a lithium salt, for example a lithium conducting salt, may be used.

Within the scope of one, in particular alternative or additional, embodiment of this specific embodiment, Q stands for an uncharged group Q, for example an uncharged functional side group which is capable of coordinating or solvating alkali ions, in particular lithium ions (Li$^+$). In particular, uncharged group Q may be bound to polymer backbone-forming unit -[A]- via spacer X. Uncharged group Q may, for example, stand for a group that is derivable from an electrolyte solvent. Due to an uncharged group Q, alkali metal ions, in particular lithium ions, may advantageously be coordinated or solvated. The mobility of the alkali ions, for example lithium ions, in particular due to introducing the group which is derivable from an electrolyte solvent, and thus the ion conductivity, in particular the lithium ion conductivity, may thus advantageously be increased. Polymer backbone-forming unit -[A]- and/or spacer X may optionally be optimized with regard to other properties. Polymers which bear only uncharged groups Q and which in particular bear no bound charges, for example alkali ions, in particular lithium ions, may initially be solely ion-conductive, for example lithium ion-conductive, and may become ion-conducting, for example lithium ion-conducting, for example by adding an alkali metal salt, for example an alkali metal conducting salt, in particular a lithium salt, for example by mixing with an alkali metal salt, for example an alkali metal conducting salt, in particular a lithium salt, and in particular by solvating the salt. In particular, polymers which contain an uncharged group Q in combination, for example in a mixture, with at least one alkali metal salt, for example an alkali metal conducting salt, in particular a lithium salt, for example a lithium conducting salt, may therefore be used.

Overall, the dissociation of alkali metal ions, for example lithium ions, from inorganic ion conductors and/or optionally from a conducting salt may advantageously be promoted, or the coordination between an alkali ion, in particular a lithium ion, and the inorganic ion conductor and/or optionally a conducting salt may be weakened, by group Q, for example Q or Q$^+$ or Q$^-$. The transfer number and/or the mobility of the ions, for example lithium ions, and thus the ion conductivity, in particular the lithium ion conductivity, may thus advantageously be influenced and/or increased. In the case of Q$^-$, very large transfer numbers may advantageously be achieved, as the result of which, in particular in the case of high surface current densities during charging/discharging, low polarization voltages and thus high performance of a cell thus equipped may be achieved. Due to group Q being directly or indirectly bound to polymer backbone -[A]-, it is advantageously possible, compared to mixtures of analogous polymers and analogous groups Q which, however, are free or unbound, to achieve localization of group Q, for example Q or Q$^+$ or Q$^-$. Due to localization of group Q, for example Q or Q$^+$ or Q$^-$, outward diffusion of group Q and, for example, other possibly accompanying side reactions, for example swelling of the separator and/or of an anode protective layer and/or degradation of the anode, which could occur, for example, in the case of low-molecular ether compounds, may advantageously be prevented, and the mechanical stability and the binder function, for example, may be improved. Furthermore, such polymers may have a very low vapor pressure compared to liquid electrolytes, which allows a cell thus equipped to reliably operate at higher operating temperatures. In addition, further properties, such as the glass transition temperature and/or other properties of the polymer or polymer electrolyte, may also advantageously be set due to spacer X, for example due to the type of spacer and/or the length of the spacer, and/or polymer backbone-forming unit -[A]-, for example due to the type of polymer backbone-forming unit/s -[A]- and its/their design. In particular the glass transition temperature and/or the mechanical properties of the polymer or polymer electrolyte may advantageously be set due to spacer X. Polymer backbone-forming unit -[A]- may optionally be optimized with regard to other properties, for example mechanical properties.

Overall, the manufacture and the design of alkali metal-sulfur cells, for example lithium-sulfur cells and/or sodium-sulfur cells, in particular lithium-sulfur cells, for example lithium-SPAN cells, may thus be advantageously simplified, or their capacity or cycle stability, service life, and reliability may be increased.

Within the scope of one embodiment of this specific embodiment, the at least one polymer electrolyte or the at least one polymer includes or is a copolymer, for example a block copolymer, for example a multiblock copolymer, and/or an alternating copolymer and/or a statistical copolymer, and/or a polymer mixture and/or a homopolymer, which includes at least one repeating unit of the general chemical formula:

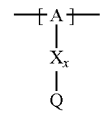

If Q includes a negatively charged group Q$^-$, the polymer or the polymer electrolyte may contain, for example, a repeating unit of the general chemical formula:

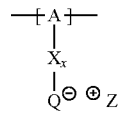

Counterion Z$^+$ may in particular stand for an alkali ion, for example a lithium ion and/or sodium ion, in particular a lithium ion (Li$^+$). Due to the negative charge of group Q$^-$, for example a sulfonate group, lithium (Li$^+$), for example, may advantageously directly be the counterion with respect to the negative charge of group Q$^-$, for example a sulfonate group, and in particular may provide ion conductivity. Admixture of conducting salt may thus advantageously be dispensed with. In particular, Z$^+$ may therefore stand for a lithium ion (Li$^+$).

Negatively charged group Q$^-$ may, for example, stand for a group based on a conducting salt anion, in particular a lithium conducting salt anion, for example a sulfonylimide group, for example a trifluoromethanesulfonylimide group (TFSI$^-$: F$_3$C—SO$_2$—(N$^-$)—SO$_2$—) and/or a perfluoroethanesulfonylimide group (PFSI$^-$: F$_5$C$_2$—SO$_2$—(N$^-$)—SO$_2$—) and/or a fluorosulfonylimide group (FSI: F—SO$_2$—(N$^-$)SO$_2$—), and/or for a group based on an anion of an ionic liquid, for example a pyrazolide group or an imidazolide group, and/or for a sulfonate group, for example a (single) sulfonate group or a trifluoromethanesulfonate group (triflate, $^-$SO$_3$CF$_2$—), and/or for a sulfate group and/or for a carboxylate group and/or for a group based on a phosphoric acid-based anion, in particular a phosphate group, and/or for a group based on an anion of an imide, in particular a sulfonylimide group, for example a trifluoromethanesulfonylimide group (TFSI$^-$: F$_3$C—SO$_2$—(N$^-$)—SO$_2$—) and/or a perfluoroethanesulfonylimide group (PFSI$^-$: $F_5C_2$—$SO_2$—($N^-$)—$SO_2$—) and/or a fluorosulfonylimide group (FSI: F—$SO_2$—($N^-$)$SO_2$—), and/or for a group based on an anion of an amide, in particular a group based on an anion of a secondary amide (—R—NHR), and/or for a group based on an anion of a carboxylic acid amide, in particular a group based on an anion of a secondary carboxylic acid amide (—CO—NHR). In particular alkali metal ions, in particular lithium ions, may be coordinated or solvated by a negatively charged group Q$^-$. A large transfer number close to 1 may thus result, in particular due to the covalent bonding of negatively charged group Q$^-$ to polymer backbone-forming unit -[A]-. In addition, the dielectric constant may thus advantageously be increased, which may have a positive influence on the polysulfide solubility, in particular in such a way that the polysulfide solubility is reduced, which, as explained in particular for sulfur-carbon composites, for example sulfur-polymer composites and/or carbon modification composites, in particular sulfur-polymer composites containing sulfur which is, for example, covalently and/or ionically, in particular covalently, bound to the polymer of the composite, for example sulfur-polyacrylonitrile composites, in particular SPAN, may have a particularly advantageous effect.

Within the scope of one particular specific embodiment, negatively charged group Q$^-$ therefore stands for a group based on a lithium conducting salt anion, in particular a lithium conducting salt anion, and/or for a group based on an anion of an ionic liquid and/or for a sulfonate group and/or for a sulfate group and/or for a carboxylate group and/or for a group based on a phosphoric acid-based anion and/or for a group based on an anion of an imide and/or for a group based on an anion of an amide and/or for a group based on an anion of a carboxylic acid amide.

Within the scope of one embodiment of this specific embodiment, negatively charged group Q stands for a sulfonylimide group, in particular a trifluoromethanesulfonylimide group ($F_3C$—$SO_2$—($N^-$)—$SO_2$—) and/or a perfluoroethanesulfonylimide group ($F_5C_2$—$SO_2$—($N^-$)—$SO_2$—) and/or a fluorosulfonylimide group (F—$SO_2$—($N^-$)—$SO_2$—), in particular a trifluoromethanesulfonylimide group, and/or for a sulfonate group, in particular a (single) sulfonate group and/or for a trifluoromethanesulfonate group. For example, negatively charged group Q$^-$ may stand for a trifluoromethanesulfonylimide group or a perfluoroethanesulfonylimide group or a fluorosulfonylimide group or a sulfonate group or a trifluoromethanesulfonate group. Within the scope of one particular embodiment, negatively charged group Q may stand for a sulfonate group or a sulfonylimide group, in particular a sulfonate group. By use of a sulfonylimide group or a sulfonate group, in particular a sulfonylimide group, coordination of cations, in particular lithium ions, which is comparatively weak, and which thus increases the ion mobility, in particular lithium ion mobility, and ion conductivity, in particular lithium ion conductivity, may advantageously be achieved. $Z^+$ may in particular stand for a lithium ion.

In particular, negatively charged group Q$^-$ may stand for a benzene group which is substituted with at least one group based on a conducting salt anion, in particular a lithium conducting salt anion, in particular with at least one sulfonylimide group (a benzenesulfonylimide group, for example a lithium benzenesulfonylimide group), and/or with at least one group based on an anion of an ionic liquid and/or with at least one sulfonate group (a benzenesulfonate group, for example a lithium benzenesulfonate group) and/or with at least one sulfate group and/or with at least one carboxylate group and/or with at least one group based on a phosphoric acid-based anion, in particular at least one phosphate group, and/or with at least one group based on an anion of an imide and/or with at least one group based on an anion of an amide and/or with at least one group based on an anion of a carboxylic acid amide. For example, negatively charged group Q$^-$ may stand for a benzene group which is substituted with at least one trifluoromethanesulfonylimide group and/or with at least one perfluoroethanesulfonylimide group and/or with at least one fluorosulfonylimide group, in particular at least one trifluoromethanesulfonylimide group. Within the scope of one embodiment, Q$^-$ stands for a benzenesulfonate group or a benzenesulfonylimide group, in particular a benzenesulfonate group. A benzene group advantageously allows a group, for example a sulfonate, to easily bind to various polymer backbones. In addition, a benzene group provides the option for easily binding further substituents which increase the ion conductivity, such as multiple groups, for example sulfonate groups, and/or one or multiple alkylene oxide group/s. A polymer containing a benzene group that is in particular functionalized in this way may advantageously easily be formed by polymerization of the double bond of a styrene that is in particular functionalized in this way, for example 4-(styrenesulfonyl) (trifluoromethansulfonyl)imide, or a styrene that is functionalized with the above-mentioned anionic groups. The linkage of the anionic function to a polymer backbone may also take place, for example, via a functional group in the para position with respect to the anionic group in an aromatic six-membered carbon ring. In addition, an aromatic six-membered carbon ring provides the option for easily binding further substituents which increase the ion conductivity.

Within the scope of one particular embodiment of this specific embodiment, negatively charged group Q$^-$ therefore stands for a benzenesulfonylimide group, for example a para- and/or ortho- and/or meta-benzenesulfonylimide group, for example a para-benzenesulfonylimide group, and/or for a benzenesulfonate group, for example a benzenesulfonate group, for example a para- and/or ortho- and/or meta-benzenesulfonate group, for example a para-benzenesulfonate group. Benzenesulfonylimide groups and/or benzenesulfonate groups, for example a para-, ortho-, and/or meta-benzenesulfonylimide group and/or a para-, ortho-, and/or meta-benzenesulfonate group, in particular a para-benzenesulfonylimide group and/or a para-benzenesulfonate group, may be particularly advantageous as explained above.

Such polymers, in particular as a lithium ion-conductive electrolyte, for example a solid electrolyte, may be employed or used in a particularly advantageous manner in a cathode material, for example containing a sulfur-carbon composite, for example a composite made of an in particular electrically conductive polymer and sulfur, in particular a sulfur-polyacrylonitrile (PAN) composite, for example SPAN, as cathode active material, for example in a lithium-sulfur cell.

Within the scope of one particular embodiment of this specific embodiment, Q$^-$ stands for a sulfonylimide group, for example a benzenesulfonylimide group. By use of the weak anion, coordination of cations, in particular lithium ions, which is comparatively weak and which thus increases the ion mobility, in particular lithium ion mobility, and ion conductivity, in particular lithium ion conductivity, may thus advantageously be achieved.

Within the scope of another particular embodiment of this specific embodiment, Q⁻ stands for a sulfonate group, for example a benzenesulfonate group.

If Q includes a positively charged group Q⁺, the at least one polymer electrolyte or the at least one polymer may contain, for example, a repeating unit of the general chemical formula:

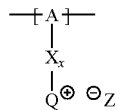

Within the scope of another particular specific embodiment, positively charged group Q⁺ therefore stands for a group based on a cation of an ionic liquid, in particular a pyridinium group or an in particular quaternary ammonium group or an imidazolium group or a piperidinium group or a pyrrolidinium group or an in particular phosphonium group or a guanidinium group or a morpholinium group or a uronium group or a thiouronium group. For example, all common counterions of known lithium salts, in particular lithium conducting salts, may be used as counterion Z. In particular, Z⁻ may therefore stand for an anion, in particular a lithium conducting salt anion. Groups Q⁺ based on a cation of an ionic liquid, in particular pyridinium groups, ammonium groups, imidazolium groups, piperidinium groups, pyrrolidinium groups, phosphonium groups, guanidinium groups, morpholinium groups, uronium groups, and/or thiouronium groups, may advantageously increase the dissociation of alkali ions, in particular lithium ions, and thus the ion conductivity, in particular the lithium ion conductivity, and the dielectric constant may be increased and the polysulfide solubility may thus be reduced.

A pyridinium group may be understood in particular to mean an in particular substituted or unsubstituted group that is derivable from pyridinium. An ammonium group may be understood in particular to mean a group, in particular a quaternary ammonium group, that is derivable from ammonium. An imidazolium group may be understood in particular to mean an in particular substituted or unsubstituted group that is derivable from imidazolium. A piperidinium group may be understood in particular to mean an in particular substituted or unsubstituted group that is derivable from piperidinium. A pyrrolidinium group may be understood in particular to mean an in particular substituted or unsubstituted group that is derivable from pyrrolidinium. A phosphonium group may be understood in particular to mean a group, in particular a quaternary phosphonium group, that is derivable from phosphonium. A guanidinium group may be understood in particular to mean an in particular substituted or unsubstituted group that is derivable from guanidinium. A morpholinium group may be understood in particular to mean an in particular substituted or unsubstituted group that is derivable from morpholinium. A uronium group may be understood in particular to mean an in particular substituted or unsubstituted group that is derivable from uronium. A thiouronium group may be understood in particular to mean an in particular substituted or unsubstituted group that is derivable from thiouronium.

For example, positively charged group Q⁺ may stand for a pyridinium group or an in particular quaternary ammonium group or an imidazolium group or a piperidinium group or a pyrrolidinium group or an in particular quaternary phosphonium group or a guanidinium group or a morpholinium group or a uronium group or a thiouronium group whose proton/s is/are substituted by a substituent.

In particular, positively charged group Q⁺ may stand for a pyridinium group or an in particular quaternary ammonium group or an imidazolium group or a piperidinium group or a pyrrolidinium group or an in particular quaternary phosphonium group. For example, Q⁺ may stand for an in particular quaternary ammonium group or an imidazolium group or a pyridinium group. The ion conductivity and the dielectric constant may thus advantageously be increased in a comparatively simple way.

Within the scope of one embodiment of this specific embodiment, Z⁻ stands for a lithium conducting salt anion. Dissociation of a lithium conducting salt may thus advantageously be increased, and the mobility of the lithium ions of the lithium conducting salt and thus the lithium ion conductivity may also be increased in this way.

For example, Z⁻ may stand for perchlorate (ClO₄⁻), tetrafluoroborate (BF₄⁻), trifluoromethanesulfonate (triflate⁻, F₃CSO₃⁻), bisoxalatoborate (BOB⁻:

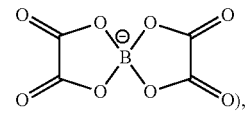

hexafluorophosphate (PF₆⁻), bromide (Br⁻), iodide (I⁻), or chloride (Cl⁻), (bis)trifluoromethanesulfonylimide (TFSI⁻: F₃C—SO₂—(N⁻)—SO₂—CF₃), or difluorooxalatoborate (DFOB⁻:

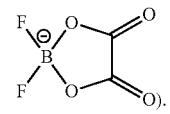

These anions are often used as a lithium conducting salt anion. These anions may therefore be used in a particularly advantageous manner for solvating lithium conducting salts.

Within the scope of one embodiment of this specific embodiment, Z⁻ therefore stands for perchlorate and/or trifluoromethanesulfonate and/or tetrafluoroborate and/or bisoxalatoborate and/or hexafluorophosphate, and/or bis(trifluoromethanesulfonyl)imide and/or bis(perfluoroethanesulfonyl)imide and/or bis(fluorosulfonyl)imide, in particular bis(trifluoromethanesulfonyl)imide, and/or difluorooxalatoborate (⁻DFOB) and/or bromide and/or iodide and/or chloride. In particular, Z⁻ may stand for bis(trifluoromethanesulfonyl)imide and/or bis(perfluoroethanesulfonyl)imide and/or bis(fluorosulfonyl)imide, in particular bis(trifluoromethanesulfonyl)imide, trifluoromethanesulfonate, and/or tetrafluoroborate, and/or bisoxalatoborate and/or difluorooxalatoborate (⁻DFOB), and/or bromide and/or iodide and/or chloride. Higher thermal stability may advantageously be achieved in this way.

Within the scope of one particular embodiment, Z⁻ stands for bis(trifluoromethanesulfonyl)imide (TFSI⁻: F₃C—SO₂—(N⁻)—SO₂—CF₃) and/or bis(perfluoroethanesulfonyl)imide (BETI⁻: F₅C₂—SO₂—(N⁻)—SO₂—C₂F₅) and/or bis(fluorosulfonyl)imide (FSI: F—SO₂—(N⁻)—SO₂—F), in particular bis(trifluoromethanesulfonyl)imide and/or trifluoromethanesulfonate (triflate, SO₃—CF₃). By use of the large, weak anions bis(trifluoromethanesulfonyl)imide and/ or bis(perfluoroethanesulfonyl)imide and/or bis(fluorosulfonyl)imide and/or trifluoromethanesulfonate, in particular bis(trifluoromethanesulfonyl)imide (TFSI⁻), coordination of cations, in particular lithium ions, which is comparatively weak, and which thus increases the ion mobility, in particular lithium ion mobility, and ion conductivity, in particular lithium ion conductivity, may advantageously be achieved, and for example the solubility of conducting salts in the polymer or polymer electrolyte and also optionally the thermal stability may be improved.

Such polymers or polymer electrolytes, in particular as lithium ion-conductive electrolyte, for example solid electrolyte, may be employed or used in a particularly advantageous manner in a cathode material, for example containing sulfur-carbon composite, for example a composite made of an in particular electrically conductive polymer and sulfur, in particular containing a sulfur-polyacrylonitrile (PAN) composite, for example SPAN, as cathode active material, for example in a lithium-sulfur cell.

If Q is a neutral group, the at least one polymer electrolyte or the at least one polymer may contain, for example, a repeating unit of the general chemical formula:

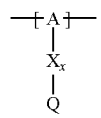

Due to an uncharged group Q, the alkali ions, in particular lithium ions, may advantageously be coordinated or solvated by conducting salts, for example alkali salts, in particular lithium conducting salts, and the mobility of the alkali ions, for example lithium ions, and thus the ion conductivity, in particular the lithium ion conductivity, of the polymer or polymer electrolyte may thus be increased. This may be facilitated, for example, by the selection of spacer X.

Within the scope of another particular specific embodiment, uncharged group Q stands for a group that is derivable in particular from an electrolyte solvent, for example a cyclic carbonate group or an in particular cyclic lactone group or a cyclic carbamate group or an acyclic carbonate group or an acyclic carboxylic acid ester group or an acyclic carbamate group or an alkylene oxide group, in particular an oligoalkylene oxide group. A cyclic carbonate group or lactone group or cyclic carbamate group or acyclic carbonate group or acyclic carboxylic acid ester group or acyclic carbamate group or alkylene oxide group, for example an oligoalkylene oxide group, may be advantageous, since the mobility of alkali ions, for example lithium ions, and thus the ion conductivity, in particular the lithium ion conductivity, of the polymer or polymer electrolyte may advantageously be increased in this way.

Within the scope of one particular embodiment of this specific embodiment, Q stands for an alkylene oxide group, in particular an oligoalkylene oxide group. It is thus advantageously possible to reduce the glass [transition] temperature and/or increase the lithium ion conductivity.

Within the scope of another embodiment of this specific embodiment, uncharged group Q stands for a cyclic carbonate group or a lactone group or a cyclic carbamate group or an acyclic carbonate group or an acyclic carboxylic acid ester group or an acyclic carbamate group. Due to the high polarity of these groups, they may advantageously increase the ion dissociation and the dielectric constant of the polymer or polymer electrolyte, and thus advantageously reduce the polysulfide solubility, which may be particularly advantageous, in particular for sulfur-polyacrylonitrile composites such as SPAN.

Within the scope of another embodiment of this specific embodiment, uncharged group Q stands for an in particular cyclic or acyclic carboxylic acid ester group, for example a lactone group, or an in particular cyclic or acyclic carboxylic acid ester group. Due to the high polarity of these groups, they may advantageously increase the dielectric constant of the polymer or polymer electrolyte and thus advantageously reduce the polysulfide solubility, which may be particularly advantageous, in particular for sulfur-polyacrylonitrile composites such as SPAN.

Within the scope of another embodiment of this specific embodiment, the in particular uncharged group Q stands for a cyclic carbonate group or a lactone group or a carbamate group, in particular a cyclic carbamate group or an acyclic carbamate group. In particular, Q may stand for a cyclic carbonate group or an in particular cyclic lactone group or a cyclic carbamate group. Cyclic carbonate groups, lactone groups, and/or cyclic carbamate groups may be particularly advantageous for increasing the overall ion conductivity of the polymer.

Within the scope of one particular embodiment of this specific embodiment, Q stands for a cyclic carbonate group, for example which forms a five-membered ring or a six-membered ring or a seven-membered ring, in particular a five-membered ring. Within the scope of another particular embodiment of this specific embodiment, Q stands for a lactone group, for example which forms a five-membered ring or a six-membered ring or a seven-membered ring, in particular a five-membered ring. Within the scope of another particular embodiment of this specific embodiment, Q stands for a cyclic carbamate group, for example which forms a five-membered ring or a six-membered ring or a seven-membered ring, in particular a five-membered ring. Within the scope of another particular embodiment of this specific embodiment, Q stands for an acyclic carbamate group.

Within the scope of another particular specific embodiment, Q stands for hydrogen or an alkyl group, in particular a methyl group or an ethyl group.

Such polymers or polymer electrolytes, in particular as a lithium ion-conductive electrolyte, for example a solid electrolyte, may be employed or used in a particularly advantageous manner as cathode active material in a cathode material, for example containing a sulfur-carbon composite, for example a composite made of an in particular electrically conductive polymer and sulfur, in particular a sulfur-polyacrylonitrile (PAN) composite, for example SPAN, for example in a lithium-sulfur cell.

Within the scope of another specific embodiment, the cathode material or the at least one polymer electrolyte or the at least one polymer also includes at least one conducting salt, in particular a lithium conducting salt. The ion conductivity, in particular the lithium ion conductivity, may thus optionally be further increased. Depending on the polymer, a small admixture of a conducting salt, in particular a lithium conducting salt, may be advantageous, despite a large transfer number, in order to reduce the glass transition temperature of the polymer and thus increase the overall mobility of the lithium ions in the system, which, however, may occur at the expense of a reduction of the transfer number. Ideally, in this case a conducting salt, in particular a lithium conducting salt, whose anion interacts well with group Q may be used. For example, lithium bis(trifluoromethanesulfonyl) imide (LiTFSI) may be used when there is a sulfonylimide group.

The at least one conducting salt may, for example, be a lithium conducting salt or a sodium conducting salt, in particular a lithium conducting salt. Common lithium conducting salts may be used as lithium conducting salt. For example, the at least one lithium conducting salt may include or be lithium hexafluorophosphate (LiPF$_6$) and/or lithium bis(trifluoromethanesulfonyl)imide (LiTFSI) and/or lithium bisoxalatoborate (LiBOB) and/or trifluoromethanesulfonate (Li triflate) and/or lithium perchlorate (LiClO$_4$) and/or lithium difluorooxalatoborate (LiDFOB) and/or lithium tetrafluoroborate (LiBF$_4$) and/or lithium bromide (LiBr) and/or lithium iodide (LiI) and/or lithium chloride (LiCl). Anion $Z^-$ and the anion of the at least one lithium conducting salt may be different or identical.

Within the scope of one embodiment of this specific embodiment, the anion of the at least one conducting salt, in particular lithium conducting salt, and $Z^-$ or $Q^-$ are selected from the same anion class, for example the sulfonylimides, for example trifluoromethanesulfonylimide and/or pentafluoroethanesulfonylimide and/or fluorosulfonylimide, in particular trifluoromethanesulfonylimide. Undesirable side reactions may thus advantageously be avoided, and in particular the anion of the at least one conducting salt and $Z^-$ or $Q^-$ alkali ions, in particular lithium ions, may be strongly coordinated in a similar manner, for example identically, which may have an advantageous effect on the ion mobility.

Within the scope of another specific embodiment, the at least one polymer electrolyte includes at least one in particular ion-conductive or ion-conducting, for example lithium ion-conductive or lithium ion-conducting, polymer which includes at least one repeating unit of the general chemical formula:

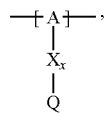

where Q stands for a negatively charged group $Q^-$ and a counterion $Z^+$, in particular a lithium ion, and/or
spacer X includes at least one, optionally additional, negatively charged group $Q^-$, in particular based on a conducting salt anion, in particular a lithium conducting salt anion, and/or an anion of an ionic liquid and/or a sulfonate group, in particular at least one sulfonylimide group and/or at least one sulfonate group, and a counterion $Z^+$, for example an alkali ion, in particular a lithium ion.

Within the scope of another, alternative or additional specific embodiment, the at least one polymer electrolyte includes at least one in particular ion-conductive or ion-conducting, for example lithium ion-conductive or lithium ion-conducting, polymer which includes at least one repeating unit of the general chemical formula:

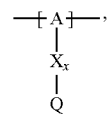

where Q stands for a positively charged group $Q^+$ and a counterion $Z^-$, and/or spacer X includes at least one, optionally additional, positively charged group $Q^+$, in particular based on a cation of an ionic liquid, for example at least one ammonium ion group and/or at least one pyridinium group and/or at least one imidazolium group and/or at least one piperidinium group and/or at least one pyrrolidinium group and/or at least one phosphonium group and/or at least one guanidinium group and/or at least one morpholinium group and/or at least one uronium group and/or at least one thiouronium group, and a counterion Z, for example a conducting salt anion, in particular a lithium conducting salt anion. The ion dissociation, for example of the conducting salt and/or inorganic ion conductor, and thus the ion conductivity, may advantageously be increased by use of positively charged groups $Q^+$. However, such polymers are only ion-conductive, in particular lithium ion-conductive, and should be used in combination, for example in a mixture, with at least one conducting salt, in particular lithium conducting salt.

Within the scope of another, alternative or additional specific embodiment, the at least one polymer electrolyte includes at least one in particular ion-conductive or ion-conducting, for example lithium ion-conductive or lithium ion-conducting, polymer, the at least one polymer including a polyalkylene oxide, for example polyethylene oxide, and/or a polymer containing at least one alkylene oxide group, for example ethylene oxide group, in particular oligoalkylene oxide group, for example oligoethylene oxide group, and/or at least one repeating unit of the general chemical formula:

where Q stands for an uncharged group Q, in particular an alkylene oxide group, in particular an oligoalkylene oxide group, for example an ethylene oxide group, for example an oligoethylene oxide group, and/or
spacer X includes at least one alkylene oxide group, in particular an oligoalkylene oxide group, for example an ethylene oxide group, for example an oligoethylene oxide group, and/or
polymer backbone-forming unit -[A]- includes an alkylene oxide unit, for example an oligoalkylene oxide unit, in particular an ethylene oxide unit, for example an oligoethylene oxide unit. The cathode material may include in particular at least one conducting salt, in particular lithium conducting salt. The ion mobility and thus the ion conductivity may advantageously be increased by use of alkylene oxide units or groups and/or uncharged groups Q. However, such polymers are only ion-conductive, in particular lithium ion-conductive, and should be used in combination, for example in a mixture, with at least one conducting salt, in particular lithium conducting salt.

Within the scope of one particular specific embodiment, Q stands for a negatively charged group $Q^-$ and a counterion $Z^+$, or Q stands for a positively charged group $Q^+$ and a counterion $Z^-$. This has proven to be particularly advantageous, since the ion dissociation may be increased and the polysulfide solubility may be reduced in this way. Repeating units which include a negatively charged group $Q^-$ and a counterion $Z^+$ and/or which include a positively charged group Q⁺ and a counterion Z⁻ may [be used] in a particularly advantageous manner in combination with uncharged, ion-conductive or ion-conducting, groups, for example alkylene oxide groups and/or cyclic and/or acyclic carbonate groups and/or cyclic and/or acyclic carboxylic acid ester groups, for example lactone groups and/or cyclic and/or acyclic carbamate groups, in particular alkylene oxide groups such as oligoalkylene oxide- groups and/or polyethers, since the ion dissociation is increased by negatively charged group Q⁻ or positively charged group Q⁺, and the ion mobility may be further increased by uncharged group Q, which overall may result in a significant increase in the ion conductivity, for example the lithium ion conductivity.

Within the scope of another specific embodiment, spacer X includes at least one in particular substituted or unsubstituted, saturated or unsaturated, linear or branched, alkylene group and/or at least one in particular substituted or unsubstituted, saturated or unsaturated, linear or branched, alkylene oxide group and/or at least one in particular substituted or unsubstituted phenylene oxide group, for example an oligophenylene oxide group, in particular having ≥1 or ≥2 to ≤10 repeating units, and/or at least one in particular substituted or unsubstituted phenylene group, for example oligophenylene group, in particular having ≥1 or ≥2 to ≤10 repeating units, and/or at least one in particular substituted or unsubstituted benzylene group, for example an oligobenzylene group, in particular having ≥1 or ≥2 to ≤10 repeating units, and/or at least one carbonyl group, in particular ketone group, for example alkylcarbonyl group, and/or at least one cyclic carbonate group and/or at least one lactone group and/or at least one cyclic carbamate group and/or at least one acyclic carbonate group and/or at least one acyclic carboxylic acid ester group and/or at least one acyclic carbamate group and/or at least one ether oxygen and/or at least one positively charged group, for example at least one in particular quaternary ammonium ion group and/or at least one pyridinium group and/or at least one imidazolium group and/or at least one piperidinium group and/or at least one pyrrolidinium group and/or at least one in particular quaternary phosphonium group and/or at least one guanidinium group and/or at least one morpholinium group and/or at least one uronium group and/or at least one thiouronium group, and/or at least one negatively charged group, for example at least one sulfonate group and/or trifluoromethanesulfonylimide group, for example at least one lithium sulfonate group and/or lithium trifluoromethanesulfonylimide group, in particular a lithium benzenesulfonate group and/or a lithium trifluoromethanesulfonylimidebenzene group. Spacer X may also include a combination of these groups. The ion conductivity of the polymer or polymer electrolyte may advantageously be increased overall by such a spacer X, for example via which the polymer backbone may be optimized with regard to other properties. As the result of introducing at least one, optionally additional, cyclic carbonate group and/or lactone group and/or cyclic carbamate group and/or acyclic carbonate group and/or acyclic carboxylic acid ester group and/or acyclic carbamate group and/or positively charged group, in particular based on a cation of an ionic liquid, for example an in particular quaternary ammonium ion group and/or a pyridinium group and/or an imidazolium group and/or a piperidinium group and/or a pyrrolidinium group and/or an in particular quaternary phosphonium group and/or a guanidinium group and/or a morpholinium group and/or a uronium group and/or a thiouronium group, and/or a negatively charged group, for example a sulfonylimide group and/or sulfonate group, into spacer X, the ion conductivity may advantageously be further increased, in particular as described in conjunction with corresponding groups Q, Q⁺, and Q⁻.

Within the scope of one embodiment of this specific embodiment, spacer X includes at least one in particular substituted or unsubstituted, saturated or unsaturated, linear or branched, alkylene oxide group, in particular oligoalkylene oxide group. Spacer X may include, for example, at least one for example substituted or unsubstituted, saturated or unsaturated, linear or branched, ethylene oxide group and/or propylene oxide group, in particular oligoethylene oxide group and/or oligopropylene oxide group. In particular, spacer X may include at least one for example substituted or unsubstituted, saturated or unsaturated, linear or branched, ethylene oxide group, in particular oligoethylene oxide group. The ion mobility may advantageously be increased in this way. This may be particularly advantageous in the case of a positively charged group Q⁺ and/or in the case of a negatively charged group Q⁻, in particular in order to mobilize dissociated ions and thus increase the ion conductivity.

The at least one alkylene oxide group of spacer X may in particular be partially or completely halogenated, in particular fluorinated, for example perfluorinated. Due to halogenation, in particular fluorination, for example perfluorination, the solubility of polysulfides by the polymer or the polymer electrolyte, in particular by alkylene oxide groups, may advantageously be reduced, which may be particularly advantageous when used in combination with a sulfur-carbon composite, for example a sulfur-polymer composite and/or carbon modification composite, in particular a sulfur-polymer composite containing sulfur which is bound, for example covalently and/or ionically, in particular covalently, to the polymer of the composite, for example a sulfur-polyacrylonitrile composite, for example a SPAN composite, as cathode material.

Within the scope of another alternative or additional embodiment of this specific embodiment, spacer X includes at least one carbonyl group, in particular at least one cyclic carbonate group and/or at least one lactone group and/or at least one cyclic carbamate group and/or at least one acyclic carbonate group and/or at least one acyclic carboxylic acid ester group and/or at least one acyclic carbamate group. In particular, spacer X may include at least one acyclic carbonate group. The ion mobility may likewise advantageously be increased in this way. This may be particularly advantageous in the case of a positively charged group Q⁺ and/or in the case of a negatively charged group Q⁻, in particular in order to mobilize dissociated ions and thus increase the ion conductivity.

Within the scope of another alternative or additional embodiment of this specific embodiment, spacer X includes at least one, optionally additional, positively charged group Q⁺, in particular based on a cation of an ionic liquid, for example at least one ammonium ion group and/or at least one pyridinium group and/or at least one imidazolium group and/or at least one piperidinium group and/or at least one pyrrolidinium group and/or at least one phosphonium group and/or at least one guanidinium group and/or at least one morpholinium group and/or at least one uronium group and/or at least one thiouronium group. Spacer X may include, for example, at least one ammonium group and/or at least one pyridinium group and/or at least one imidazolium group, for example at least one ammonium group and/or at least one pyridinium group, and a counterion Z⁻, for example a conducting salt anion, in particular a lithium conducting salt anion. The at least one, optionally additional, positively charged group Q⁺ of the spacer may be configured in particular as described above, in particular within the scope of positively charged groups $Q^+$ which are bound via spacer X. The ion dissociation may advantageously be increased in this way. This may be particularly advantageous in the case of a positively charged group $Q^+$ and/or in the case of an uncharged group Q, in particular in order to further increase the ion conductivity and further reduce the polysulfide solubility.

Within the scope of another alternative or additional embodiment of this specific embodiment, spacer X includes at least one, optionally additional, negatively charged group $Q^-$ and a counterion $Z^+$, for example an alkali ion, for example a lithium ion and/or sodium ion, in particular a lithium ion. The at least one, optionally additional, negatively charged group $Q^-$ of the spacer may be configured in particular as described above, in particular within the scope of negatively charged groups $Q^-$ which are bound via spacer X. For example, the at least one, optionally additional, negatively charged group $Q^-$ of spacer X may be a group based on a conducting salt anion, in particular a lithium conducting salt anion, and/or an anion of an ionic liquid and/or a sulfonate group. For example, spacer X may include at least one sulfonylimide group, for example at least one trifluoromethanesulfonylimide group and/or perfluoroethanesulfonylimide group and/or fluorosulfonylimide group, in particular at least one trifluoromethanesulfonylimide group, and/or at least one sulfonate group. The ion dissociation may advantageously be increased in this way. This may be particularly advantageous in the case of a negatively charged group $Q^-$ and/or in the case of an uncharged group Q, in particular in order to further increase the ion conductivity and further reduce the polysulfide solubility.

The at least one alkylene group of spacer X may have a chain length, for example, of $\geq 1$ to $\leq 16$ carbon atoms, in particular $\geq 1$ to $\leq 13$ carbon atoms, for example $\geq 1$ to $\leq 4$ carbon atoms or $\geq 4$ to $\leq 8$ carbon atoms and/or $\geq 9$ to $\leq 13$ carbon atoms. For example, the alkylene group of spacer X may stand [for] a saturated alkylene group, for example of the general chemical formula: $—(CH_2)_{a1}—$, where $1 \leq a1 \leq 15$, for example $1 \leq a1 \leq 12$, for example $1 \leq a1 \leq 3$.

The at least one alkylene oxide group of spacer X may be an ethylene oxide group and/or a propylene oxide group, for example. In particular, the at least one alkylene oxide group may be an oligoalkylene oxide group, for example an oligoethylene oxide group and/or oligopropylene oxide group. In particular, the alkylene oxide group or oligoalkylene oxide group may have $\geq 1$ or $\geq 2$ to $\leq 10$ repeating units, for example $\geq 1$ or $\geq 2$ to $\leq 4$ repeating units. For example, the at least one alkylene oxide unit may have the general chemical formula: $—[CH_2—CH_2—O—]_b$, where $1 \leq b \leq 10$, for example $1 \leq$ or $2 \leq b \leq 4$.

The bonding of the at least one alkylene oxide group of spacer X to polymer backbone -[A]- and group Q, for example the pyridinium group, ammonium group, imidazolium group, piperidinium group, pyrrolidinium group, phosphonium group, guanidinium group, morpholinium group, uronium group, thiouronium group, cyclic carbonate group, lactone group, cyclic carbamate group, acyclic carbonate group, acyclic carboxylic acid ester group, acyclic carbamate group, sulfonylimide group, or sulfonate group, may take place in each case via an in particular saturated and/or unsaturated, linear or branched, alkylene group, for example a methylene group and/or an alkoxy group. Spacer X may be, for example, an alkyl-alkylene oxide-alkyl group, for example an alkyl-oligoalkylene oxide-alkyl group, for example of the general chemical formula: $—(CH_2)_{a1}—[CH_2—CH_2—O—]_{b1}—(CH_2)_{a1'}—$, where $1 \leq a1 \leq 12$, in particular $1 \leq a1 \leq 3$, $1 \leq b1 \leq 10$, in particular $1 \leq$ or $2 \leq b1 \leq 4$, and $1 \leq a1' \leq 12$, in particular $1 \leq a1' \leq 3$, or an alkoxy-alkylene oxide-alkyl group, for example an alkoxy-oligoalkylene oxide-alkyl group, for example of the general chemical formula: $—(CH_2)_{a2}—O—[CH_2—CH_2—O—]_{b2}—(CH_2)_{a2'}—$, where $1 \leq a2 \leq 12$, in particular $1 \leq a2 \leq 3$, $1 \leq b2 \leq 10$, in particular $1 \leq$ or $2 \leq b2 \leq 4$, and $1 \leq a2' \leq 12$, in particular $1 \leq a2' \leq 3$.

The at least one phenylene oxide group and/or the at least one phenylene group and/or the at least one benzylene group of spacer X may be substituted in particular with one or multiple alkyl side chain/s and/or one or multiple alkylene oxide side chain/s, for example oligoalkylene oxide side chain/s, for example oligoethylene oxide side chain/s and/or oligopropylene oxide side chain/s, and/or one or multiple cyclic carbonate group/s and/or lactone group/s and/or cyclic carbamate group/s and/or acyclic carbonate group/s and/or acyclic carboxylic acid ester group/s and/or acyclic carbamate group/s and/or one or multiple charged groups, for example quaternary ammonium ion group/s and/or pyridinium group/s and/or imidazolium group/s and/or piperidinium group/s and/or pyrrolidinium group/s and/or in particular quaternary phosphonium group/s and/or guanidinium group/s and/or morpholinium group/s and/or uronium group/s and/or thiouronium group/s and/or sulfonylimide group/s and/or sulfonate group/s, for example lithium sulfonate groups. In this way the ion conductivity may advantageously be further increased, as described particular in conjunction with corresponding groups Q, $Q^+$, and $Q^-$. For example, spacer X may include one or multiple phenylene oxide group/s and/or phenylene group/s and/or benzylene group/s. An in particular saturated and/or unsaturated, linear or branched, for example partially or completely halogenated or unhalogenated, for example partially fluorinated or perfluorinated, or unfluorinated, alkylene group and/or alkylene oxide group, for example oligoalkylene oxide group, for example oligoethylene oxide group and/or oligopropylene oxide group, may be inserted (in each case) between phenylene oxide groups and/or phenylene groups and/or benzylene groups of spacer X.

The bonding of the at least one carbonyl group of spacer X to polymer backbone -[A]- and group Q, for example the cyclic carbonate group, lactone group, cyclic carbamate group, acyclic carbonate group, acyclic carboxylic acid ester group, acyclic carbamate group, pyridinium group, ammonium group, imidazolium group, piperidinium group, pyrrolidinium group, phosphonium group, guanidinium group, morpholinium group, uronium group, thiouronium group, sulfonylimide group, or sulfonate group, may take place in each case via an in particular saturated and/or unsaturated, linear or branched, for example partially or completely halogenated or unhalogenated, for example partially fluorinated or perfluorinated, or unfluorinated, alkylene group and/or alkylene oxide group, for example oligoalkylene oxide group, for example oligoethylene oxide group and/or oligopropylene oxide group.

For example, spacer X may include one or multiple (analogous to Q, for example) cyclic carbonate group/s and/or lactone group/s and/or cyclic carbamate group/s and/or acyclic carbonate group/s and/or acyclic carboxylic acid ester group/s and/or acyclic carbamate group/s and/or (analogous to $Q^+$, for example) ammonium ion group/s and/or pyridinium group/s and/or imidazolium group/s and/or piperidinium group/s and/or pyrrolidinium group/s and/or phosphonium group/s and/or guanidinium group/s and/or morpholinium group/s and/or uronium group/s and/or thiouronium group/s and/or (analogous to Q⁻, for example) sulfonylimide group/s and/or sulfonate group/s, for example benzenesulfonylimide group/s and/or benzenesulfonate group/s. The bonding of the cyclic carbonate group, lactone group, cyclic carbamate group, acyclic carbonate group, acyclic carboxylic acid ester group, acyclic carbamate group, ammonium ion group, pyridinium group, imidazolium group, piperidinium group, pyrrolidinium group, phosphonium group, guanidinium group, morpholinium group, uronium group, thiouronium group, sulfonylimide group, or sulfonate group, for example benzenesulfonylimide group and/or benzenesulfonate group, of spacer X to polymer backbone -[A]- and/or to a further cyclic carbonate group, lactone group, cyclic carbamate group, acyclic carbonate group, acyclic carboxylic acid ester group, acyclic carbamate group, ammonium ion group, pyridinium group, imidazolium group, piperidinium group, pyrrolidinium group, phosphonium group, guanidinium group, morpholinium group, uronium group, thiouronium group, sulfonylimide group, or sulfonate group of spacer X and/or between a cyclic carbonate group, lactone group, cyclic carbamate group, acyclic carbonate group, acyclic carboxylic acid ester group, acyclic carbamate group, ammonium ion group, pyridinium group, imidazolium group, piperidinium group, pyrrolidinium group, phosphonium group, guanidinium group, morpholinium group, uronium group, thiouronium group, sulfonylimide group, or sulfonate group, for example benzenesulfonylimide group and/or benzenesulfonate group, of spacer X and/or to the, for example terminal, group Q, for example the cyclic carbonate group, lactone group, cyclic carbamate group, acyclic carbonate group, acyclic carboxylic acid ester group, acyclic carbamate group, pyridinium group, ammonium group, imidazolium group, piperidinium group, pyrrolidinium group, phosphonium group, guanidinium group, morpholinium group, uronium group, thiouronium group, sulfonylimide group, or sulfonate group may take place (in each case) in particular via an in particular saturated and/or unsaturated, linear or branched, for example partially or completely halogenated or unhalogenated, for example partially fluorinated or perfluorinated, or unfluorinated, alkylene group and/or alkylene oxide group, for example oligoalkylene oxide group, for example oligoethylene oxide group and/or oligopropylene oxide group.

For example, spacer X may be an in particular saturated and/or unsaturated, linear or branched, alkylene spacer. In the case of an alkylene spacer X, in particular in the saturated case, the number of carbon atoms in the spacer may be in particular ≥1 to ≤12, for example ≥1 to ≤4. For example, the alkylene spacer may be based on the general chemical formula: —$(CH_2)_{a1}$—, where $1 \leq a1 \leq 12$, in particular $1 \leq a1 \leq 3$.

Alternatively, spacer X may be, for example, an alkylene oxide spacer, for example an oligoalkylene oxide spacer, for example an oligoethylene oxide spacer or oligopropylene oxide spacer. In the case of a configuration as an oligoalkylene oxide spacer, the number of repeating units may be, for example, ≥2 to ≤10, in particular ≥2 to ≤4, repeating units. The bonding of the alkylene oxide unit, for example the oligoalkylene oxide unit, for example the oligoethylene oxide unit or oligopropylene oxide unit, to polymer backbone -[A]- or group Q, for example the cyclic carbonate group, lactone group, cyclic carbamate group, acyclic carbonate group, acyclic carboxylic acid ester group, acyclic carbamate group, pyridinium group, ammonium group, imidazolium group, piperidinium group, pyrrolidinium group, phosphonium group, guanidinium group, morpholinium group, uronium group, thiouronium group, sulfonylimide group, or sulfonate group, may take place in each case in particular via an in particular saturated and/or unsaturated, linear or branched, alkylene group, for example methylene groups. For example, the alkylene oxide spacer may be based on the general chemical formula: —$(CH_2)_{a3}$—[$CH_2$—$CH_2$—$O]_{b3}$—$(CH_2)_{a3}$—, where $1 \leq b3 \leq 10$, in particular $1 \leq b3 \leq 4$, and 1 or $0 \leq a3 \leq 3$, for example a3=1.

Alternatively, spacer X may be, for example, a spacer based on in particular substituted or unsubstituted phenylene oxide and/or phenylene and/or benzylene. In particular, the spacer may include multiple phenylene oxide units and/or phenylene units and/or benzylene units. An in particular saturated and/or unsaturated, linear or branched, for example partially or completely halogenated or unhalogenated, for example partially fluorinated or perfluorinated, or unfluorinated, alkylene group and/or alkylene oxide group, for example oligoalkylene oxide group, for example oligoethylene oxide group and/or oligopropylene oxide group, may be inserted (in each case) between phenylene oxide units and/or oligophenylene oxide units and/or phenylene units and/or oligophenylene units and/or benzylene units and/or oligobenzylene units of spacer X. A substitution may take place in particular with one or multiple alkyl side chain/s and/or one or multiple alkylene oxide side chain/s, for example oligoalkylene oxide side chain/s, for example oligoethylene oxide side chain/s and/or oligopropylene oxide side chain/s, and/or one or multiple cyclic carbonate group/s and/or lactone group/s and/or cyclic carbamate group/s and/or acyclic carbonate group/s and/or acyclic carboxylic acid ester group/s and/or acyclic carbamate group/s and/or one or multiple charged groups, for example quaternary ammonium group/s and/or pyridinium group/s and/or imidazolium group/s and/or piperidinium group/s and/or pyrrolidinium group/s and/or for example quaternary phosphonium group/s and/or guanidinium group/s and/or morpholinium group/s and/or uronium group/s and/or thiouronium group/s and/or sulfonylimide group/s and/or sulfonate group/s, for example lithium sulfonylimide group/s and/or lithium sulfonate group/s.

Alternatively, spacer X may be, for example, a carbonyl spacer, for example an alkylene/alkylene oxide-carbonyl-alkylene/alkylene oxide spacer.

Alternatively, spacer X may be an ether oxygen (—O—), for example.

Within the scope of one particular embodiment, spacer X is an alkylene and/or alkylene oxide spacer, for example an alkylene and/or oligoalkylene oxide spacer, for example an ethylene oxide and/or oligoethylene oxide spacer.

Within the scope of another specific embodiment, -[A]- stands for a polymer backbone-forming unit which includes (at least) one alkylene oxide unit, in particular ethylene oxide unit (PEO) and/or propylene oxide unit, for example oligoalkylene oxide unit, for example oligoethylene oxide unit and/or oligopropylene oxide unit, and/or a unit which includes a carbonate group, in particular an organic carbonate group, and/or a siloxane unit and/or a phosphazene unit and/or a methyl methacrylate unit and/or a methacrylate unit and/or a phenylene unit and/or a phenylene oxide unit and/or a benzylene unit and/or an alkylene unit.

For example, -[A]- may stand for a polymer backbone-forming unit which includes and/or forms a polyether, in particular polyethylene oxide (PEO) and/or polypropylene oxide, and/or repeating units which include polymerized, in particular organic, carbonate group/s, for example a polycarbonate and/or a polymer made up of polymer backbone-forming structural units with side groups which contain carbonate groups, and/or a polysiloxane and/or a polyphosphazene and/or a poly(methyl) methacrylate and/or a polymethacrylate and/or a polyphenylene, for example a para-polyphenylene, and/or a polyphenylene oxide and/or a polybenzylene and/or a polyolefin, for example polypropylene and/or polyethylene. For example, -[A]- may stand for a polymer backbone-forming unit which is based on a polyether, in particular polyethylene oxide (PEO) and/or polypropylene oxide, and/or repeating units which include polymerized, in particular organic, carbonate group/s, and/or a polysiloxane and/or a polyphosphazene and/or a poly(methyl) methacrylate and/or a polymethacrylate and/or a polyphenylene, for example a para-polyphenylene, and/or a polyphenylene oxide and/or a polybenzylene and/or a polyolefin, for example polypropylene and/or polyethylene.

Within the scope of one particular specific embodiment, polymer backbone-forming unit -[A]- includes (at least) one siloxane. A low glass transition temperature of the polymer and thus a high ion conductivity may advantageously be achieved in this way.

Within the scope of another, in particular alternative or additional, particular specific embodiment, polymer backbone-forming unit -[A]- includes (at least) one phosphazene unit. A low glass transition temperature of the polymer and thus a high ion conductivity may likewise advantageously be achieved in this way.

Within the scope of another, in particular alternative or additional, particular specific embodiment, polymer backbone-forming unit -[A]- includes (at least) one methyl methacrylate unit and/or one methacrylate unit. These may advantageously be more easily synthetically obtainable than phosphazenes.

Within the scope of another, in particular alternative or additional, particular specific embodiment, polymer backbone-forming unit -[A]- includes (at least) one phenylene unit. In particular, polymer backbone-forming unit -[A]- may include (at least) one para-phenylene unit. Electrical conductivity may advantageously be additionally achieved in this way. In addition, phenylene units or polyphenylenes may easily be singly or multiply substituted, for example sulfonated. In particular, multiple sulfonations of the phenylene unit and/or of the polyphenyl polymer backbone formed therefrom are also possible. For example, polymer backbone-forming unit -[A]- may include (at least) one phenylene oxide unit. Groups Q, $Q^+$, and/or $Q^-$ may advantageously be easily bound via the oxygen, optionally via a spacer X. For example, polymer backbone-forming unit -[A]- may include or be an at least singly sulfonated, for example multiply sulfonated, phenylene unit. For example, the polymer or the polyelectrolyte may include or be a polyphenylene, for example para-polyphenylene, which is substituted [with] a sulfonate group, in particular a lithium sulfonate group, for example which includes at least one phenylene repeating unit that is at least singly substituted with sulfonate groups, in particular lithium sulfonate groups, for example with multiple sulfonate groups, in particular lithium sulfonate groups. This has proven to be advantageous, since the number of anionic units and thus, lithium ion charge carriers per phenylene unit, may be increased in this way. In addition to the phenylene unit substituted [with] sulfonate groups, polymer backbone-forming unit -[A]-, for example in the form of a polyphenylene, may also include one or multiple other phenylene units, for example an unsubstituted phenylene unit and/or a phenylene unit that is singly or multiply substituted in each case with a group Q, for example $Q^+$ or $Q^-$ or Q, and a spacer X, in particular $X_x$.

Within the scope of another, in particular alternative or additional, particular specific embodiment, polymer backbone-forming unit -[A]- includes (at least) one benzylene unit.

Within the scope of another, in particular alternative or additional, particular specific embodiment, polymer backbone-forming unit -[A]- includes (at least) one alkylene unit.

Within the scope of another, in particular alternative or additional, particular specific embodiment, polymer backbone-forming unit -[A]- includes (at least) one alkylene oxide unit, in particular ethylene oxide unit (PEO) and/or propylene oxide unit, for example oligoalkylene oxide unit, for example oligoethylene oxide unit and/or oligopropylene oxide unit, in particular oligoethylene oxide unit. The ion mobility and thus the ion conductivity may advantageously be increased in this way.

Within the scope of another, in particular alternative or additional, particular specific embodiment, polymer backbone-forming unit -[A]- includes (at least) one unit which includes a carbonate group, in particular an organic carbonate group. It is thus advantageously possible to increase the polarity of the polymer backbone and thus positively influence, in particular reduce, the polysulfide solubility. Polymerized repeating units which include in particular organic carbonate groups may, for example, form a polycarbonate, i.e., a polyester whose polymer backbone includes carbonate groups that are linked via a condensation reaction, for example, in particular esterified. Alternatively or additionally, however, polymerized repeating units which include in particular organic carbonate groups may also form a polymer made up of polymer backbone-forming structural units with side groups which contain in particular organic carbonate groups. The overall ion conductivity of the polymer may advantageously be increased due to the side groups which contain carbonate groups. The formed polymer backbone may itself include carbonate groups, and may be a polycarbonate, for example, or may also be free of carbonate groups, in particular containing no polycarbonate. For example, polymer backbone-forming unit -[A]- may include a unit with a polymer backbone-forming structural unit and with a side group which contains a carbonate group. The side group containing the carbonate group may be bound, for example, to an atom of the polymer backbone-forming structural unit. However, the side group containing the carbonate group, for example in the form of a five-membered ring or six-membered ring or seven-membered ring, in particular a five-membered ring, may also, for example, be bound cyclically to the polymer backbone-forming structural unit, in particular to two atoms of the polymer backbone-forming structural unit. In particular, a carbonate group may form a side group that is cyclically bound to the polymer backbone-forming structural unit. For example, polymer backbone-forming unit -[A]- may include a unit with a polymer backbone-forming structural unit and with a carbonate group, the carbonate group forming a side group that is cyclically bound to the polymer backbone-forming structural unit. For example, the carbonate group may be bound to two atoms of the polymer backbone-forming structural unit via two oxygen atoms, and (together with atoms of the polymer backbone-forming structural unit) may form, for example, a five-membered ring or six-membered ring or seven-membered ring, in particular a five-membered ring.

Polymer backbone-forming unit -[A]- may be monofunctionalized or also polyfunctionalized, for example bifunctionalized, trifunctionalized, or tetrafunctionalized, with group Q which is bound via spacer X. A polyfunctionalized polymer backbone-forming unit -[A]- may be understood in particular to mean a polymer backbone-forming unit -[A]- that is functionalized with at least two groups Q, for example $Q^+$ and/or $Q^-$ and/or Q, in particular a group Q, for example $Q^+$ or $Q^-$ or Q, in each case being bound to polymer backbone-forming unit -[A]-, optionally via a spacer X, in particular $X_x$.

Several general chemical formulas are presented below by way of example, on which polymer backbone-forming unit -[A]- or repeating unit ([A]-X-Q):

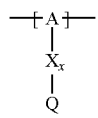

and, for example, also polymer backbone-forming units -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$], -[$A_b$]-[$A_c$]-, -[$A_d$]-, -[$A_e$]-, -[$A_f$]-, -[$A_Z$]-, or -[$A_{Z1}$]-, and particular repeating units, described below, may be based. In the case of provision of a polymer backbone-forming unit -[A]-, xq may (in each case) stand for a binding site to which the or (in each case) a group Q is bound to polymer backbone-forming unit -[A]-, for example via a spacer X, in particular $X_x$ (in the case x=[sic; ≠]0, bound indirectly, or in the case x=0, bound directly, via the spacer). In the case of provision of a repeating unit ([A]-X-Q), xq may stand for XQ, i.e., the or (in each case) a spacer X, in particular $X_x$, and the or (in each case) a group Q, for example $Q^+$ or $Q^-$ or Q.

For example, polymer backbone-forming unit -[A]- or repeating unit ([A]-X-Q) may include or be an alkylene oxide unit, for example an ethylene oxide unit, of the general chemical formula:

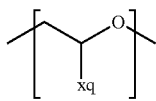

and/or a propylene oxide repeating unit of the general chemical formula:

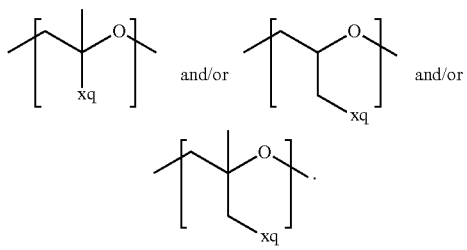

Alternatively or additionally, polymer backbone-forming unit -[A]- or repeating unit ([A]-X-Q) may include or be a repeating unit with a polymer backbone-forming structural unit and with a carbonate group, of the following general chemical formula, which is cyclically bound to the polymer backbone-forming structural unit:

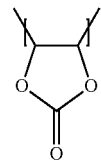

Alternatively or additionally, polymer backbone-forming unit -[A]- or repeating unit ([A]-X-Q) may include or be a siloxane unit of the general chemical formula:

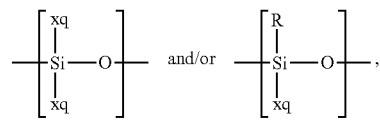

in particular where R stands for an alkyl group, for example a methyl, ethyl, and/or propyl group, for example a methyl group. For example, polymer backbone-forming unit -[A]- or repeating unit ([A]-X-Q) may include or be a siloxane unit of the general chemical formula:

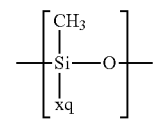

Alternatively or additionally, polymer backbone-forming unit -[A]- or repeating unit ([A]-X-Q) may include or be a phosphazene unit of the general chemical formula:

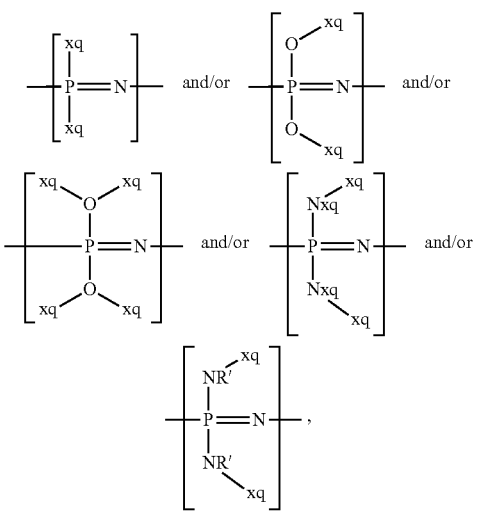

in particular where R' stands for hydrogen or (preferably) for an alkyl group, for example a methyl, ethyl, and/or propyl group, for example a methyl group.

Alternatively or additionally, polymer backbone-forming unit -[A]- or repeating unit ([A]-X-Q) may include or be a methyl methacrylate unit of the general chemical formula:

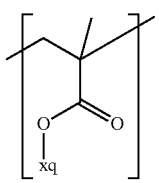

Alternatively or additionally, polymer backbone-forming unit -[A]- or repeating unit ([A]-X-Q) may include or be a methacrylate unit of the general chemical formula:

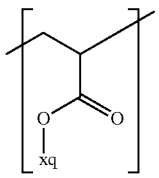

Alternatively or additionally, polymer backbone-forming unit -[A]- or repeating unit ([A]-X-Q) may include or be a phenylene unit of the general chemical formula:

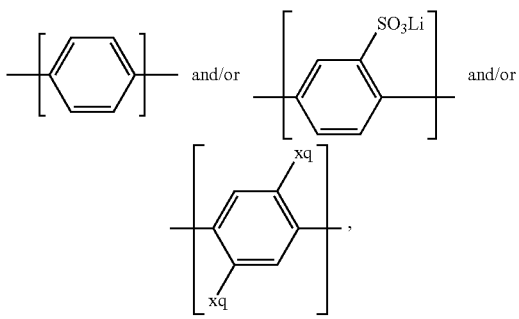

for example

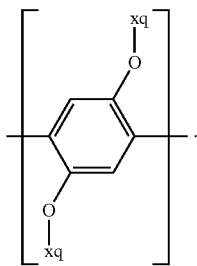

Alternatively or additionally, polymer backbone-forming unit -[A]- or repeating unit ([A]-X-Q) may include or be an ethylene unit of the general chemical formula:

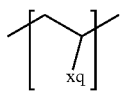

and/or a propylene unit of the general chemical formula:

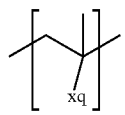

For example, polymer backbone-forming unit -[A]- may include (at least) one unit with a polymer backbone-forming structural unit and with a side group which contains a carbonate group. The overall ion conductivity of the polymer may thus advantageously be increased. The side group containing the carbonate group may be bound, for example, to an atom of the polymer backbone-forming structural unit. For example, polymer backbone-forming unit -[A]- may be (at least) one unit with a polymer backbone-forming structural unit and a carbonate group, which forms a side group that is cyclically bound to the polymer backbone-forming structural unit. For example, the carbonate group may be bound to two atoms of the polymer backbone-forming structural unit via two oxygen atoms, and (together with the polymer backbone-forming structural unit) may form, for example, a five-membered ring or six-membered ring or seven-membered ring, in particular a five-membered ring.

Within the scope of one particular specific embodiment, polymer backbone-forming unit -[A]- includes (at least) one siloxane unit and/or one phosphazene unit and/or one methyl methacrylate unit and/or one methacrylate unit and/or one phenylene unit, in particular one para-phenylene unit. In particular, polymer backbone-forming unit -[A]- may include (at least) one siloxane unit and/or one phosphazene unit and/or one methyl methacrylate unit and/or one methacrylate unit. Within the scope of one particular embodiment, polymer backbone-forming unit -[A]-includes (at least) one methyl methacrylate unit and/or one methacrylate unit and/or one siloxane unit. A low glass transition temperature of the polymer and thus a high ion conductivity may advantageously be achieved by use of phosphazenes and/or siloxanes. Methyl methacrylate and/or methacrylate may advantageously allow simplification of the synthesis. Electrical conductivity may advantageously be additionally achieved by use of phenylene units. In addition, phenylene units or polyphenylenes may easily be singly or multiply substituted, for example sulfonated.

Within the scope of another specific embodiment, polymer backbone-forming unit -[A]- includes (at least) one polyfunctionalized, for example bifunctionalized, siloxane unit, and/or one phosphazene unit that is polyfunctionalized, for example bifunctionalized or tetrafunctionalized, for example, or polyfunctionalized, for example tetrafunctionalized, by branching in one or multiple side chains, and/or one polyfunctionalized, for example bifunctionalized, methyl methacrylate unit, and/or one polyfunctionalized, for example bifunctionalized, methacrylate unit, and/or one polyfunctionalized, for example bifunctionalized, phenylene unit. Within the scope of one particular embodiment of this specific embodiment, polymer backbone-forming unit -[A]- includes (at least) one polyfunctionalized, for example bifunctionalized, siloxane unit, and/or one phosphazene unit that is polyfunctionalized, for example bifunctionalized or tetrafunctionalized, for example, or polyfunctionalized, for example tetrafunctionalized, by branching in one or multiple side chains. Within the scope of one particularly preferred embodiment of this specific embodiment, polymer backbone-forming unit -[A]- includes (at least) one polyfunctionalized, for example bifunctionalized, siloxane unit. The polymer may thus advantageously be easily provided with multiple groups Q.

Within the scope of another specific embodiment, polymer backbone-forming unit -[A]- or subsequently described polymer backbone-forming units -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-[$A_e$]-, -[$A_f$]-, -[$A_Z$]-, or -[$A_{Z1}$]-, and/or spacer X or subsequently described spacers ($X_I$), ($X_{II}$), ($X_{III}$), ($X_{IV}$), ($X_V$) ($X_{VI}$), ($X_{VII}$), ($X_{VIII}$), ($X_{IX}$), ($X_a$), ($X_b$), ($X_c$), ($X_d$), ($X_e$), ($X_f$), or ($X_Z$), and/or group Q, for example $Q^+$ and/or $Q^-$ and/or Q, is/are in particular partially or completely halogenated, for example fluorinated, optionally perfluorinated. In particular (at least) alkylene oxide groups and/or alkylene groups and/or alkyl groups and/or alkoxy groups may be halogenated, in particular fluorinated, optionally perfluorinated. The solubility of polysulfides by the polymer may advantageously be reduced by fluorinating in particular alkylene oxide groups such as ethylene oxide groups and/or propylene oxide groups, and/or polyethers and/or alkyl groups and/or alkylene groups and/or alkoxy groups. In turn, dissolving out of polysulfides from the cathode active material, for example a sulfur-carbon composite, for example a sulfur-polymer composite, in particular a sulfur-polyacrylonitrile composite such as SPAN, and thus active material loss, may thus advantageously be reduced or avoided, and the performance, cycle stability, and service life of a lithium-sulfur cell thus equipped or an energy system thus equipped, for example a lithium-sulfur battery, may be improved in this way. Fluorination may also have a positive influence on the transfer number, and may in particular increase the transfer number.

Within the scope of another specific embodiment, spacer X or subsequently described spacers ($X_I$), ($X_{II}$), ($X_{III}$), ($X_{IV}$), ($X_V$), ($X_{VI}$), ($X_{VII}$), ($X_{VIII}$), ($X_{IX}$), ($X_a$), ($X_b$), ($X_c$), ($X_d$), ($X_e$), ($X_f$), ($X_Z$), or ($X_{Z1}$), and/or polymer backbone-forming unit -[A]- or subsequently described polymer backbone-forming units -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]-, and/or group Q or $Q^+$ or $Q^-$, or groups R10-R213 described in greater detail below, therefore include(s) a fluorinated, in particular perfluorinated, alkylene oxide unit, for example an ethylene oxide unit and/or propylene oxide unit, in particular an ethylene oxide unit, for example an oligoalkylene oxide unit, for example an oligoethylene oxide unit and/or oligopropylene oxide unit, in particular an oligoethylene oxide unit. Spacer X or subsequently described spacers ($X_I$), ($X_{II}$), ($X_{III}$), ($X_{IV}$), ($X_V$), ($X_{VI}$), ($X_{VII}$), ($X_{VIII}$), ($X_{IX}$), ($X_a$), ($X_b$), ($X_c$), ($X_d$), ($X_e$), ($X_f$), ($X_Z$), or ($X_{Z1}$), and/or polymer backbone-forming unit -[A]- or subsequently described polymer backbone-forming units -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]-, and/or group Q or $Q^+$ or $Q^-$, or groups R10-R213 described in greater detail below, may optionally be free of unfluorinated alkylene oxide units, for example ethylene oxide units and/or propylene oxide units, in particular ethylene oxide units, for example oligoalkylene oxide units, for example oligoethylene oxide units and/or oligopropylene oxide units, in particular oligoethylene oxide units. A cathode-side polysulfide solubility which is reduced compared to use of unfluorinated ether-based liquid electrolytes, such as dimethoxyethane (DME) or dioxolane (DOL) and mixtures thereof, may advantageously be achieved by use of a polymer electrolyte, in particular which is not based or is only partially based on unfluorinated polyethylene oxide, for example which is not based on unfluorinated polyethylene oxide or which is based on fluorinated, in particular perfluorinated, polyethylene oxide. The capacity and thus the service life of the cell may advantageously be significantly improved in this way.

Within the scope of another, alternative or additional, specific embodiment, spacer X or subsequently described spacers ($X_I$), ($X_{II}$), ($X_{III}$), ($X_{IV}$), ($X_V$), ($X_{VI}$), ($X_{VII}$), ($X_{VIII}$), ($X_{IX}$), ($X_a$), ($X_b$) ($X_c$), ($X_d$), ($X_e$), ($X_f$), ($X_Z$), or ($X_{Z1}$), and/or polymer backbone-forming unit -[A]- or subsequently described polymer backbone-forming units -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]-, and/or group Q or $Q^+$ or $Q^-$, or groups R10-R213 described in greater detail below, is/are perfluorinated. The solubility of polysulfides by the polymer may in particular be advantageously reduced in this way.

Within the scope of one embodiment, the in particular uncharged group Q stands for a group, in particular a cyclic carbonate group, of the general chemical formula:

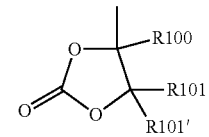

Within the scope of another embodiment, the in particular uncharged group Q stands for a group, in particular a lactone group, of the general chemical formula:

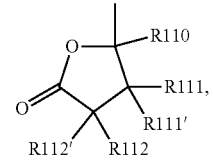

for example

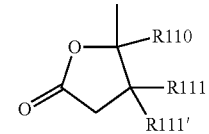

Within the scope of another embodiment, the in particular uncharged group Q stands for a group, in particular a cyclic carbamate group, of the general chemical formula:

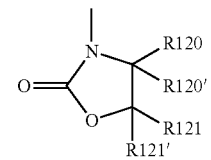

Within the scope of another embodiment, the in particular uncharged group Q stands for a group, in particular an ethylene oxide group, of the general chemical formula:

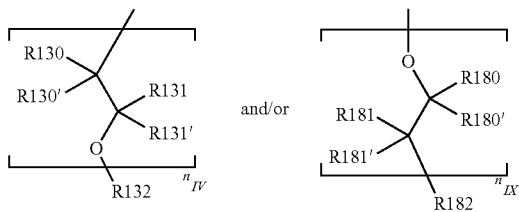

In this regard, $N_{IV}$ or $N_{IX}$ stands for the number of ethylene oxide units and is in particular $1 \leq n_{IV} \leq 15$, for example $2 \leq n_{IV} \leq 6$, or $1 \leq n_{IX} \leq 15$, for example $2 \leq n_{IX} \leq 6$.

Within the scope of another embodiment, the in particular uncharged group Q stands for a group, in particular an acyclic carbonate group, of the general chemical formula:

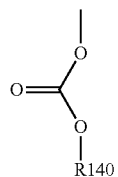

Within the scope of another embodiment, the in particular uncharged group Q stands for a group, in particular an acyclic carboxylic acid ester group, of the general chemical formula:

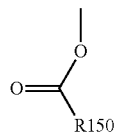

Within the scope of another embodiment, the in particular uncharged group Q stands for a group, in particular an acyclic carbamate group, of the general chemical formula:

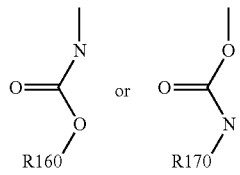

Within the scope of another embodiment, the in particular positively charged group $Q^+$ stands for a group, in particular a pyridinium group, of the general chemical formula:

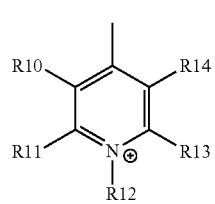

Within the scope of another embodiment, the in particular positively charged group $Q^+$ stands for a group, in particular a quaternary ammonium group, of the general chemical formula:

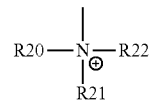

Within the scope of another embodiment, the in particular positively charged group $Q^+$ stands for a group, in particular an imidazolium group of the general chemical formula:

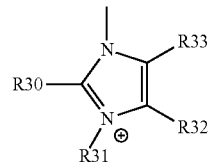

Within the scope of another embodiment, the in particular positively charged group $Q^+$ stands for a group, in particular a piperidinium group, of the general chemical formula:

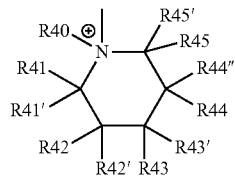

Within the scope of another embodiment, the in particular positively charged group $Q^+$ stands for a group, in particular a pyrrolidinium group, of the general chemical formula:

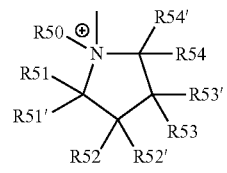

Within the scope of another embodiment, the in particular positively charged group $Q^+$ stands for a group, in particular a quaternary phosphonium group, of the general chemical formula:

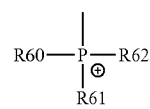

Within the scope of another embodiment, the in particular negatively charged group $Q^-$ stands for a group, in particular a para-benzenesulfonylimide group, for example a para-trifluoromethanesulfonylimide benzene group, of the general

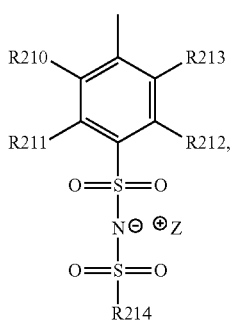

for example

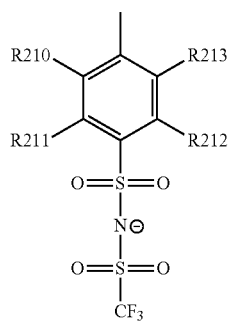

Within the scope of another embodiment, the in particular negatively charged group $Q^-$ stands for a group, in particular a para-benzenesulfonate group, of the general chemical formula:

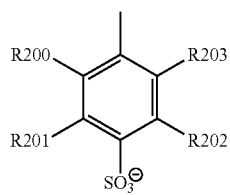

R10, R11, R12, R13, and/or R14, or R30, R31, R32 and/or R33, or R40, R41, R41', R42, R42', R43, R43', R44, R44', R45, and/or R45', or R50, R51, R51', R52, R52', R53, R53', R54, and/or R54', or R100, R101, and/or R101', or R110, R111, R111', R112, and/or R112', or R120, R120', R121, and/or R121', or R130, R130', R131, R131', and/or R132, or R140 or R150 or R160 or R170, or R180, R180', R181, R181' and/or R182, or R200, R201, R202, and/or R203, or R210, R211, R212, R213, and/or R214, may in each case independently stand for hydrogen and/or an in particular substituted or unsubstituted, saturated or unsaturated, linear or branched, alkyl group, in particular having a chain length of ≥1 to ≤16 carbon atoms, and/or an in particular substituted or unsubstituted, saturated or unsaturated, linear or branched, alkylene oxide group, for example an ethylene oxide group or propylene oxide group, in particular an oligoalkylene oxide group, for example an oligoethylene oxide group or oligopropylene oxide group, in particular with ≥1 or ≥2 to ≤10 repeating units, and/or a halogen atom, in particular fluorine, and/or an in particular substituted or unsubstituted, saturated or unsaturated, linear or branched, alkoxy group, for example having a carbon chain length of ≥1 to ≤16 carbon atoms, and/or an in particular substituted or unsubstituted phenylene oxide group, for example an oligophenylene oxide group, in particular with ≥1 or ≥2 to ≤10 repeating units, and/or an in particular substituted or unsubstituted phenoxy group and/or an in particular substituted or unsubstituted phenylene group, for example an oligophenylene group, in particular with ≥1 or ≥2 to ≤10 repeating units, and/or an in particular substituted or unsubstituted phenyl group and/or an in particular substituted or unsubstituted benzylene group, for example an oligobenzylene group, in particular with ≥1 or ≥2 to ≤10 repeating units, and/or an in particular substituted or unsubstituted benzyl group and/or a carbonyl group, in particular a ketone group, for example an alkylcarbonyl group, and/or an in particular cyclic and/or acyclic carbonate group, and/or an in particular cyclic and/or acyclic carboxylic acid ester group, in particular a lactone group, and/or an in particular cyclic and/or acyclic carbamate group, and/or in particular in the case of R41, R41', R42, R42', R43, R43', R44, R44', R45, and/or R45', or R51, R51', R52, R52', R53, R53', R54, and/or R54', or R100, R101, and/or R101', or R110, R111, R111', R112, and/or R112', or R120, R120', R121, and/or R121', or R130, R130', R131, R131', and/or R132, or R140 or R150 or R160 or R170, or R180, R180', R181, R181', and/or R182, or R200, R201, R202, and/or R203, or R210, R211, R212, R213, and/or R214, may stand for a charged group, for example a positively charged group, for example based on a cation of an ionic liquid, for example a quaternary ammonium group and/or a quaternary phosphonium group, and/or a negatively charged group, for example based on a conducting salt anion, in particular a lithium conducting salt anion, and/or an anion of an ionic liquid, for example a sulfonylimide group, and/or a sulfonate group, for example a lithium sulfonylimide group and/or lithium sulfonate group.

R20, R21, and/or R22 or R60, R61, and/or R62 may in each case independently stand for an in particular substituted or unsubstituted, saturated or unsaturated, linear or branched, alkyl group, in particular having a chain length of ≥1 to ≤16 carbon atoms, and/or an in particular substituted or unsubstituted, saturated or unsaturated, linear or branched, alkylene oxide group, for example an ethylene oxide group or propylene oxide group, in particular an oligoalkylene oxide group, for example an oligoethylene oxide group or oligopropylene oxide group, in particular with ≥1 or ≥2 to ≤10 repeating units, and/or an in particular substituted or unsubstituted, saturated or unsaturated, linear or branched, alkoxy group, for example having a carbon chain length of ≥1 to ≤16 carbon atoms, and/or an in particular substituted or unsubstituted phenylene oxide group, for example an oligophenylene oxide group, in particular with ≥1 or ≥2 to ≤10 repeating units, and/or an in particular substituted or unsubstituted phenoxy group and/or an in particular substituted or unsubstituted phenylene group, for example an oligophenylene group, in particular with ≥1 or ≥2 to ≤10 repeating units, and/or an in particular substituted or unsubstituted phenyl group and/or an in particular substituted or unsubstituted benzylene group, for example an oligobenzylene group, in particular with ≥1 or ≥2 to ≤10 repeating units, and/or an in particular substituted or unsubstituted benzyl group and/or a carbonyl group, in particular a ketone group, for example an alkylcarbonyl group, and/or an in particular cyclic and/or acyclic carbonate group, and/or an in particular cyclic and/or acyclic carboxylic acid ester group, in particular a lactone group, and/or an in particular cyclic and/or acyclic carbamate group.

Within the meaning of the present invention, an alkyl group or an alkylene group or an alkylene oxide group or an ethylene oxide group or a propylene oxide group or an oligoalkylene oxide group or an oligoethylene oxide group or an oligopropylene oxide group or an alkoxy group or a phenylene oxide group or an oligophenylene oxide group or a phenoxy group or a phenylene group or an oligophenylene group or a phenyl group or a benzylene group or an oligobenzylene group or a benzyl group may be understood in particular to mean a particular group which may be substituted or also unsubstituted.

With regard to R10, R11, R12, R13, R14, R20, R21, R22, R30, R31, R32, R33, R40, R41, R41', R42, R42', R43, R43', R44, R44', R45, R45', R50, R51, R51', R52, R52', R53, R53', R54, R54', R60, R61, R62, R100, R101, R101', R110, R111, R111', R112, R112', R120, R120', R121, R121', R130, R130', R131, R131', R132, R140, R150, R160, R170, R180, R180', R181, R181', R182, R200, R201, R202, R203, R210, R211, R212, R213, and/or R214, an alkyl group or alkoxy group may for example have a carbon chain length of ≥1 to ≤16 carbon atoms, for example a carbon chain length of ≥1 to ≥4 carbon atoms and/or ≥4 to ≤8 carbon atoms and/or ≥9 to ≤13 carbon atoms. In particular, an alkyl group may be a saturated alkyl group, for example of the general chemical formula: —$(CH_2)_a$—$CH_3$, where $1 \leq a \leq 15$.

With regard to R10, R11, R12, R13, R14, R20, R21, R22, R30, R31, R32, R33, R40, R41, R41', R42, R42', R43, R43', R44, R44', R45, R45', R50, R51, R51', R52, R52', R53, R53', R54, R54', R60, R61, R62, R100, R101, R101', R110, R111, R111', R112, R112', R120, R120', R121, R121', R130, R130', R131, R131', R132, R140, R150, R160, R170, R180, R180', R181, R181', R182, R200, R201, R202, R203, R210, R211, R212, R213, and/or R214, an alkylene oxide group, for example an ethylene oxide group or propylene oxide group, in particular an oligoalkylene oxide group, for example an oligoethylene oxide group or oligopropylene oxide group, or a phenylene oxide group, for example an oligophenylene oxide group, or a phenylene group, for example an oligophenylene group, or a benzylene group, for example an oligobenzylene group, may have for example ≥1 or ≥2 to ≤10 repeating units, for example ≥1 or ≥2 to ≤4 repeating units. For example, an alkylene oxide unit may have the general chemical formula: —$[CH_2$—$CH_2$—$O$—$]_b$, where $1 \leq b \leq 10$, for example $1 \leq$ or $2 \leq b \leq 4$.

With regard to R10, R11, R12, R13, R14, R20, R21, R22, R30, R31, R32, R33, R40, R41, R41', R42, R42', R43, R43', R44, R44', R45, R45', R50, R51, R51', R52, R52', R53, R53', R54, R54', R60, R61, R62, R100, R101, R101', R110, R111, R111', R112, R112', R120, R120', R121, R121', R130, R130', R131, R131', R132, R140, R150, R160, R170, R180, R180', R181, R181', R182, R200, R201, R202, R203, R210, R211, R212, R213, and/or R214, combinations of these groups, for example an alkyl-alkylene oxide group, for example an alkyl-oligoalkylene oxide group, for example of the general chemical formula: $H_3C$—$(CH_2)_{a1*}$—$[CH_2$—$CH_2$—$O$—$]_{b1*}$—, where $0 \leq a1* \leq 15$, in particular $0 \leq a1* \leq 3$, and $1 \leq b1* \leq 10$, in particular $1 \leq$ or $2 \leq b1* \leq 4$, or an alkyl-alkylene oxide-alkyl group, for example an alkyl-oligoalkylene oxide-alkyl group, or an alkoxy-alkylene oxide group, for example an alkoxy-oligoalkylene oxide group, or an alkoxy-alkylene oxide-alkyl group, for example an alkoxy-oligoalkylene oxide-alkyl group, for example of the general chemical formula: $H_3C$—$(CH_2)_{a2*}$—$O$—$[CH_2$—$CH_2$—$(O$—$]_{b2}*$—$(CH_2)_{a2*'}$-, where $0 \leq a2* \leq 15$, in particular $0 \leq a2* \leq 3$, $0 \leq a2*' \leq 15$, in particular $0 \leq a2*' \leq 3$, and $1 \leq b2* \leq 10$, in particular $1 \leq$ or $2 \leq b2* \leq 4$, are also possible.

For example, R100, R101, and/or R101', or R110, R111, R111', R112, and/or R112', for example R110, R111, and/or R111', or R120, R120', R121, and/or R121', or R130, R130', R131, and/or R131', or R150, or R180, R180', R181, R181', and/or R182, or R10, R11, R13, and/or R14, or R30, R32, and/or R33, or R41, R41', R42, R42', R43, R43', R44, R44', R45, and/or R45', or R51, R51', R52, R52', R53, R53', R54, and/or R54', or R200, R201, R202, and/or R203, or R210, R211, R212, R213, and/or R214 may in each case independently stand for hydrogen and/or a halogen atom, in particular fluorine, and/or an alkyl group and/or an alkylene oxide group, in particular an oligoalkylene oxide group, and/or an alkoxy group and/or a phenylene oxide group, in particular an oligophenylene oxide group, and/or a phenoxy group and/or a phenylene group, in particular an oligophenylene group, and/or a phenyl group and/or a benzylene group, in particular an oligobenzylene group, and/or a benzyl group and/or a carbonyl group, and/or an in particular cyclic and/or acyclic carbonate group, and/or an in particular cyclic and/or acyclic carboxylic acid ester group, in particular a lactone group, and/or an in particular cyclic and/or acyclic carbamate group, and/or a charged group, for example a positively charged group, in particular based on a cation of an ionic liquid, for example a quaternary ammonium group and/or a quaternary phosphonium group, and/or a negatively charged group, in particular based on a conducting salt anion, in particular a lithium conducting salt anion, and/or an anion of an ionic liquid, and/or a sulfonate group, for example a sulfonylimide group and/or a sulfonate group, for example a lithium sulfonylimide group and/or a lithium sulfonate group.

For example, R41, R41', R42, R42', R43, R43', R44, R44', R45, and/or R45', or R51, R51', R52, R52', R53, R53', R54, and/or R54', or R100, R101, and/or R101', or R110, R111, R111', R112, and/or R112', or R120, R120', R121, and/or R121', or R130, R130', R131, R131', and/or R132, or R140 or R150 or R160 or R170, or R180, R180', R181, R181', and/or R182 may stand for a positively charged group, in particular based on a cation of an ionic liquid, for example for a pyridinium group and/or a quaternary ammonium group and/or an imidazolium group and/or a piperidinium group and/or a pyrrolidinium group and/or a quaternary phosphonium group and/or a guanidinium group and/or a morpholinium group and/or a uronium group and/or a thiouronium group, for example a quaternary ammonium group and/or a quaternary phosphonium group. The ion conductivity may optionally be further improved in this way.

In particular, R200, R201, R202, and/or R203, or R210, R211, R212, R213, and/or R214 may stand for a negatively charged group, in particular based on a conducting salt anion, in particular a lithium conducting salt anion, and/or an anion of an ionic liquid, for example a sulfonylimide group, and/or a sulfonate group, for example a lithium sulfonylimide group and/or a lithium sulfonate group. For example, at least one of moieties R200, R201, R202, and R203, or R210, R211, R212, 213, and R214, for example at least two or three of moieties R200, R201, R202, and R203 or R210, R211, R212, R213, and R214, optionally all moieties R200, R201, R202, and R203, or R210, R211, R212, R213, and R214, may stand for a negatively charged group, in particular based on a conducting salt anion, in particular a lithium conducting salt anion, and/or an anion of an ionic liquid, for example a sulfonylimide group, and/or a sulfonate group, for example a lithium sulfonylimide group and/or a lithium sulfonate group. The ion conductivity may optionally be further improved in this way.

R132 or R140 or R160 or R170 or R12 or R20, R21, and R22, or R31 or R40 or R50, or R60, R61, and R62 may in each case independently stand for an alkyl group and/or an alkylene oxide group, in particular an oligoalkylene oxide group, and/or an alkoxy group and/or a phenylene oxide group, in particular an oligophenylene oxide group, and/or a phenoxy group and/or a phenylene group, in particular an oligophenylene group, and/or a phenyl group and/or a benzylene group, in particular an oligobenzylene group, and/or a benzyl group and/or a carbonyl group and/or an in particular cyclic and/or acyclic carbonate group and/or an in particular cyclic and/or acyclic carboxylic acid ester group, in particular a lactone group, and/or an in particular cyclic and/or acyclic carbamate group.

R132 may in particular stand for or an in particular cyclic and/or acyclic carbonate group, and/or an in particular cyclic and/or acyclic carboxylic acid ester group, in particular a lactone group, and/or an in particular cyclic and/or acyclic carbamate group, and/or an alkyl group, in particular a methyl group or an ethyl group, for example a methyl group. The ion conductivity may advantageously be further improved in this way.

R20 and/or R21, or R60 and/or R61, or R132 or R140 or R150 or R160 or R170 may in particular stand for an alkyl group, for example a methyl group or an ethyl group, in particular a methyl group, and/or an alkylene oxide group, in particular an oligoalkylene oxide group. The polymer may advantageously be optimized with regard to its ion-conducting function by use of a short-chain alkyl group such as a methyl group.

Within the scope of one particular embodiment, moieties R10, R11, R12, R13, and/or R14, or R20, R21, and/or R22, or R30, R31, R32, and/or R33, or R40, R41, R41', R42, R42', R43, R43', R44, R44', R45, and/or R45', or R50, R51, R51', R52, R52', R53, R53', R54, and/or R54', or R60, R61, and/or R62, or R100, R101, and/or R101', or R110, R111, R111', R112, and/or R112', or R120, R120', R121, and/or R121', or R130, R130', R131, R131', and/or R132, or R140 or R150 or R160 or R170, or R180, R180', R181, R181', and/or R182, or R200, R201, R202, and/or R203, or R210, R211, R212, R213, and/or R214 are partially or completely halogenated, in particular fluorinated. By halogenation, in particular fluorination, the polarity of the polymer may advantageously be influenced, and the solubility of polysulfides by the polymer, in particular by alkylene oxide groups, may possibly be reduced, which may be particularly advantageous when used in combination with a sulfur-carbon composite, for example a sulfur-polymer composite and/or carbon modification composite, in particular a sulfur-polymer composite containing sulfur which is bound, for example covalently and/or ionically, in particular covalently, to the polymer of the composite, for example a sulfur-polyacrylonitrile composite, for example a SPAN composite, as cathode material.

Within the scope of one alternative or additional embodiment, moieties R10, R11, R12, R13, and/or R14, or R20, R21, and/or R22, or R30, R31, R32, and/or R33, or R40, R41, R41', R42, R42', R43, R43', R44, R44', R45, and/or R45', or R50, R51, R51', R52, R52', R53, R53', R54, and/or R54', or R60, R61, and/or R62, or R100, R101, and/or R101', or R110, R111, R111', R112, and/or R112', or R120, R120', R121, and/or R121', or R130, R130', R131, R131', and/or R132, or R140 or R150 or R160 or R170, or R180, R180', R181, R181', and/or R182, or R200, R201, R202, and/or R203, or R210, R211, R212, R213, and/or R214 are substituted with at least one positively charged group, in particular based on a cation of an ionic liquid, for example an in particular quaternary ammonium group and/or an in particular quaternary phosphonium group, and/or with at least one negatively charged group, in particular based on a conducting salt anion, for example a lithium conducting salt anion, and/or an anion of an ionic liquid, for example with at least one sulfonylimide group, for example a lithium sulfonylimide group, and/or with at least one sulfonate group, for example a lithium sulfonate group. The ion conductivity may thus advantageously be further increased, in particular by ion dissociation or counterion solvation, for example lithium ion solvation. In particular, R10, R11, R12, R13, and/or R14, or R20, R21, and/or R22, or R30, R31, R32, and/or R33, or R40, R41, R41', R42, R42', R43, R43', R44, R44', R45, and/or R45', or R50, R51, R51', R52, R52', R53, R53', R54, and/or R54', or R60, R61, and/or R62 may be substituted with at least one positively charged group, or R200, R201, R202, and/or R203, or R210, R211, R212, R213, and/or R214, may be substituted with at least one negatively charged group, for example which may be configured in particular as described above, in particular within the scope of groups $Q^+$ or $Q^-$, in particular $Q^-$, which are bound via spacer X.

Within the scope of one alternative or additional embodiment, moieties R10, R11, R12, R13, and/or R14, or R20, R21, and/or R22, or R30, R31, R32, and/or R33, or R40, R41, R41', R42, R42', R43, R43', R44, R44', R45, and/or R45', or R50, R51, R51', R52, R52', R53, R53', R54, and/or R54', or R60, R61, and/or R62, or R100, R101, and/or R101', or R110, R111, R111', R112, and/or R112', or R120, R120', R121, and/or R121', or R130, R130', R131, R131', and/or R132, or R140 or R150 or R160 or R170, or R180, R180', R181, R181', and/or R182, or R200, R201, R202, and/or R203, or R210, R211, R212, R213, and/or R214 are substituted with at least one oxygen-containing group, for example alkoxy group and/or alkylene oxide group, for example oligoalkylene oxide group, for example oligoethylene oxide group and/or oligopropylene oxide group, and/or ketone group, for example alkylcarbonyl group, and/or carboxylic acid ester group. The ion conductivity may thus advantageously be further increased, since in particular oligoalkylene oxide groups, such as oligoethylene oxide groups, provide an option to, among other things, reduce the glass [transition] temperature of the polymer or polymer electrolyte.

Aromatic groups, such as phenylene groups and benzylene groups, advantageously provide multiple substitution positions which may be substituted with charged groups and/or oxygen-containing groups, and thus allow in particular the ion conductivity to be optimized.

For example, R10, R11, R13, and/or R14, or R30, R32, and/or R33, or R41, R41', R42, R42', R43, R43', R44, R44', R45, and/or R45', or R51, R51', R52, R52', R53, R53', R54, and/or R54', or R100, R101, and/or R101', or R110, R111, R111', R112, and/or R112', or R120, R120', R121, and/or R121', or R130, R130', R131, and/or R131', or R150, or R180, R180', R181, R181', and/or R182, or R200, R201, R202, and/or R203, or R210, R211, R212, R213, and/or R214 may therefore in each case, for example, independently stand for hydrogen and/or a partially or completely halogenated, in particular fluorinated, group, and/or may be substituted with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or with an alkyl group substituted with at least one oxygen-containing group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one alkylene oxide group substituted with an oxygen-containing group, for example an ethylene oxide group or propylene oxide group, in particular an oligoalkylene oxide group, for example an oligoethylene oxide group or oligopropylene oxide group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one alkoxy group substituted with an oxygen-containing group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one phenylene oxide group substituted with an oxygen-containing group, for example an oligophenylene oxide group, and/or a partially or completely halogenated, in particular fluorinated group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one phenoxy group substituted with an oxygen-containing group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one phenylene group substituted with an oxygen-containing group, for example an oligophenylene group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one phenyl group substituted with an oxygen-containing group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one benzylene group substituted with an oxygen-containing group, for example an oligobenzylene group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one benzyl group substituted with an oxygen-containing group, and/or a carbonyl group, in particular a ketone group, for example an alkylcarbonyl group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one in particular cyclic and/or acyclic carbonate group substituted with an oxygen-containing group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one in particular cyclic and/or acyclic carboxylic acid ester group substituted with an oxygen-containing group, in particular a lactone group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one in particular cyclic and/or acyclic carbamate group substituted with an oxygen-containing group. R12 or R20, R21, and/or R21, or R31 or R40 or R50, or R60, R61, and/or R62, or R132 or R140 or R160 or R170 may therefore in each case, for example, independently stand for a partially or completely halogenated, in particular fluorinated, group, and/or may be substituted with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one alkyl group substituted with an oxygen-containing group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one alkylene oxide group substituted with an oxygen-containing group, for example an ethylene oxide group or propylene oxide group, in particular an oligoalkylene oxide group, for example an oligoethylene oxide group or oligopropylene oxide group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one alkoxy group substituted with an oxygen-containing group and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one phenylene oxide group substituted with an oxygen-containing group, for example an oligophenylene oxide group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one phenoxy group substituted with an oxygen-containing group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one phenylene group substituted with an oxygen-containing group, for example an oligophenylene group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one phenyl group substituted with an oxygen-containing group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one benzylene group substituted with an oxygen-containing group, for example an oligobenzylene group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, substituted [with at least one] benzyl group [substituted with an oxygen-containing group], and/or a carbonyl group, in particular a ketone group, for example alkylcarbonyl group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one in particular cyclic and/or acyclic carbonate group substituted with an oxygen-containing group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one in particular cyclic and/or acyclic carboxylic acid ester group substituted with an oxygen-containing group, in particular a lactone group, and/or a partially or completely halogenated, in particular fluorinated, group, and/or with at least one positively charged group, in particular based on a cation of an ionic liquid, for example with at least one quaternary ammonium group and/or phosphonium group, and/or substituted with at least one negatively charged group, in particular based on a conducting salt anion, for example a lithium conducting salt anion, and/or an anion of an ionic liquid, for example with at least one lithium sulfonylimide group and/or lithium sulfonate group, and/or substituted with at least one in particular cyclic and/or acyclic carbamate group substituted with an oxygen-containing group.

For example, R100, R101, and/or R101', or R110, R111, R111', R112, and/or R112', or R120, R120', R121, and/or R121', or R130, R130', R131, and/or R131', or R150 or R180, R180', R181, R181', and/or R182, or R10, R11, R13, and/or R14, or R30, R32, and/or R33, or R41, R41', R42, R42', R43, R43', R44, R44', R45, and/or R45', or R51, R51', R52, R52', R53, R53', R54, and/or R54', or R200, R201, R202, and/or R203, or R210, R211, R212, R213, and/or R214 may in each case independently stand for hydrogen and/or a halogen atom, in particular fluorine, or an alkyl group and/or an alkylene oxide group, in particular an oligoalkylene oxide group, and/or an alkoxy group and/or a phenylene oxide group, in particular an oligophenylene oxide group, and/or a phenoxy group and/or a phenylene group, in particular an oligophenylene group, and/or a phenyl group and/or a benzylene group, in particular an oligobenzylene group, and/or a benzyl group and/or a carbonyl group, and/or an in particular cyclic and/or acyclic carbonate group, and/or an in particular cyclic and/or acyclic carboxylic acid ester group, in particular a lactone group, and/or an in particular cyclic and/or acyclic carbamate group, and/or a charged group, for example a positively charged group, in particular based on a cation of an ionic liquid, for example a quaternary ammonium group and/or a quaternary phosphonium group, and/or a negatively charged group, in particular based on a conducting salt anion, for example a lithium conducting salt anion, and/or an anion of an ionic liquid, and/or a sulfonate group, for example a lithium sulfonylimide group and/or lithium sulfonate group.

R132 or R140 or R160 or R170 or R12 or R20, R21 and R22, or R31 or R40 or R50, or R60, R61, and R62 may in each case independently stand for an alkyl group and/or an alkylene oxide group, in particular an oligoalkylene oxide group, and/or an alkoxy group and/or a phenylene oxide group, in particular an oligophenylene oxide group, and/or a phenoxy group and/or a phenylene group, in particular an oligophenylene group, and/or a phenyl group and/or a benzylene group, in particular an oligobenzylene group, and/or a benzyl group and/or a carbonyl group and/or an in particular cyclic and/or acyclic carbonate group, and/or an in particular cyclic and/or acyclic carboxylic acid ester group and/or an in particular cyclic and/or acyclic carbamate group.

Within the scope of one particular specific embodiment, the at least one polymer electrolyte or the at least one polymer includes at least one repeating unit, based on a cyclic carbonate, of the general chemical formula:

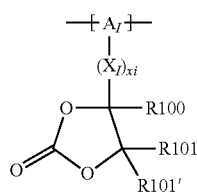

Within the scope of another, alternative or additional, particular specific embodiment, the at least one polymer electrolyte or the at least one polymer includes at least one repeating unit, based on a lactone, of the general chemical formula:

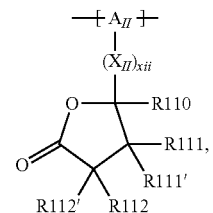

for example

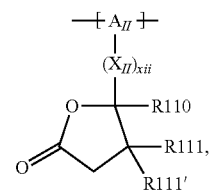

Within the scope of another, alternative or additional, particular specific embodiment, the at least one polymer electrolyte or the at least one polymer includes at least one repeating unit based on a cyclic carbamate, of the general chemical formula:

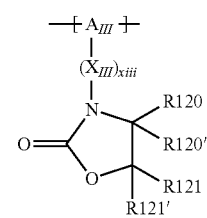

Within the scope of another, alternative or additional, particular specific embodiment, the at least one polymer electrolyte or the at least one polymer includes at least one repeating unit based on an alkylene oxide, in particular ethylene oxide, of the general chemical formula:

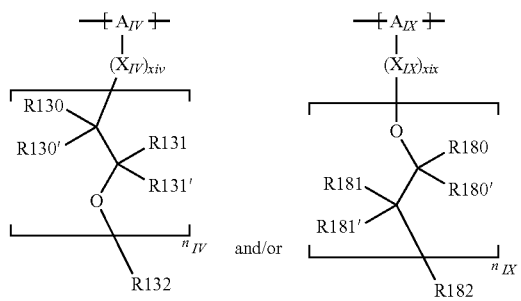

In this regard, $n_{IV}$ or $n_{IX}$ stands for the number of ethylene oxide units. For example, the following relationships may apply: $1 \leq n_{IV} \leq 15$, for example $2 \leq n_{IV} \leq 6$, or $1 \leq n_{IX} \leq 15$, for example $2 \leq n_{IX} \leq 6$.

Within the scope of another, alternative or additional, particular specific embodiment, the at least one polymer electrolyte or the at least one polymer includes at least one repeating unit based on based on an acyclic carbonate, of the general chemical formula:

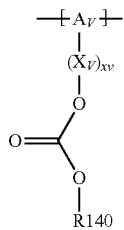

Within the scope of another, alternative or additional, particular specific embodiment, the at least one polymer electrolyte or the at least one polymer includes at least one repeating unit based on an acyclic carboxylic acid ester, of the general chemical formula:

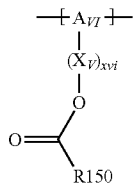

Within the scope of another, alternative or additional, particular specific embodiment, the at least one polymer electrolyte or the at least one polymer includes at least one repeating unit based on an acyclic carbamate, of the general chemical formula:

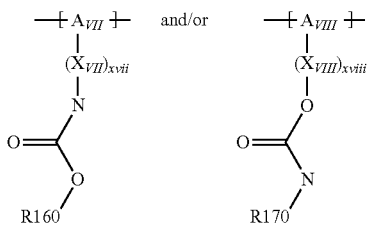

$-[A_I]-$, $-[A_{II}]-$, $-[A_{III}]-$, $-[A_{IV}]-$, $-[A_V]-$, $-[A_{VI}]-$, $-[A_{VII}]-$, $-[A_{VIII}]-$, or $-[A_{IX}]-$ stands in particular for a polymer backbone-forming unit. $(X_I)$, $(X_{II})$, $(X_{III})$, $(X_{IV})$, $(X_V)$, $(X_{VI})$, $(X_{VII})$, $(X_{VIII})$, or $(X_{IX})$ stands in particular for a spacer. xi, xii, xiii, xiv, xv, xvi, xvii, xviii, or xix stands for the number, in particular the presence or the absence, of (particular) spacers. In particular, xi, xii, xiii, xiv, xv, xvi, xvii, xviii, or xix may be 1 or 0, for example 1.

Polymer backbone-forming unit $-[A_I]-$, $-[A_{II}]-$, $-[A_{III}]-$, $-[A_{IV}]-$, $-[A_V]-$, $-[A_{VI}]-$, $-[A_{VII}]-$, $-[A_{VIII}]-$, or $-[A_{IX}]-$ may be configured, for example, as described in conjunction with polymer backbone-forming unit $-[A]-$. Spacer $(X_I)$, $(X_{II})$, $(X_{III})$, $(X_{IV})$, $(X_V)$, $(X_{VI})$, $(X_{VII})$, $(X_{VIII})$, or $(X_{IX})$ may be configured, for example, as described in conjunction with spacer X. R100, R101, R101', R110, R111, R111', R112, R112', R120, R120', R121, R121', R130, R130', R131, R131', R132, R140, R150, R160, R180, R180', R181, R181', R182, and/or R170 may likewise be configured, for example, as described above.

$X_I$ or $X_{II}$ or $X_{III}$ or $X_{IV}$ or $X_V$ or $X_{VI}$ or $X_{VII}$ or $X_{VIII}$ or $X_{IX}$ may, for example, stand for an in particular saturated or unsaturated, linear or branched, for example partially or completely halogenated, in particular fluorinated, alkylene spacer, for example of the general chemical formula: $-(CH_2)_{a1}-$, where $1 \leq a1 \leq 10$, for example $1 \leq a1 \leq 4$, and/or an in particular saturated or unsaturated, linear or branched, for example partially or completely halogenated, in particular fluorinated, alkylene oxide spacer, for example an oligoalkylene oxide spacer, in particular an (oligo)ethylene oxide spacer, in particular with $\geq 1$ or $\geq 2$ to $\leq 10$ repeating units, for example with $\leq 1$ or $\leq 2$ to $\leq 4$ repeating units, for example of the general chemical formula: $-CH_2-[CH_2-CH_2-O]_{b1}-CH_2-$, where $1 \leq b1 \leq 10$, for example $2 \leq b1 \leq 4$, and/or of the general chemical formula: $-[CH_2-CH_2-O-]_b$, where $1 \leq b \leq 10$, for example $2 \leq b \leq 4$, and/or $-(CH_2)_{a2}-O-[CH_2-CH_2-O-]_{b2}-(CH_2)_{a2'}-$, where $1 \leq a2 \geq 3$, $1 \leq b2 \leq 10$, in particular $1 \leq b2 \leq 4$, and $1 \leq a2' \leq 3$, and/or a charged group, for example a positively charged group, in particular based on a cation of an ionic liquid, for example a pyridinium group and/or a quaternary ammonium group, and/or a negatively charged group, for example a sulfonylimide group and/or sulfonate group, and/or a phenylene group, for example a phenylene group substituted with at least one alkyl group and/or alkylene oxide group and/or alkoxy group, and/or a charged group, for example a positively charged group, for example a quaternary ammonium group, and/or a negatively charged group, for example a sulfonylimide group and/or sulfonate group, and/or a benzylene group, for example a benzylene group substituted with at least one alkyl group and/or alkylene oxide group and/or alkoxy group, and/or a charged group, for example a positively charged group, in particular based on a cation of an ionic liquid, for example a quaternary ammonium group, and/or a negatively charged group, for example a sulfonylimide group and/or sulfonate group, and/or a ketone group, for example an alkylcarbonyl group.

R100, R101, and/or R101', or R110, R111, R111', R112, and/or R112', or R120, R120', R121, and/or R121', or R130, R130', R131, R131', and/or R132, or R140 or R150 or R160 or R170, or R180, R180', R181, R181', and/or R182 may, for example, in each case independently stand for hydrogen or an in particular saturated or unsaturated, linear or branched, for example partially or completely halogenated, in particular fluorinated, alkyl group, for example of the general chemical formula: $-(CH_2)_{a1*}-CH_3$, where $0 \leq$ or $1 \leq a1* \leq 10$, for example $0 \leq$ or $1 \leq a1* \leq 3$, and/or an in particular saturated or unsaturated, linear or branched, for example partially or completely halogenated, in particular fluorinated, alkylene oxide group, for example an ethylene oxide group, in particular an oligoalkylene oxide group, for example an oligoethylene oxide group, in particular with $\geq 1$ to $\leq 10$ repeating units, for example with $\geq 1$ or $\geq 2$ to $\leq 5$ repeating units, and/or a charged group, for example a positively charged group, in particular based on a cation of an ionic liquid, for example a pyridinium group and/or a quaternary ammonium group, and/or a negatively charged group, for example a sulfonylimide group and/or sulfonate group, and/or a phenylene group, for example a phenylene group substituted with at least one alkyl group and/or alkylene oxide group and/or alkoxy group, and/or a charged group, for example a positively charged group, for example a quaternary ammonium group, and/or a negatively charged group, for example a sulfonylimide group and/or sulfonate group, and/or a benzylene group, for example a benzylene group substituted with at least one alkyl group and/or alkylene oxide group and/or alkoxy group, and/or a charged group, for example a positively charged group, for example a quaternary ammonium group, and/or a negatively charged group, for example a sulfonylimide group and/or sulfonate group, and/or a ketone group, for example an alkylcarbonyl group.

For example, at least two of moieties R100, R101, and/or R101, or R110, R111, R111', R112, and/or R112', or R120, R120', R121, and/or R121', or R130, R130', R131, R131', and/or R132, or R140 or R150 or R160 or R170, or R180, R180', R181, R181', and/or R182, optionally all moieties R100, R101, and/or R101, or R110, R111, R111', R112, and/or R112', or R120, R120', R121, and/or R121', or R130, R130', R131, R131', and/or R132, or R140 or R150 or R160 or R170, or R180, R180', R181, R181', and/or R182, may stand for different groups, for example alkyl groups and/or oligoalkylene oxide groups, for example with different lengths and/or substitutions and/or degrees of saturation and/or degrees of branching and/or degrees of halogenation, in particular degrees of fluorination. In particular, R100, R101, and/or R101, or R110, R111, R111', R112, and/or R112', or R120, R120', R121, and/or R121', or R130, R130', R131, R131', and/or R132, or R140 or R150 or R160 or R170, or R180, R180', R181, R181', and/or R182 may in each case independently stand for hydrogen or a methyl group or an ethyl group or an in particular saturated alkyl group having a chain length of ≥1 to ≤10 carbon atoms, for example ≥3 to ≤5 carbon atoms.

R132 or R140 or R150 or R160 or R170 may in particular stand for an alkyl group, for example a methyl group or ethyl group, in particular a methyl group, and/or an alkylene oxide group, in particular an oligoalkylene oxide group. The polymer may advantageously be optimized with regard to its ion-conducting function by use of a short-chain alkyl group such as a methyl group. In particular, R132 or R140 or R150 or R160 or R170 may stand for a methyl group.

In particular, polymer backbone-forming unit -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, [$A_e$], -[$A_f$]-, -[$A_Z$]-, or -[$A_{Z1}$]-, or repeating unit ([A]-X-Q) may include or be a methacrylate unit, for example of the general chemical formula:

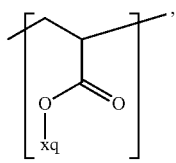

and/or a methyl methacrylate unit, for example of the general chemical formula:

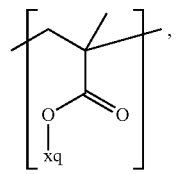

and/or a siloxane unit, for example of the general formula:

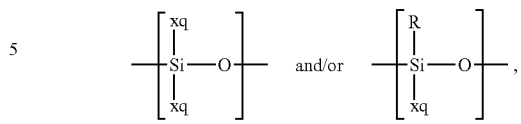

in particular where R stands for an alkyl group, for example a methyl, ethyl, and/or propyl group, for example a methyl group, for example of the general chemical formula:

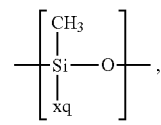

and/or a phosphazene unit, for example of the general chemical formula:

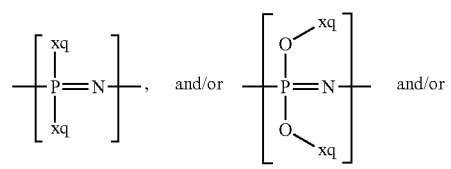

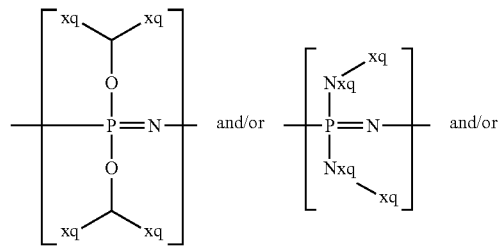

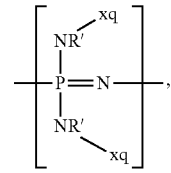

in particular where R' stands for hydrogen or (preferably) for an alkyl group, for example a methyl, ethyl, and/or propyl group, for example a methyl group, and/or a siloxane alkylene oxide unit, for example a siloxane ethylene oxide unit, for example of the general chemical formula:

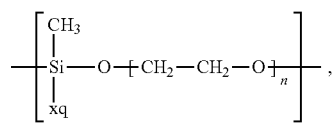

in particular where xq denotes binding site/s or stands for XQ. Low glass transition temperatures may advantageously be achieved by use of polysiloxanes, polyphosphazenes, and/or polymers made up of siloxane alkylene oxide units. Polymethacrylates and/or polymethyl methacrylates may advantageously be synthetically obtained comparatively easily.

Polymer backbone-forming unit -[A]-, -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]- may, for example, stand for an alkylene oxide unit, for example an ethylene oxide unit and/or a propylene oxide unit, in particular an ethylene oxide unit, and/or an alkylene unit and/or a unit which includes a carbonate group, and/or a methacrylate unit and/or a methyl methacrylate unit and/or a siloxane unit and/or a phosphazene unit and/or a phenylene unit, for example a phenylene oxide unit, and/or a benzylene unit. For example, polymer backbone-forming unit -[A]-, -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]- may stand for an alkylene oxide unit, for example an ethylene oxide unit and/or a propylene oxide unit, in particular an ethylene oxide unit, and/or an alkylene unit and/or a unit which includes a carbonate group, and/or a methacrylate unit and/or a methyl methacrylate unit and/or a siloxane unit and/or a phosphazene unit and/or a phenylene unit, for example a phenylene oxide unit. In particular, polymer backbone-forming unit -[A]-, -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]- may stand for a siloxane unit and/or a phosphazene unit and/or a methacrylate unit and/or a methyl methacrylate unit and/or a phenylene unit, for example a siloxane unit. For example, polymer backbone-forming unit -[A]-, -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]- may stand for a siloxane unit and/or a phosphazene unit and/or a methacrylate unit and/or a methyl methacrylate unit.

Within the scope of another specific embodiment, polymer backbone-forming unit -[A]-, -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]- stands for a polyfunctionalized, for example bifunctionalized, trifunctionalized, or tetrafunctionalized, polymer backbone-forming unit. For example, polymer backbone-forming unit -[A]-, -[A$_I$]-, -[A$_{II}$]-, -[A$_{III}$]-, -[A$_{IV}$]-, -[A$_V$]-[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]- may stand for at least one polyfunctionalized, for example bifunctionalized, siloxane unit and/or one polyfunctionalized, for example bifunctionalized or tetrafunctionalized, phosphazene unit and/or one polyfunctionalized, for example bifunctionalized, phenylene unit.

Within the scope of one particular embodiment of this specific embodiment, polymer backbone-forming unit -[A]-, -[A$_I$]-, -[A$_{II}$]-, -[A$_{III}$], -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, [A$_c$]-, -[A$_d$]-, -[A$_e$]-[A$_f$]-, -[A$_Z$]-, or -[A$_{Z1}$]- or repeating unit ([A]-X-Q) stands for a polyfunctionalized, for example bifunctionalized or tetrafunctionalized, polymer backbone-forming unit of the general chemical formula:

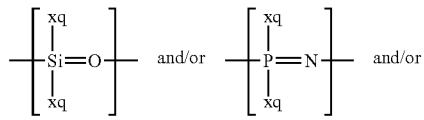

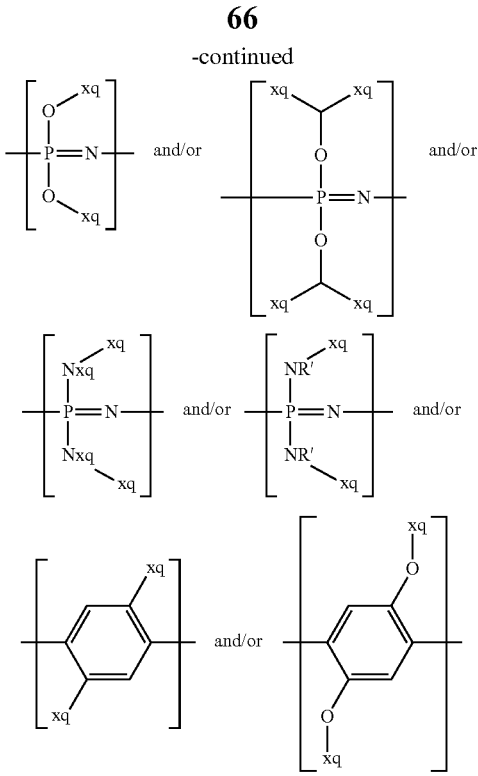

xq may in each case stand for a binding site, in particular to which a group Q, for example Q$^+$ or Q$^-$ or Q, is bound in each case to polymer backbone-forming unit -[A]- via a spacer X, in particular X$_x$, or in each case may stand for XQ, i.e., in each case may stand for a group Q, for example Q$^+$ or Q$^-$ or Q, and a spacer X, in particular X$_x$. R' may in particular stand for hydrogen or (preferably) for an alkyl group, for example a methyl, ethyl, and/or propyl group, for example a methyl group.

At binding sites xq, a cyclic carbonate group, substituted with R100, R101, and R101', in particular of the general chemical formula:

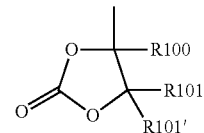

may in each case be bound to polymer backbone-forming unit -[A$_I$]-via a spacer (X$_I$)$_{xi}$.

Alternatively, at binding sites xq, a lactone group, substituted with R110, R111, R111', R112, and/or R112', in particular of the general chemical formula:

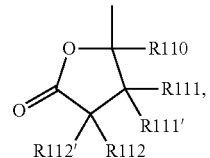

for example

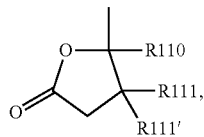

may in each case be bound to polymer backbone-forming unit -[$A_{II}$]- via a spacer $(X_{II})_{xii}$.

Alternatively, at binding sites xq, a cyclic carbamate group, substituted with R120, R120', R121, and/or R121', in particular of the general chemical formula:

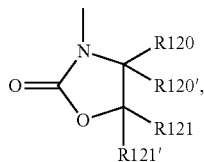

may in each case be bound to polymer backbone-forming unit -[$A_{III}$]- via a spacer $(X_{III})_{xiii}$.

Alternatively, at binding sites xq, an alkylene oxide group, substituted with R130, R130', R131, R131', and R132, in particular of the general chemical formula:

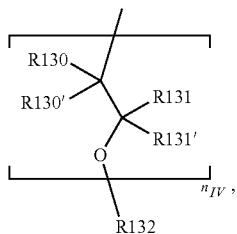

may in each case be bound to polymer backbone-forming unit -[$A_{IV}$]- via a spacer $(X_{IV})_{xiv}$.

Alternatively, at binding sites xq, an acyclic carbonate group, substituted with R140, in particular of the general chemical formula:

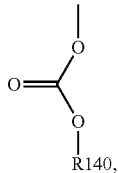

may in each case be bound to polymer backbone-forming unit -[$A_{V}$]- via a spacer $(X_{V})_{xv}$.

Alternatively, at binding sites xq, an acyclic carboxylic acid ester group, substituted with R150, in particular of the general chemical formula:

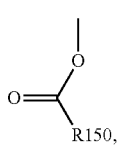

may in each case be bound to polymer backbone-forming unit -[$A_{VI}$]- via a spacer $(X_{VI})_{xvi}$.

Alternatively, at binding sites xq, an acyclic carbamate group, substituted with R160, in particular of the general chemical formula:

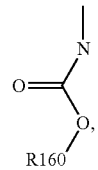

may in each case be bound to polymer backbone-forming unit -[$A_{VII}$]- via a spacer $(X_{VII})_{xvii}$.

Alternatively, at binding sites xq, an acyclic carbamate group, substituted with R170, in particular of the general chemical formula:

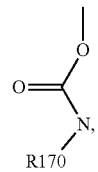

may in each case be bound to polymer backbone-forming unit -[$A_{VIII}$]- via a spacer $(X_{VIII})_{xviii}$.

Alternatively, at binding sites xq, an acyclic alkylene oxide group, substituted with R180, R180', R181, R181,' and R182, in particular of the general chemical formula:

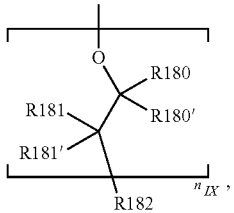

may in each case be bound to polymer backbone-forming unit -[$A_{IX}$]- via a spacer $(X_{IX})_{xix}$.

Alternatively, at binding sites xq, a pyridinium group, substituted with R10, R11, R12, R13, and R14, in particular of the general chemical formula:

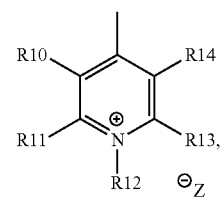

may in each case be bound to polymer backbone-forming unit -[$A_{a}$]-via a spacer $(X_{a})_{xa}$.

Alternatively, at binding sites xq, an ammonium group, substituted with R20, R21, and R22, in particular of the general chemical formula:

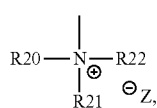

may in each case be bound to polymer backbone-forming unit -[$A_b$]-via a spacer ($X_b$)$_{xb}$.

Alternatively, at binding sites xq, an imidazolium group, substituted with R30, R31, R32, and R33, in particular of the general chemical formula:

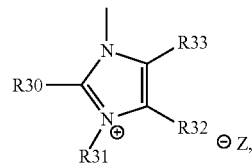

may in each case be bound to polymer backbone-forming unit -[$A_c$]-via a spacer ($X_c$)$_{xc}$.

Alternatively, at binding sites xq, a piperidinium group, substituted with R40, R41, R41', R42, R42', R43, R43', R44, R44', R45, and R45', in particular of the general chemical formula:

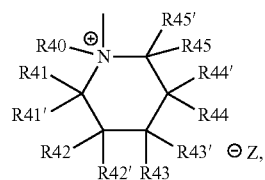

may in each case be bound to polymer backbone-forming unit -[$A_d$]-via a spacer ($X_d$)$_{xd}$.

Alternatively, at binding sites xq, a pyrrolidinium group, substituted with R50, R51, R51', R52, R52', R53, R53', R54 and R54', in particular of the general chemical formula:

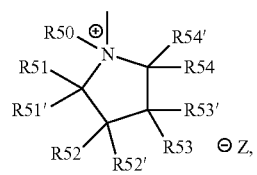

may in each case be bound to polymer backbone-forming unit -[$A_e$]-via a spacer ($X_e$)$_{xe}$.

Alternatively, at binding sites xq, a phosphonium group, substituted with R60, R61, and R62, in particular of the general chemical formula:

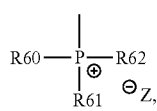

may in each case be bound to polymer backbone-forming unit -[$A_f$]-via a spacer ($X_f$)$_{xf}$.

Alternatively, at binding sites xq, a benzenesulfonate group, substituted with R200, R201, R202, and R203, in particular of the general chemical formula:

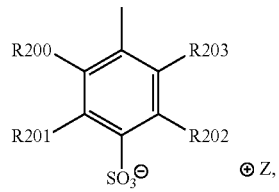

may in each case be bound to polymer backbone-forming unit -[$A_Z$]-via a spacer ($X_Z$)$_{xz}$.

Alternatively, at binding sites xq, a para-benzenesulfonylimide group, for example a para-trifluoromethanesulfonylimidebenzene group, substituted with R210, R211, R212, R213, and R214, in particular of the general chemical formula:

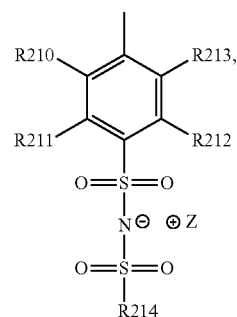

for example

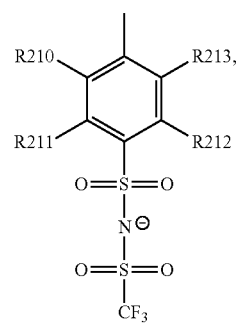

may in each case be bound to polymer backbone-forming unit -[$A_{Z1}$]- via a spacer ($X_{Z1}$)$_{xz1}$.

Polymer backbone-forming units -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, or -[$A_{IX}$]-, as well as polymer backbone-forming units -[$A_a$]-, -[$A_b$]-, [$A_c$]-, -[$A_d$]-, -[$A_e$]-, -[$A_f$]-, -[$A_Z$]-, and/or -[$A_{Z1}$]-, of the particular embodiments described below may include an alkylene oxide unit, for example an ethylene oxide unit, for example of the general chemical formula:

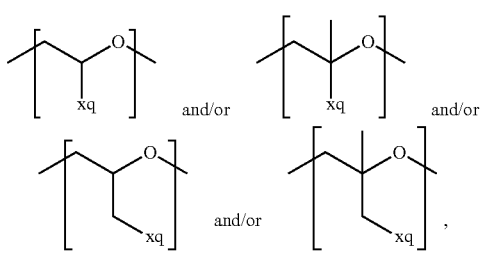 and/or or an alkylene unit, for example an ethylene unit and/or propylene unit, for example of the general chemical formula:

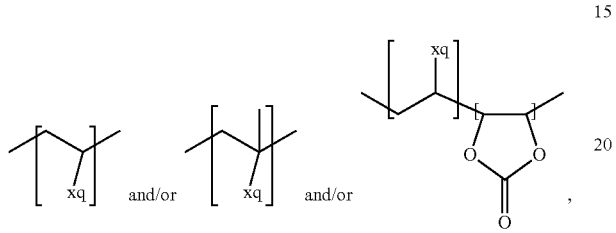

and/or a carbonate unit, and/or a methacrylate unit, for example of the general chemical formula:

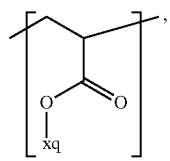

and/or a methyl methacrylate unit, for example of the general chemical formula:

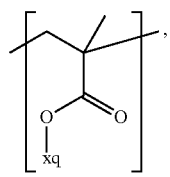

and/or a siloxane unit, for example of the general formula:

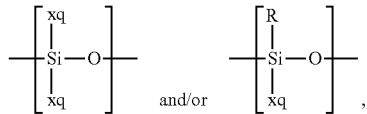

in particular where R stands for an alkyl group, for example a methyl, ethyl, and/or propyl group, for example a methyl group, for example

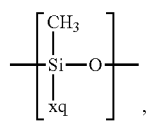

and/or a phosphazene unit, for example of the general chemical formula:

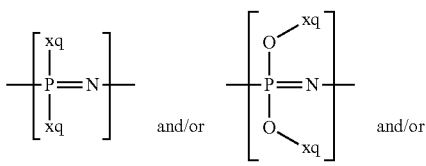

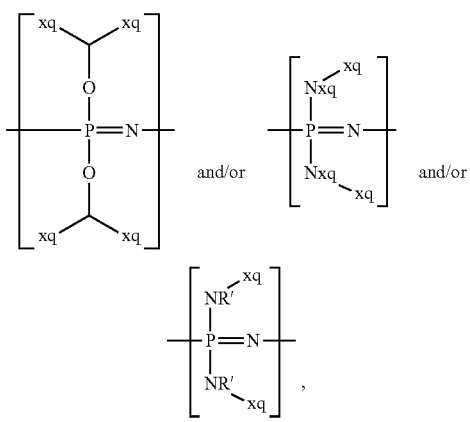

in particular where R' stands for hydrogen or (preferably) for an alkyl group, for example a methyl, ethyl, and/or propyl group, for example a methyl group, and/or a siloxane alkylene oxide unit, for example a siloxane ethylene oxide unit, for example of the general chemical formula:

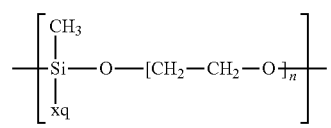

and/or a phenylene unit, in particular a polyphenylene, for example a para-polyphenylene, for example having an ether function, for example of the general chemical formula:

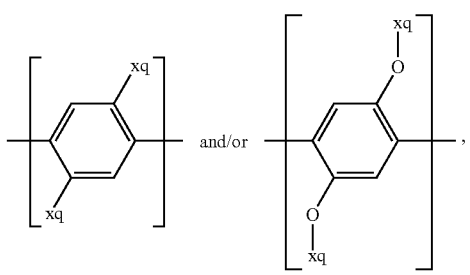

in particular where xq denotes the binding site/s or stands for XQ.

Within the scope of another, alternative or additional, specific embodiment, the at least one polymer electrolyte or the at least one polymer includes at least one repeating unit based on pyridinium, of the general chemical formula:

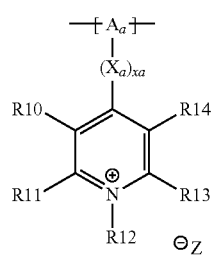

In this regard, -[$A_a$]- stands for a polymer backbone-forming unit. ($X_a$) stands for a spacer. xa stands for the number, in particular the presence or the absence, of spacers ($X_a$). xa may in particular be 1 or 0, for example 1. Polymer backbone-forming unit -[$A_a$]- may be configured, for example, as described in conjunction with polymer backbone-forming unit -[A]-. Spacer ($X_a$) may be configured, for example, as described in conjunction with spacer X. R10, R11, R12, R13, and/or R14 may likewise be configured, for example, as described above.

$Z^-$ may in particular stand for perchlorate and/or trifluoromethanesulfonate and/or tetrafluoroborate and/or bisoxalatoborate and/or hexafluorophosphate and/or bis(trifluoromethanesulfonyl)imide and/or difluorooxalatoborate and/or bromide and/or iodide and/or chloride.

($X_a$) may in particular stand for an in particular saturated or unsaturated, linear or branched, for example partially or completely halogenated, in particular fluorinated, alkylene spacer, for example of the general chemical formula: —$(CH_2)_{a1}$—, where $1 \leq a1 \leq 12$, for example $1 \leq a1 \leq 3$, and/or an in particular saturated or unsaturated, linear or branched, for example partially or completely halogenated, in particular fluorinated, alkylene oxide spacer, in particular an ethylene oxide spacer, for example of the general chemical formula: —$CH_2$—[$CH_2$—$CH_2$—O]$_{b1}$—$CH_2$—, where $1 \leq b1 \leq 10$, for example $1 \leq b1 \leq 4$, and/or a further positively charged group, for example a further pyridinium group and/or a quaternary ammonium group, and/or a phenylene group, for example a phenylene group substituted with at least one alkyl group and/or alkylene oxide group and/or alkoxy group and/or a further positively charged group, for example a quaternary ammonium group, substituted phenylene group, and/or a benzylene group, for example a benzylene group substituted with at least one alkyl group and/or alkylene oxide group and/or alkoxy group and/or a further positively charged group, for example a quaternary ammonium group, substituted benzylene group, and/or a ketone group, for example an alkylcarbonyl group.

R12 in particular stands for an in particular saturated or unsaturated, linear or branched, for example partially or completely halogenated, in particular fluorinated, alkyl group, in particular having a chain length of $\geq 1$ to $\leq 16$ carbon atoms, for example of the general chemical formula: —$(CH_2)_{a1*}$—$CH_3$, where $1 \leq a1* \leq 15$, for example $8 \leq a1* \leq 12$, and/or an in particular saturated or unsaturated, linear or branched, for example partially or completely halogenated, in particular fluorinated, alkylene oxide group, for example an ethylene oxide group, in particular an oligoalkylene oxide group, for example an oligoethylene oxide group, in particular with $\geq 1$ to $\leq 10$ repeating units, for example with $\geq 1$ or $\geq 2$ to $\leq 5$ repeating units, and/or a further positively charged group, for example a further pyridinium group and/or a quaternary ammonium group, and/or a phenylene group, for example a phenylene group substituted with at least one alkyl group and/or alkylene oxide group and/or alkoxy group and/or a further positively charged group, for example a quaternary ammonium group, substituted phenylene group, and/or a benzylene group, for example a benzylene group substituted with at least one alkyl group and/or alkylene oxide group and/or alkoxy group and/or a further positively charged group, for example a quaternary ammonium group, substituted benzylene group, and/or a ketone group, for example an alkylcarbonyl group. For example, R12 may stand for a saturated alkyl group, in particular having a chain length of $\geq 1$ to $\leq 16$ carbon atoms. For example, R12 may stand for a saturated alkyl group having a chain length of $\geq 9$ to $\leq 13$ carbon atoms, for example an undecyl group (—$C_{11}H_{23}$).

R10, R11, R13, and/or R14 may, for example, in each case independently stand for hydrogen or an in particular saturated or unsaturated, linear or branched, for example partially or completely halogenated, in particular fluorinated, alkyl group, for example of the general chemical formula: —$(CH_2)_{a1*}$—$CH_3$, where $1 \leq a1* \leq 15$, for example $1 \leq a1* \leq 3$, for example a methyl group or an ethyl group, and/or an in particular saturated or unsaturated, linear or branched, for example partially or completely halogenated, in particular fluorinated, alkylene oxide group, for example an ethylene oxide group, in particular an oligoalkylene oxide group, for example an oligoethylene oxide group, in particular with $\geq 1$ to $\leq 10$ repeating units, for example with $\geq 1$ or $\geq 2$ to $\leq 5$ repeating units, and/or a further positively charged group, for example a further pyridinium group and/or a quaternary ammonium group, and/or a phenylene group, for example a phenylene group substituted with at least one alkyl group and/or alkylene oxide group and/or alkoxy group and/or a further positively charged group, for example a quaternary ammonium group, substituted phenylene group, and/or a benzylene group, for example a benzylene group substituted with at least one alkyl group and/or alkylene oxide group and/or alkoxy group and/or a further positively charged group, for example a quaternary ammonium group, substituted benzylene group, and/or a ketone group, for example an alkylcarbonyl group. For example, at least two, for example at least three, of moieties R10, R11, R12, R13, and R14, optionally all moieties R10, R11, R12, R13, and R14, may stand for different groups, for example alkyl groups and/or oligoalkylene oxide groups, for example with different lengths and/or substitutions and/or degrees of saturation and/or degrees of branching and/or degrees of halogenation, in particular degrees of fluorination.

The following are examples of such embodiments:

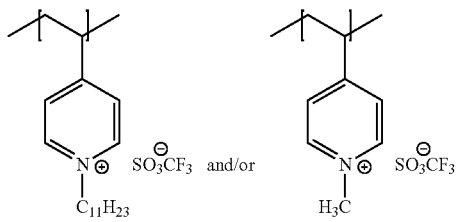

Within the scope of another, alternative or additional, specific embodiment, the at least one polymer electrolyte or the at least one polymer includes at least one repeating unit based on ammonium, of the general chemical formula:

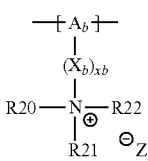

In this regard, -[$A_b$]- stands for a polymer backbone-forming unit. ($X_b$) stands for a spacer. xb stands for the number, in particular the presence or the absence, of spacers ($X_b$). xb may in particular be 1 or 0, for example 1. Polymer backbone-forming unit -[$A_b$]- may be configured, for example, as described in conjunction with polymer backbone-forming unit -[A]-. Spacer ($X_b$) may be configured, for example, as described in conjunction with spacer X. R20, R21, and/or R22 may likewise be configured, for example, as described above.

$Z^-$ may in particular stand for perchlorate and/or trifluoromethanesulfonate and/or tetrafluoroborate and/or bisoxalatoborate and/or hexafluorophosphate and/or bis(trifluoromethanesulfonyl)imide and/or difluorooxalatoborate and/or bromide and/or iodide and/or chloride.

($X_b$) may in particular stand for an in particular saturated or unsaturated, linear or branched, for example partially or completely halogenated, in particular fluorinated, alkylene spacer, for example of the general chemical formula: —$(CH_2)_{a1}$—, where $1 \leq a1 \leq 12$, for example $1 \leq a1 \leq 3$, and/or an in particular saturated or unsaturated, linear or branched, for example partially or completely halogenated, in particular fluorinated, alkylene oxide spacer, in particular an ethylene oxide spacer, for example of the general chemical formula: —$CH_2$—[$CH_2$—$CH_2$—O]$_{b1}$—$CH_2$—, where $1 \leq b1 \leq 10$, for example $1 \leq b1 \leq 4$, and/or a further positively charged group, for example a pyridinium group and/or a quaternary ammonium group, and/or a phenylene group, for example a phenylene group substituted with at least one alkyl group and/or alkylene oxide group and/or alkoxy group and/or a further positively charged group, for example a quaternary ammonium group, substituted phenylene group, and/or a benzylene group, for example a benzylene group substituted with at least one alkyl group and/or alkylene oxide group and/or alkoxy group and/or a further positively charged group, for example a quaternary ammonium group, substituted benzylene group, and/or a ketone group, for example an alkylcarbonyl group.

R20, R21, and R22 may, for example, in each case independently stand for hydrogen or an in particular saturated or unsaturated, linear or branched, for example partially or completely halogenated, in particular fluorinated, alkyl group, for example of the general chemical formula: —$(CH_2)_{a1*}$—$CH_3$, where $1 \leq a1* \leq 15$, for example $1 \leq a1* \leq 3$ and/or $8 \leq a1* \leq 12$, for example a methyl group or an ethyl group, and/or an in particular saturated or unsaturated, linear or branched, for example partially or completely halogenated, in particular fluorinated, alkylene oxide group, for example an ethylene oxide group, in particular an oligoalkylene oxide group, for example an oligoethylene oxide group, in particular with $\geq 1$ to $\leq 10$ repeating units, for example with $\geq 1$ or $\geq 2$ to $\leq 5$ repeating units, and/or a further positively charged group, for example a pyridinium group and/or a quaternary ammonium group, and/or a phenylene group, for example a phenylene group substituted with at least one alkyl group and/or alkylene oxide group and/or alkoxy group and/or a further positively charged group, for example a quaternary ammonium group, substituted phenylene group, and/or a benzylene group, for example a benzylene group substituted with at least one alkyl group and/or alkylene oxide group and/or alkoxy group and/or a further positively charged group, for example a quaternary ammonium group, substituted benzylene group, and/or a ketone group, for example an alkylcarbonyl group. For example, at least two of moieties R20, R21, and R22, optionally all moieties R20, R21, and R22, may stand for different groups, for example alkyl groups and/or oligoalkylene oxide groups, for example with different lengths and/or substitutions and/or degrees of saturation and/or degrees of branching and/or degrees of halogenation, in particular degrees of fluorination.

Within the scope of one particular embodiment, R20 and R21 stand for in particular saturated alkyl groups, which are the same or different, having a chain length of $\geq 1$ to $\leq 4$ carbon atoms, for example a methyl group, and R22 stands for an in particular saturated alkyl group having a chain length of $\geq 9$ to $\leq 13$ carbon atoms, for example an undecyl group (—$C_{11}H_{23}$).

The following are examples of such embodiments:

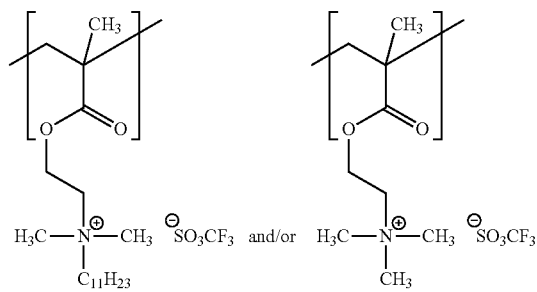

Within the scope of another, alternative or additional, specific embodiment, the at least one polymer electrolyte or the at least one polymer includes at least one repeating unit based on imidazolium, of the general chemical formula:

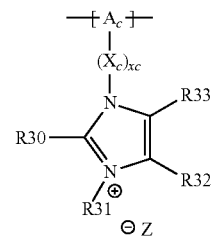

In this regard, -[$A_c$]- stands for a polymer backbone-forming unit. ($X_c$) stands for a spacer. xc stands for the number, in particular the presence or the absence, of spacers ($X_c$). xc may in particular be 1 or 0, for example 1. Polymer backbone-forming unit -[$A_c$]- may be configured, for example, as described in conjunction with polymer backbone-forming unit -[A]-. Spacer ($X_c$) may be configured, for example, as described in conjunction with spacer X. R30, R31, R32, and/or R33 may likewise be configured, for example, as described above.

$Z^-$ may in particular stand for perchlorate and/or trifluoromethanesulfonate and/or tetrafluoroborate and/or bisoxalatoborate and/or hexafluorophosphate and/or bis(trifluoromethanesulfonyl)imide and/or difluorooxalatoborate and/or bromide and/or iodide and/or chloride.

($X_c$) may in particular stand for an in particular saturated or unsaturated, linear or branched, for example partially or completely halogenated, in particular fluorinated, alkylene spacer, for example of the general chemical formula: —$(CH_2)_{a1}$—, where $1 \leq a1 \leq 12$, for example $3 \leq a1 \leq 5$, and/or an in particular saturated or unsaturated, linear or branched, for example partially or completely halogenated, in particular fluorinated, alkylene oxide spacer, in particular an ethylene oxide spacer, in particular with $\geq 1$ or $\geq 2$ to $\leq 10$ repeating units, for example with $\geq 1$ or $\geq 2$ to $\leq 4$ repeating units, for example of the general chemical formula: —$CH_2$—$[CH_2$—$CH_2$—$O]_{b1}$—$CH_2$—, where $1 \leq b1 \leq 10$, for example $2 \leq b1 \leq 4$, and/or a further positively charged group, for example a pyridinium group and/or a quaternary ammonium group, and/or a phenylene group, for example a phenylene group substituted with at least one alkyl group and/or alkylene oxide group and/or alkoxy group and/or a further positively charged group, for example a quaternary ammonium group, substituted phenylene group, and/or a benzylene group, for example a benzylene group substituted with at least one alkyl group and/or alkylene oxide group and/or alkoxy group and/or a further positively charged group, for example a quaternary ammonium group, substituted benzylene group, for example of the general chemical formula:

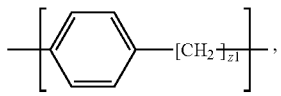

where $1 \leq z1 \leq 4$, and/or a ketone group, for example an alkylcarbonyl group.

R30, R32, and/or R33 may, for example, in each case independently stand for hydrogen or an in particular saturated or unsaturated, linear or branched, for example partially or completely halogenated, in particular fluorinated, alkyl group, for example of the general chemical formula: —$(CH_2)_{a1^*}$—$CH_3$, where $0 \leq$ or $1 \leq$ or $2 \leq a1^* \leq 15$, for example $0 \leq$ or $1 \leq$ or $2 \leq a1^* \leq 4$, and/or an in particular saturated or unsaturated, linear or branched, for example partially or completely halogenated, in particular fluorinated, alkylene oxide group, for example an ethylene oxide group, in particular an oligoalkylene oxide group, for example an oligoethylene oxide group, in particular with $\leq 1$ to $\leq 10$ repeating units, for example with $\geq 1$ or $\geq 2$ to $\leq 5$ repeating units, and/or a further positively charged group, for example a pyridinium group and/or a quaternary ammonium group, and/or a phenylene group, for example a phenylene group substituted with at least one alkyl group and/or alkylene oxide group and/or alkoxy group and/or a further positively charged group, for example a quaternary ammonium group, substituted phenylene group, and/or a benzylene group, for example a benzylene group substituted with at least one alkyl group and/or alkylene oxide group and/or alkoxy group and/or a further positively charged group, for example a quaternary ammonium group, substituted benzylene group, and/or a ketone group, for example an alkylcarbonyl group. For example, at least two, for example at least three, of moieties R30, R31, R32, and R33, optionally all moieties R30, R31, R32, and R33, may stand for different groups, for example alkyl groups and/or oligoalkylene oxide groups, for example with different lengths and/or substitutions and/or degrees of saturation and/or degrees of branching and/or degrees of halogenation, in particular degrees of fluorination. In particular, R30, R31, R32, and R33 may in each case independently stand for hydrogen or a methyl group or an alkyl group having a chain length of $\geq 2$ to $\leq 15$ carbon atoms, for example $\geq 2$ to $\leq 4$ carbon atoms. R31 may in particular stand for a methyl group.

Within the scope of another, alternative or additional, specific embodiment, the at least one polymer electrolyte or the at least one polymer includes at least one repeating unit based on based on piperidinium, of the general chemical formula:

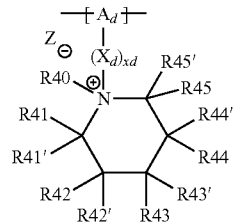

In this regard, -[$A_d$]- stands for a polymer backbone-forming unit. ($X_d$) stands for a spacer. xd stands for the number, in particular the presence or the absence, of spacers ($X_d$). xd may in particular be 1 or 0, for example 1. Polymer backbone-forming unit -[$A_d$]- may be configured, for example, as described in conjunction with polymer backbone-forming unit -[A]-. Spacer ($X_d$) may be configured, for example, as described in conjunction with spacer X. R40, R41, R41', R42, R42', R43, R43', R44, R44', R45, and/or R45' may likewise be configured, for example, as described above.

$Z^-$ may in particular stand for perchlorate and/or trifluoromethanesulfonate and/or tetrafluoroborate and/or bisoxalatoborate and/or hexafluorophosphate and/or bis(trifluoromethanesulfonyl)imide and/or difluorooxalatoborate and/or bromide and/or iodide and/or chloride.

($X_d$) may in particular stand for an in particular saturated or unsaturated, linear or branched, for example partially or completely halogenated, in particular fluorinated, alkylene spacer, for example of the general chemical formula: —$(CH_2)_{a1}$—, where $1 \leq a1 \leq 15$, for example $3 \leq a1 \leq 5$, and/or an in particular saturated or unsaturated, linear or branched, for example partially or completely halogenated, in particular fluorinated, alkylene oxide spacer, in particular an ethylene oxide spacer, in particular with $\geq 1$ or $\geq 2$ to $\leq 10$ repeating units, for example with 1 or 2 to $\leq 4$ repeating units, for example of the general chemical formula: —$CH_2$—$[CH_2$—$CH_2$—$O]_{b1}$—$CH_2$—, where $1 \leq b1 \leq 10$, for example $2 \leq b1 \leq 4$, and/or of the general chemical formula: $[CH_2$—$CH_2$—$O]_b$, where $1 \leq b1 \leq 10$, for example $2 \leq b1 \leq 4$, and/or a further positively charged group, for example a pyridinium group and/or a quaternary ammonium group, and/or a phenylene group, for example a phenylene group substituted with at least one alkyl group and/or alkylene oxide group and/or alkoxy group and/or a further positively charged group, for example a quaternary ammonium group, substituted phenylene group, and/or a benzylene group, for example a benzylene group substituted with at least one alkyl group and/or alkylene oxide group and/or alkoxy group and/or a further positively charged group, for example a quaternary ammonium group, substituted benzylene group, and/or a ketone group, for example an alkylcarbonyl group. In particular, spacer X may be a saturated alkyl spacer having a chain length of $\geq 1$ to $\leq 15$ carbon atoms, for example $\geq 3$ to $\leq 5$ carbon atoms.

R40, R41, R41', R42, R42', R43, R43', R44, R44', R45, and/or R45' may, for example, in each case independently stand for hydrogen or an in particular saturated or unsaturated, linear or branched, for example partially or completely halogenated, in particular fluorinated, alkyl group, for example of the general chemical formula: —$(CH_2)_{a1*}$—$CH_3$, where $0\leq$ or $1\leq$ or $2\leq a1*\leq 15$, for example $0\leq$ or $1\leq$ or $2\leq a1*\leq 4$, and/or an in particular saturated or unsaturated, linear or branched, for example partially or completely halogenated, in particular fluorinated, alkylene oxide group, for example an ethylene oxide group, in particular an oligoalkylene oxide group, for example an oligoethylene oxide group, in particular with $\geq 1$ to $\leq 10$ repeating units, for example with $\geq 1$ or $\geq 2$ to $\leq 5$ repeating units, and/or a further positively charged group, for example a pyridinium group and/or a quaternary ammonium group, and/or a phenylene group, for example a phenylene group substituted with at least one alkyl group and/or alkylene oxide group and/or alkoxy group and/or a further positively charged group, for example a quaternary ammonium group, substituted phenylene group, and/or a benzylene group, for example a benzylene group substituted with at least one alkyl group and/or alkylene oxide group and/or alkoxy group and/or a further positively charged group, for example a quaternary ammonium group, substituted benzylene group, and/or a ketone group, for example an alkylcarbonyl group. For example, at least two, for example at least three, of moieties R40, R41, R41', R42, R42', R43, R43', R44, R44', R45, and/or R45', optionally all moieties R40, R41, R41', R42, R42', R43, R43', R44, R44', R45, and/or R45', may stand for different groups, for example alkyl groups and/or oligoalkylene oxide groups, for example with different lengths and/or substitutions and/or degrees of saturation and/or degrees of branching and/or degrees of halogenation, in particular degrees of fluorination. In particular, R40, R41, R41', R42, R42', R43, R43', R44, R44', R45, and/or R45' may in each case independently stand for hydrogen or a methyl group or an alkyl group having a chain length of $\geq 2$ to $\leq 15$ carbon atoms, for example $\geq 2$ to $\leq 4$ carbon atoms. R41, R41', R42, R42', R43, R43', R44, R44', R45, and/or R45' may in particular stand for hydrogen. R40 may in particular stand for a methyl group.

Within the scope of another, alternative or additional, specific embodiment, the at least one polymer electrolyte or the at least one polymer includes at least one repeating unit based on pyrrolidinium, of the general chemical formula:

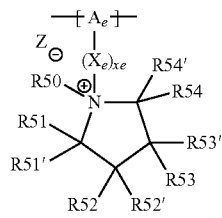

In this regard, -[$A_e$]- stands for a polymer backbone-forming unit. ($X_e$) stands for a spacer. xe stands for the number, in particular the presence or the absence, of spacers ($X_e$). xe may in particular be 1 or 0, for example 1. Polymer backbone-forming unit -[$A_e$]- may be configured, for example, as described in conjunction with polymer backbone-forming unit -[A]-. Spacer ($X_e$) may be configured, for example, as described in conjunction with spacer X. R50, R51, R51', R52, R52', R53, R53', R54, and/or R54' may likewise be configured, for example, as described above.

$Z^-$ may in particular stand for perchlorate and/or trifluoromethanesulfonate and/or tetrafluoroborate and/or bisoxalatoborate and/or hexafluorophosphate and/or bis(trifluoromethanesulfonyl)imide and/or difluorooxalatoborate and/or bromide and/or iodide and/or chloride.

($X_e$) may in particular stand for an in particular saturated or unsaturated, linear or branched, for example partially or completely halogenated, in particular fluorinated, alkylene spacer, for example of the general chemical formula: —$(CH_2)_{a1}$—, where $1\leq a1\leq 15$, for example $3\leq a1\leq 5$, and/or an in particular saturated or unsaturated, linear or branched, for example partially or completely halogenated, in particular fluorinated, alkylene oxide spacer, in particular an ethylene oxide spacer, in particular with $\geq 1$ or $\geq 2$ to $\leq 10$ repeating units, for example with $\geq 1$ or $\geq 2$ to $\leq 4$ repeating units, for example of the general chemical formula: —$CH_2$—[$CH_2$—$CH_2$—O]$_{b1}$—$CH_2$—, where $1\leq b1\leq 10$, for example $1\leq b1\leq 4$, and/or of the general chemical formula: —[$CH_2$—$CH_2$—O—]$_b$, where $1\leq b\leq 10$, for example $2\leq b\leq 4$, and/or a further positively charged group, for example a pyridinium group and/or a quaternary ammonium group, and/or a phenylene group, for example a phenylene group substituted with at least one alkyl group and/or alkylene oxide group and/or alkoxy group and/or a further positively charged group, for example a quaternary ammonium group, substituted phenylene group, and/or a benzylene group, for example a benzylene group substituted with at least one alkyl group and/or alkylene oxide group and/or alkoxy group and/or a further positively charged group, for example a quaternary ammonium group, substituted benzylene group, and/or a ketone group, for example an alkylcarbonyl group. In particular, spacer X may be a saturated alkyl spacer having a chain length of $\geq 1$ to $\leq 15$ carbon atoms, for example $\geq 3$ to $\leq 5$ carbon atoms.

R50, R51, R51', R52, R52', R53, R53', R54, and/or R54' may, for example, in each case independently stand for hydrogen or an in particular saturated or unsaturated, linear or branched, for example partially or completely halogenated, in particular fluorinated, alkyl group, for example of the general chemical formula: —$(CH_2)_{a1*}$—$CH_3$, where $0\leq$ or $1\leq$ or $2\leq a1*\leq 15$, for example $0\leq$ or $1\leq$ or $2\leq a1*\leq 4$, and/or an in particular saturated or unsaturated, linear or branched, for example partially or completely halogenated, in particular fluorinated, alkylene oxide group, for example an ethylene oxide group, in particular an oligoalkylene oxide group, for example an oligoethylene oxide group, in particular with $\geq 1$ to $\leq 10$ repeating units, for example with $\geq 1$ or $\geq 2$ to $\leq 5$ repeating units, and/or a further positively charged group, for example a pyridinium group and/or a quaternary ammonium group, and/or a phenylene group, for example a phenylene group substituted with at least one alkyl group and/or alkylene oxide group and/or alkoxy group and/or a further positively charged group, for example a quaternary ammonium group, substituted phenylene group, and/or a benzylene group, for example a benzylene group substituted with at least one alkyl group and/or alkylene oxide group and/or alkoxy group and/or a further positively charged group, for example a quaternary ammonium group, substituted benzylene group, and/or a ketone group, for example an alkylcarbonyl group. For example, at least two, for example at least three, of moieties R50, R51, R51', R52, R52', R53, R53', R54, and/or R54', optionally all moieties R50, R51, R51', R52, R52', R53, R53', R54, and/or R54', may stand for different groups, for example alkyl groups and/or oligoalkylene oxide groups, for example with different lengths and/or substitutions and/or degrees of saturation and/or degrees of branching and/or degrees of halogenation, in particular degrees of fluorination. In particular, R50, R51, R51', R52, R52', R53, R53', R54, and/or R54' may in each case independently stand for hydrogen or a methyl group or an alkyl group having a chain length of ≥2 to ≤15 carbon atoms, for example ≥2 to ≤4 carbon atoms. R51, R51', R52, R52', R53, R53', R54, and/or R54' may in particular stand for hydrogen. R50 may in particular stand for a methyl group or an ethyl group.

Within the scope of another, alternative or additional, specific embodiment, the at least one polymer electrolyte or the at least one polymer includes at least one repeating unit based on phosphonium, of the general chemical formula:

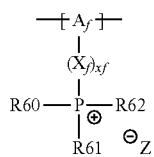

In this regard, -[$A_f$]- stands for a polymer backbone-forming unit. ($X_f$) stands for a spacer. xf stands for the number, in particular the presence or the absence, of spacers ($X_f$). xf may in particular be 1 or 0, for example 1. Polymer backbone-forming unit -[$A_f$]- may be configured, for example, as described in conjunction with polymer backbone-forming unit -[A]-. Spacer ($X_f$) may be configured, for example, as described in conjunction with spacer X. R60, R61, and/or R62 may likewise be configured, for example, as described above.

$Z^-$ may in particular stand for perchlorate and/or trifluoromethanesulfonate and/or tetrafluoroborate and/or bisoxalatoborate and/or hexafluorophosphate and/or bis(trifluoromethanesulfonyl)imide and/or difluorooxalatoborate and/or bromide and/or iodide and/or chloride.

($X_f$) may in particular stand for an in particular saturated or unsaturated, linear or branched, for example partially or completely halogenated, in particular fluorinated, alkylene spacer, for example of the general chemical formula: —$(CH_2)_{a1}$—, where 1≤a1≤15, for example 2≤a1≤8, and/or an in particular saturated or unsaturated, linear or branched, for example partially or completely halogenated, in particular fluorinated, alkylene oxide spacer, in particular an ethylene oxide spacer, in particular with ≥1 or ≥2 to ≤10 repeating units, for example with ≥1 or ≥2 to ≤4 repeating units, for example of the general chemical formula: —$CH_2$—[$CH_2$—$CH_2$—O]$_{b1}$—$CH_2$—, where 1≤b1≤10, for example 2≤b1≤4, and/or of the general chemical formula: —[$CH_2$—$CH_2$—O—]$_b$, where 1≤b≤10, for example 2≤b≤4, and/or a further positively charged group, for example a pyridinium group and/or a quaternary ammonium group, and/or a phenylene group, for example a phenylene group substituted with at least one alkyl group and/or alkylene oxide group and/or alkoxy group and/or a further positively charged group, for example a quaternary ammonium group, substituted phenylene group, and/or a benzylene group, for example a benzylene group substituted with at least one alkyl group and/or alkylene oxide group and/or alkoxy group and/or a further positively charged group, for example a quaternary ammonium group, substituted benzylene group, and/or a ketone group, for example an alkylcarbonyl group. In particular, spacer X may be a saturated alkyl spacer having a chain length of ≥1 to ≤16 carbon atoms, for example ≥3 to ≤9 carbon atoms.

R60, R61, and R61 may, for example, in each case independently stand for hydrogen or an in particular saturated or unsaturated, linear or branched, for example partially or completely halogenated, in particular fluorinated, alkyl group, for example of the general chemical formula: —$(CH_2)_{a1*}$—$CH_3$, where 0≤ or 1≤ or 2≤a1*≤15, for example 0≤ or 1≤ or 2≤a1*≤4, and/or an in particular saturated or unsaturated, linear or branched, for example partially or completely halogenated, in particular fluorinated, alkylene oxide group, for example an ethylene oxide group, in particular an oligoalkylene oxide group, for example an oligoethylene oxide group, in particular with ≥1 to ≤10 repeating units, for example with ≥1 or ≥2 to ≤5 repeating units, and/or a further positively charged group, for example a pyridinium group and/or a quaternary ammonium group, and/or a phenylene group, for example a phenylene group substituted with at least one alkyl group and/or alkylene oxide group and/or alkoxy group and/or a further positively charged group, for example a quaternary ammonium group, substituted phenylene group, and/or a benzylene group, for example a benzylene group substituted with at least one alkyl group and/or alkylene oxide group and/or alkoxy group and/or a further positively charged group, for example a quaternary ammonium group, substituted benzylene group, and/or a ketone group, for example an alkylcarbonyl group. For example, at least two of moieties R60, R61, and R61, optionally all moieties R60, R61, and R61, may stand for different groups, for example alkyl groups and/or oligoalkylene oxide groups, for example with different lengths and/or substitutions and/or degrees of saturation and/or degrees of branching and/or degrees of halogenation, in particular degrees of fluorination. In particular, R60, R61, and R61 may in each case independently stand for an alkyl group having a chain length of ≥1 to ≤16 carbon atoms, for example ≥3 to ≤[ ]$^1$ carbon atoms.

$^1$ T.N.: Numeral is missing in source document

Within the scope of another, alternative or additional, specific embodiment, the at least one polymer electrolyte or the at least one polymer includes at least one repeating unit based on benzenesulfonate, of the general chemical formula:

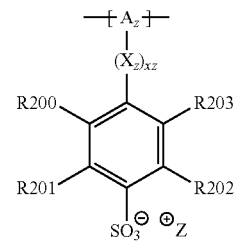

In this regard, -[$A_Z$]- stands for a polymer backbone-forming unit. ($X_Z$) stands for a spacer. xz stands for the number, in particular the presence or the absence, of spacers ($X_Z$). xz may in particular be 1 or 0, for example 1. Polymer backbone-forming unit -[$A_Z$]- may be configured, for example, as described in conjunction with polymer backbone-forming unit -[A]-. Spacer ($X_Z$) may be configured, for example, as described in conjunction with spacer X. R200, R201, R202, and/or R203 may likewise be configured, for example, as described above.

$Z^+$ may in particular stand for a cation, in particular a metal cation, for example an alkali ion, for example a lithium ion and/or sodium ion, in particular a lithium ion ($Li^+$).

($X_Z$) may in particular stand for an in particular saturated or unsaturated, linear or branched, for example partially or completely halogenated, in particular fluorinated, alkylene spacer, for example of the general chemical formula: —$(CH_2)_{a1}$—, where $1 \leq a1 \leq 15$, for example $1 \leq a1 \leq 3$, and/or an in particular saturated or unsaturated, linear or branched, for example partially or completely halogenated, in particular fluorinated, alkylene oxide spacer, in particular an ethylene oxide spacer, in particular with $\geq 1$ or $\geq 2$ to $\leq 10$ repeating units, for example with $\geq 1$ or $\geq 2$ to $\leq 4$ repeating units, for example of the general chemical formula: —$CH_2$—$[CH_2—CH_2—O]_{b1}$—$CH_2$—, where $1 \leq b1 \leq 10$, for example $2 \leq b1 \leq 4$, and/or of the general chemical formula: —$[CH_2—CH_2—O—]_b$, where $1 \leq b \leq 10$, for example $2 \leq b \leq 4$, and/or —$(CH_2)_{a2}$—O—$[CH_2—CH_2—O—]_{b2}$—$(CH_2)_{a2'}$—, where $1 \leq a2 \leq 3$, $1 \leq b2 \leq 10$, in particular $1 \leq b2 \leq 4$, and $1 \leq a2' \leq 3$, and/or a further lithium sulfonate group and/or a phenylene group, for example a phenylene group substituted with at least one lithium sulfonate group (phenylenesulfonate unit), and/or a benzylene group, for example a benzylene group substituted with at least one lithium sulfonate group, and/or a ketone group, for example an alkylcarbonyl group, and/or an ether oxygen.

R200, R201, R202, and R203 may, for example, in each case independently stand for hydrogen or an in particular saturated or unsaturated, linear or branched, for example partially or completely halogenated, in particular fluorinated, alkyl group, for example of the general chemical formula: —$(CH_2)_{a1*}$—$CH_3$, where $0 \leq$ or $1 \leq$ or $2 \leq a1* \leq 15$, for example $1 \leq a1* \leq 2$, and/or an in particular saturated or unsaturated, linear or branched, for example partially or completely halogenated, in particular fluorinated, alkylene oxide group, for example an ethylene oxide group, in particular an oligoalkylene oxide group, for example an oligoethylene oxide group, in particular with $\geq 1$ to $\leq 10$ repeating units, for example with $\geq 1$ or $\geq 2$ to $\leq 5$ repeating units, and/or a further negatively charged group, for example a lithium sulfonate group, and/or a phenylene group, for example a phenylene group substituted with at least one negative group, for example a lithium sulfonate group, and/or a benzylene group, for example a benzylene group substituted with least one negative group, for example a lithium sulfonate group, and/or a ketone group, for example an alkylcarbonyl group. For example, at least two of moieties R200, R201, R202, and R203, optionally all moieties R200, R201, R202, and R203, may stand for different groups, for example alkyl groups and/or oligoalkylene oxide groups, for example with different lengths and/or substitutions and/or degrees of saturation and/or degrees of branching and/or degrees of halogenation, in particular degrees of fluorination. In particular, R200, R201, R202, and R203 may in each case independently stand for hydrogen or a lithium sulfonate group or an alkyl group, in particular substituted with at least one lithium sulfonate group, having a chain length of $\geq 1$ to $\leq 15$ carbon atoms, for example $\geq 1$ to $\geq 2$ carbon atoms, for example of the general chemical formula: —$(CH_2)_{s1}$—$SO_3Li$, where $0 \leq s1 \leq 15$, for example $0 \leq s1 \leq 2$. In particular, R200, R201, R202, and R203 may in each case independently stand for hydrogen, an in particular saturated, for example partially or completely sulfonated and/or halogenated, in particular fluorinated, alkyl group having a chain length of $\geq 1$ to $\leq 16$ carbon atoms, for example $\geq 1$ or $\geq 2$ to $\leq 4$ carbon atoms, and/or a, for example partially or completely sulfonated and/or halogenated, in particular fluorinated, alkylene oxide group, in particular an oligoalkylene oxide group, for example an oligoethylene oxide group.

In particular, R200, R201, R202, and/or R203 may be substituted with at least one sulfonate group, in particular a lithium sulfonate group.

Within the scope of another, alternative or additional, specific embodiment, the at least one polymer electrolyte or the at least one polymer includes at least one repeating unit based on a trifluoromethanesulfonylimidebenzene group, of the general chemical formula:

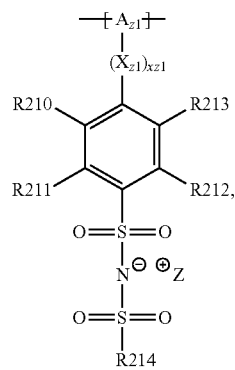

for example

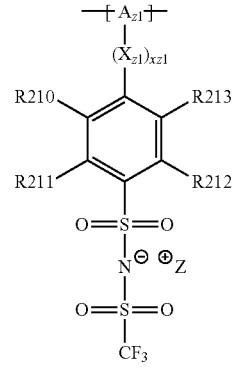

In this regard, -[$A_{Z1}$]- stands for a polymer backbone-forming unit. ($X_{Z1}$) stands for a spacer. xz1 stands for the number, in particular the presence or the absence, of spacers ($X_{Z1}$). xz1 may in particular be 1 or 0, for example 1. Polymer backbone-forming unit -[$A_{Z1}$]- may be configured, for example, as described in conjunction with polymer backbone-forming unit -[A]-. Spacer ($X_{Z1}$) may be configured, for example, as described in conjunction with spacer X. R210, R211, R212, R213, and/or R214 may likewise be configured, for example, as described above.

$Z^+$ may in particular stand for a cation, in particular a metal cation, for example an alkali ion, for example a lithium ion and/or sodium ion, in particular a lithium ion ($Li^+$).

($X_{Z1}$) may in particular stand for an in particular saturated or unsaturated, linear or branched, for example partially or completely halogenated, in particular fluorinated, alkylene spacer, for example of the general chemical formula: —$(CH_2)_{a1}$—, where $1 \leq a1 \leq 15$, for example $1 \leq a1 \leq 3$, and/or an in particular saturated or unsaturated, linear or branched, for example partially or completely halogenated, in particular fluorinated, alkylene oxide spacer, in particular an ethylene oxide spacer, in particular with $\geq 1$ or $\geq 2$ to $\leq 10$ repeating units, for example with ≥1 or ≥2 to ≤4 repeating units, for example of the general chemical formula: —CH$_2$—[CH$_2$—CH$_2$—O]$_{b1}$—CH$_2$—, where 1≤b1≤10, for example 2≤b1≤4, and/or of the general chemical formula: —[CH$_2$—CH$_2$—O—]$_b$, where 1≤b≤10, for example 2≤b≤4, and/or —(CH$_2$)$_{a2}$—O—[CH$_2$—CH$_2$—O—]$_{b2}$—(CH$_2$)$_{a2'}$—, where 1≤a2≤3, 1≤b2≤10, in particular 1≤b2≤4, and 1≤a2'≤3, and/or a further lithium trifluoromethanesulfonylimidebenzene group and/or a phenylene group, for example a phenylene group substituted with at least one lithium trifluoromethanesulfonylimidebenzene group (phenylene-bis(trifluoromethanesulfonyl)imidebenzene unit), and/or a benzylene group, for example a benzylene group substituted with at least one lithium trifluoromethanesulfonylimidebenzene group, and/or a ketone group, for example an alkylcarbonyl group, and/or an ether oxygen.

R210, R211, R212, R213, and R214 may, for example, in each case independently stand for hydrogen or an in particular saturated or unsaturated, linear or branched, for example partially or completely halogenated, in particular fluorinated, alkyl group, for example of the general chemical formula: —(CH$_2$)$_{a1*}$—CH$_3$, where 0≤ or 1≤a1*≤15, for example 1≤a1*≤2, and/or an in particular saturated or unsaturated, linear or branched, for example partially or completely halogenated, in particular fluorinated, alkylene oxide group, for example an ethylene oxide group, in particular an oligoalkylene oxide group, for example an oligoethylene oxide group, in particular with ≥1 to ≤10 repeating units, for example with ≥1 or ≥2 to ≤5 repeating units, and/or a further lithium trifluoromethanesulfonylimidebenzene group and/or a phenylene group, for example a phenylene group substituted with at least one lithium trifluoromethanesulfonylimidebenzene group, and/or a benzylene group, for example a benzylene group substituted with at least one lithium trifluoromethanesulfonylimidebenzene group, and/or a ketone group, for example an alkylcarbonyl group. For example, at least two of moieties R210, R211, R212, R213, and R214, optionally all moieties R210, R211, R212, R213, and R214, may stand for different groups, for example alkyl groups and/or oligoalkylene oxide groups, for example with different lengths and/or substitutions and/or degrees of saturation and/or degrees of branching and/or degrees of halogenation, in particular degrees of fluorination. In particular, R210, R211, R212, R213, and R214 may in each case independently stand for hydrogen or a lithium trifluoromethanesulfonylimidebenzene group, or an alkyl group, in particular substituted with at least one lithium trifluoromethanesulfonylimidebenzene group, having a chain length of ≥1 to ≤15 carbon atoms, for example ≥1 to ≥2 carbon atoms, for example of the general chemical formula: —(CH$_2$)$_{s2}$—SO$_2$NSO$_2$CF$_3$Li, where 0≤s2≤15, for example 0≤s2≤2. In particular, R210, R211, R212, R213, and R214 may in each case independently stand for hydrogen, an in particular saturated, for example partially or completely, bis(trifluoromethanesulfonyl)imide-substituted and/or halogenated, in particular fluorinated, alkyl group having a chain length of ≥1 to ≤16 carbon atoms, for example ≥1 or ≥2 to ≤4 carbon atoms, and/or a, for example partially or completely, bis(trifluoromethanesulfonyl)imide-substituted and/or halogenated, in particular fluorinated, alkylene oxide group, in particular an oligoalkylene oxide group, for example an oligoethylene oxide group.

In particular, R210, R211, R212, R213, and/or R214 may be configured in the form of a further sulfonylimide group, for example a trifluoromethanesulfonylimide group, in particular a lithium trifluoromethanesulfonylimide group. In particular, polymer backbone -[A$_Z$]- or -[A$_{Z1}$]- may stand for a phenylene unit, in particular a polyphenylene, for example a para-polyphenylene, for example having an ether function, for example of the general chemical formula:

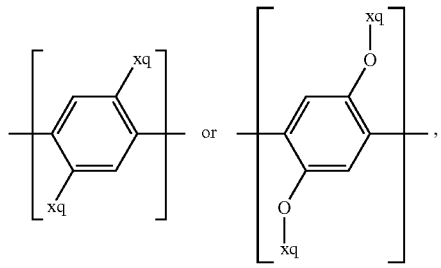

in particular where xq denotes the binding site/s or stands for XQ.

The polymer may include, for example, at least one, for example unsubstituted, further phenylene unit and/or at least one further phenylene unit substituted with at least one lithium sulfonate group. For example, polymer backbone -[A$_Z$]- or -[A$_{Z1}$]- may stand for a phenylene unit of the general chemical formula:

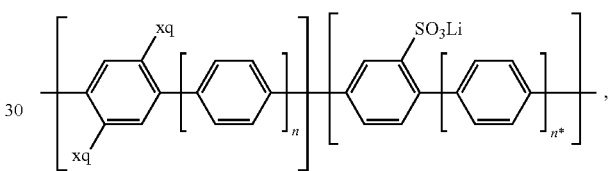

where n and n* stand for the repetition numbers of the unsubstituted phenylene unit, and are 0≤n≤3 and 0≤n*≤3, for example, in particular where xq denotes the binding site/s or stands for XQ.

Within the scope of another, alternative or additional, particular embodiment, the polymer, in particular the at least one first repeating unit -[A$_1$]-, includes or is based on a repeating unit, based on a singly or multiply sulfonated polyphenylene, of the general chemical formula:

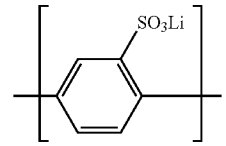

Within the scope of another specific embodiment, the at least one polymer electrolyte or the at least one polymer includes at least one repeating unit of the general chemical formula:

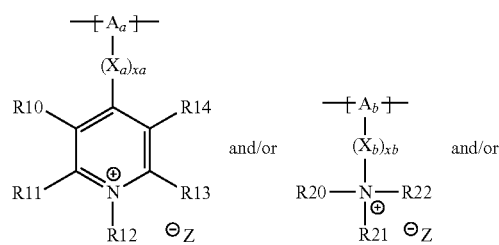

-continued for example

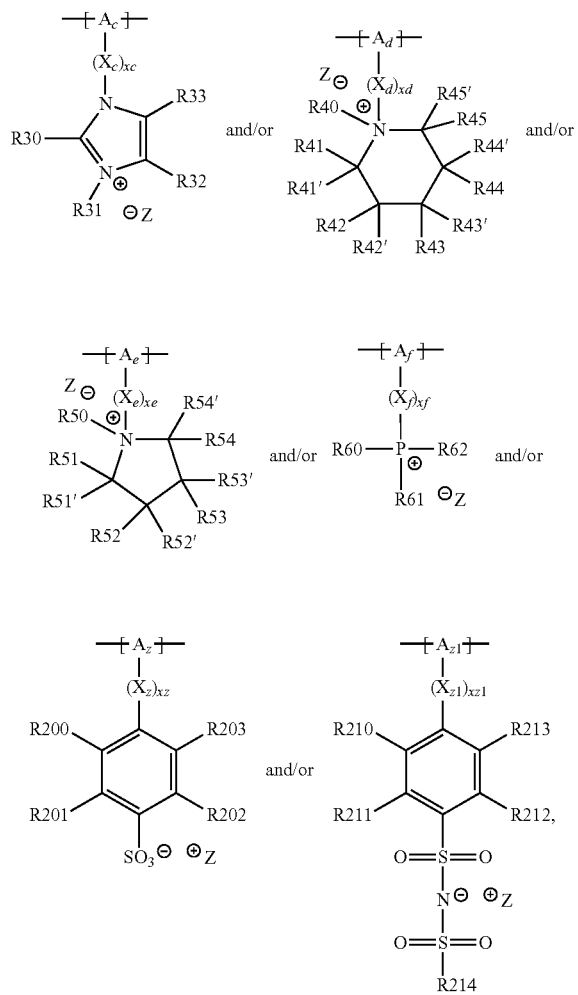

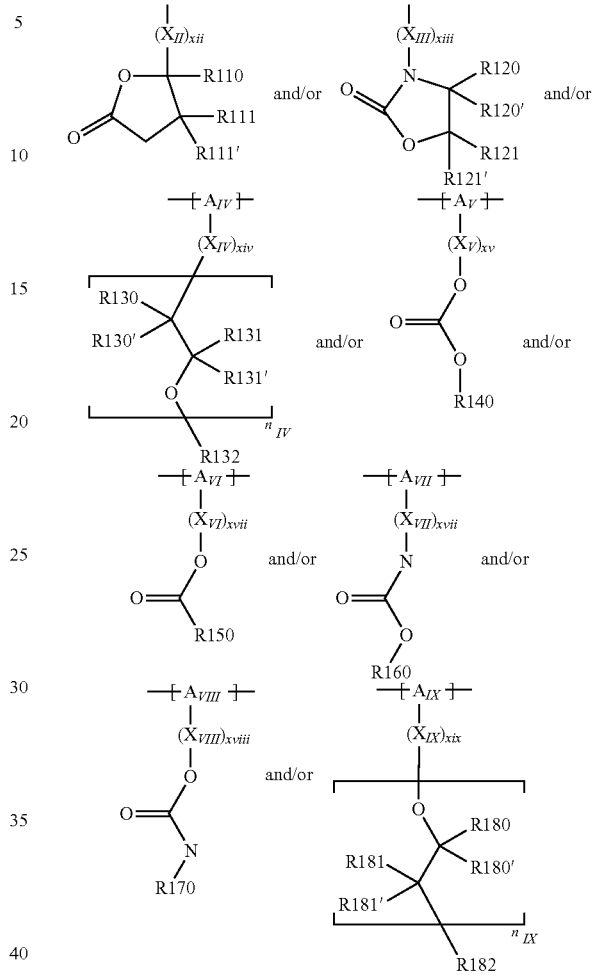

for example

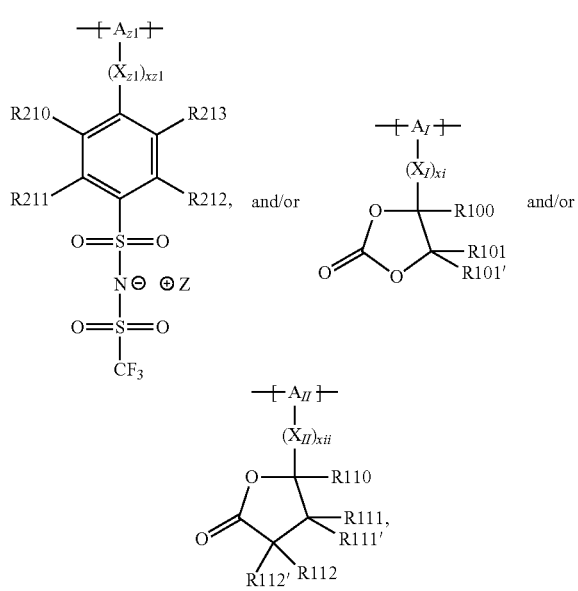

In this regard, -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]- stands in particular for a polymer backbone-forming unit. ($X_I$), ($X_{II}$), ($X_{III}$), ($X_{IV}$), ($X_V$), ($X_{VI}$), ($X_{VII}$), ($X_{VIII}$), ($X_{IX}$), ($X_a$), ($X_b$), ($X_c$), ($X_d$) ($X_e$), ($X_f$), ($X_Z$), or ($X_{Z1}$) stands in particular for a spacer. xi, xii, xiii, xiv, xv, xvi, xvii, xviii, xix, xa, xb, xc, xd, xe, xf, or xz stands for the number, in particular the presence or the absence, of (particular) spacers. In particular, xi, xii, xiii, xiv, xv, xvi, xvii, xviii, xix, xa, xb, xc, xd, xe, xf, or xz may stand for 1 or 0, for example 1. $n_{IV}$ stands for the number of ethylene oxide units, and is in particular $1 \leq n_{IV} \leq 15$, for example $2 \leq n_{IV} \leq 6$. $n_{IX}$ stands for the number of ethylene oxide units, and in particular is $1 \leq n_{IX} \leq 15$, for example $2 \leq n_{IX} \leq 6$.

Polymer backbone-forming unit -[$A_I$]-, -[$A_{II}$]-, -[$A_{III}$]-, -[$A_{IV}$]-, -[$A_V$]-, -[$A_{VI}$]-, -[$A_{VII}$]-, -[$A_{VIII}$]-, -[$A_{IX}$]-, -[$A_a$]-, -[$A_b$]-, -[$A_c$]-, -[$A_d$]-, -[$A_e$]-, -[$A_f$]-, -[$A_Z$]-, or -[$A_{Z1}$]- may be configured, for example, as described in conjunction with polymer backbone-forming unit -[A]-. Spacer ($X_I$), ($X_{II}$), ($X_{III}$), ($X_{IV}$), ($X_V$), ($X_{VI}$), ($X_{VII}$), ($X_{VIII}$), ($X_{IX}$), ($X_a$), ($X_b$), ($X_c$), ($X_d$) ($X_e$), ($X_f$), ($X_Z$), or ($X_{Z1}$) may be configured, for example, as described in conjunction with spacer X. R10, R11, R12, R13, R14, R20, R21, R22, R30, R31, R32, R33, R40, R41, R41', R42, R42', R43, R43', R44, R44', R45, R45', R50, R51, R51', R52, R52', R53, R53', R54, R54', R60, R61, R62, R100, R101, R101', R110, R111, R111', R112, R112', R120, R120', R121, R121', R130, R130', R131, R131', R132, R140, R150, R160, R170, R180, R180', R181, R181', R182, R200, R201, R202, R203, R210, R211, R212, R213, and/or R214 may likewise be configured, for example, as described above.

Spacer $(X_I)$, $(X_{II})$, $(X_{III})$, $(X_{IV})$, $(X_V)$, $(X_{VI})$, $(X_{VII})$, $(X_{VIII})$, $(X_{IX})$, $(X_a)$, $(X_b)$, $(X_c)$, $(X_d)$, $(X_e)$, $(X_f)$, $(X_Z)$, or $(X_{Z1})$ may in particular, as described in conjunction with spacer X, include at least one alkylene oxide group, for example an ethylene oxide group, in particular an oligoalkylene oxide group, for example an oligoethylene oxide group, or may be an alkylene oxide spacer, for example an ethylene oxide spacer, in particular an oligoalkylene oxide spacer, for example an oligoethylene oxide spacer.

For example, polymer backbone-forming unit $-[A_I]-$, $-[A_{II}]-$, $-[A_{III}]-$, $-[A_{IV}]-$, $-[A_V]-$, $-[A_{VI}]-$, $-[A_{VII}]-$, $-[A_{VIII}]-$, $-[A_{IX}]-$, $-[A_a]-$, $-[A_b]-$, $-[A_c]-$, $-[A_d]-$, $-[A_e]-$, $-[A_f]-$, $-[A_Z]-$, or $-[A_{Z1}]-$ may stand (at least) for an alkylene oxide unit, in particular an ethylene oxide unit and/or propylene oxide unit, and/or an alkylene unit and/or a unit which includes a carbonate group, and/or a methacrylate unit and/or a methyl methacrylate unit and/or a siloxane unit and/or a phosphazene unit and/or a phenylene unit. For example, polymer backbone-forming unit $-[A_I]-$, $-[A_{II}]-$, $-[A_{III}]-$, $-[A_{IV}]-$, $-[A_V]-$, $-[A_{VI}]-$, $-[A_{VII}]-$, $-[A_{VIII}]-$, $-[A_{IX}]-$, $-[A_a]$, $-[A_b]-$, $-[A_c]$, $-[A_d]$, $-[A_e]-$, $-[A_f]-$, $-[A_Z]-$, or $-[A_{Z1}]-$ may stand (at least) for a siloxane unit and/or a phosphazene unit and/or a methacrylate unit and/or a methyl methacrylate unit and/or a phenylene unit. In particular, polymer backbone-forming unit $-[A_I]-$, $-[A_{II}]-$, $-[A_{III}]-$, $-[A_{IV}]-$, $-[A_V]-$, $-[A_{VI}]-$, $-[A_{VII}]-$, $-[A_{VIII}]-$, $-[A_{IX}]-$, $-[A_a]-$, $-[A_b]-$, $-[A_c]-$, $-[A_d]-$, $-[A_e]-$, $-[A_f]-$, $-[A_Z]-$, or $-[A_{Z1}]-$ may stand (at least) for a siloxane unit and/or a phosphazene unit and/or a methacrylate unit and/or a methyl methacrylate unit.

R10, R11, R13, and/or R14, or R30, R32, and/or R33, or R41, R41', R42, R42', R43, R43', R44, R44', R45, and/or R45', or R51, R51', R52, R52', R53, R53', R54, and/or R54', or R200, R201, R202, and/or R203, or R210, R211, R212, R213, and/or R214, or R100, R101, and/or R101', or R110, R111, R111', R112, and/or R112', or R120, R120', R121, and/or R121', or R130, R130', R131, and/or R131', or R150 or R180, R180', R181, R181', and/or R182 may in particular in each case independently stand for hydrogen and/or a halogen atom, in particular fluorine, and/or an alkyl group and/or an alkylene oxide group, in particular an oligoalkylene oxide group, and/or an alkoxy group and/or a phenylene oxide group, in particular an oligophenylene oxide group, and/or a phenoxy group and/or a phenylene group, in particular an oligophenylene group, and/or a phenyl group and/or a benzylene group, in particular an oligobenzylene group, and/or a benzyl group and/or a carbonyl group, and/or an in particular cyclic and/or acyclic carbonate group, and/or an in particular cyclic and/or acyclic carboxylic acid ester group, in particular a lactone group, and/or an in particular cyclic and/or acyclic carbamate group, and/or a charged group, for example a positively charged group, in particular based on a cation of an ionic liquid, for example a quaternary ammonium group and/or a quaternary phosphonium group, and/or a negatively charged group, in particular based on a conducting salt anion, in particular a lithium conducting salt anion, and/or an anion of an ionic liquid, in particular a sulfonylimide group, and/or a sulfonate group, for example a lithium sulfonate group and/or a lithium sulfonate group.

R12 or R20, R21, and R22, or R31 or R40 or R50, or R60, R61, and R62, or R132 or R140 or R160 or R170 may in particular in each case independently stand for an alkyl group and/or an alkylene oxide group, in particular an oligoalkylene oxide group, and/or an alkoxy group and/or a phenylene oxide group, in particular an oligophenylene oxide group, and/or a phenoxy group and/or a phenylene group, in particular an oligophenylene group, and/or a phenyl group and/or a benzylene group, in particular an oligobenzylene group, and/or a benzyl group and/or a carbonyl group, and/or an in particular cyclic and/or acyclic carbonate group, and/or an in particular cyclic and/or acyclic carboxylic acid ester group, and/or an in particular cyclic and/or acyclic carbamate group.

The at least one polymer electrolyte or the at least one polymer may be a homopolymer or also a copolymer, for example a block copolymer, for example a multiblock copolymer, and/or an alternating copolymer and/or a statistical copolymer. The cathode material or the polymer electrolyte may, for example, include or be a homopolymer as well as multiple homopolymers, and/or a copolymer as well as multiple copolymers, or also a homopolymer-copolymer mixture.

Within the scope of one specific embodiment, the at least one polymer electrolyte is a homopolymer, or the cathode material includes at least one homopolymer, which includes at least one repeating unit of the general chemical formula:

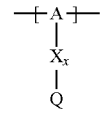

A, X, x, and Q may be configured as described above. In particular, the homopolymer may include one of the particular repeating units described above.

Within the scope of another specific embodiment, the at least one polymer electrolyte is a copolymer, or the cathode material includes at least one copolymer, for example a block copolymer, for example a multiblock copolymer, and/or an alternating copolymer and/or a statistical copolymer, which includes at least one first repeating unit and at least one second repeating unit that is different from the at least one first repeating unit, the at least one first repeating unit having the general chemical formula:

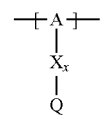

A, X, x, and Q may be configured as described above. In particular, the copolymer may include one of the particular repeating units described above. In particular, the at least one first repeating unit may include or be one of the particular repeating units described above.

The at least one second repeating unit may, for example, be any arbitrary polymer backbone-forming unit. For example, the at least one second repeating unit may include or be an alkylene oxide unit, for example a perfluorinated alkylene oxide unit and/or a perfluoropolyether unit, and/or a carbonate unit and/or a siloxane unit and/or a phosphazene unit and/or a methyl methacrylate unit and/or a methacrylate unit and/or a phenylene unit and/or a phenylene oxide unit and/or a benzylene unit and/or an alkylene unit and/or a styrene unit. In particular, the at least one second repeating unit may include or be an alkylene oxide unit and/or a siloxane unit and/or a phosphazene unit and/or a methyl methacrylate unit and/or a methacrylate unit, for example a phenylene oxide unit, and/or an alkylene unit and/or a phenylene unit.

The at least one second repeating unit may optionally have no group Q, and may be, for example, an in particular single alkylene oxide unit, for example a perfluorinated alkylene oxide unit and/or a perfluoropolyether unit, and/or a carbonate unit and/or a siloxane unit and/or a phosphazene unit and/or a methyl methacrylate unit and/or a methacrylate unit and/or a phenylene unit and/or a phenylene oxide unit and/or a benzylene unit and/or an alkylene unit, for example an alkylene oxide unit and/or a phenylene unit, or some other polymer backbone-forming unit, for example a (poly) styrene unit. (Poly)phenylene units and/or (poly)styrene units, which may result in higher glass transition temperatures, may be advantageous with regard to mechanical properties.

Polymer backbone-forming unit -[A]-, for example -[A$_I$]-, -[A$_{II}$]-, -[A$_{III}$]-, -[A$_{IV}$]-, -[A$_V$]-, [A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]-, the at least one first repeating unit, and the polymer backbone-forming unit of the at least one second repeating unit may be the same or different, and may be selected, for example, from the group of alkylene oxide unit/s, in particular ethylene oxide unit/s and/or propylene oxide unit/s, and/or in particular unit/s which include organic carbonate groups, and/or siloxane unit/s and/or phosphazene unit/s and/or methyl methacrylate unit/s and/or methacrylate unit/s and/or phenylene unit/s and/or phenylene oxide unit/s and/or benzylene unit/s and/or alkylene unit/s.

In particular, polymer backbone-forming unit -[A]-, for example -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]-, the at least one first repeating unit, and the polymer backbone-forming unit of the at least one second repeating unit may be selected from the same polymer class, for example the polymer classes described in conjunction with -[A]-, -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$], -[A$_d$], -[A$_e$]-, -[A$_f$]-, -[A$_Z$]-, or -[A$_{Z1}$]-, for example the siloxane units (from the class of polysiloxanes). The synthesis may advantageously be simplified in this way. However, polymer backbone-forming unit -[A]-, for example -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]-, the at least one first repeating unit, and the polymer backbone-forming unit of the at least one second repeating unit may be optionally be functionalized differently from one another.

However, polymer backbone-forming unit -[A]-, for example -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]-, the at least one first repeating unit, and the polymer backbone-forming unit of the at least one second repeating unit may also be selected from different polymer classes, for example the polymer classes described in conjunction with -[A]-, -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]-, for example siloxane units (from the class of polysiloxanes) and the alkylene oxide units (from the class of polyalkylenes or polyethers), and/or may differ from one another by different functionalizations. Polymer blocks having various properties, among them mechanical and/or solvating and/or electrical properties, may thus advantageously be achieved in order to thus set advantageous solvation properties combined with high ion conductivities.

One example of such is the siloxane-ethylene oxide copolymer of the general chemical formula:

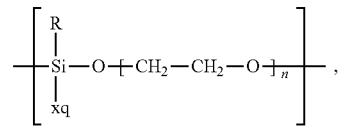

for example

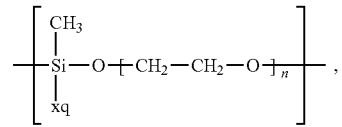

in particular where R stands for an alkyl group, for example a methyl, ethyl, or propyl group, and n stands for the repetition number of the ethylene oxide unit, for example $1 \leq n \leq 10$.

However, polymer backbone-forming unit -[A]-, for example -[A$_I$]-, -[A$_{II}$]-, -[A$_{III}$]-, -[A$_{IV}$], -[A$_V$], -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]-, the at least one first repeating unit, and the polymer backbone-forming unit of the at least one second repeating unit may in particular be selected from the same polymer class, for example the phenylene units (polyphenylenes) or the alkylene units (polyolefins), and may differ from one another by different functionalizations or lack of functionalizations, for example different groups Q and/or different spacers.

Examples of such are the phenylene-phenylene copolymer of the general chemical formula:

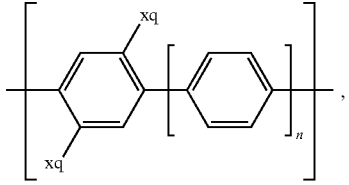

in particular where n stands for the repetition number of the phenylene unit of the unsubstituted repeating unit, for example for $0 \leq n \leq 3$, and/or the phenylene-phenylene copolymer of the general chemical formula:

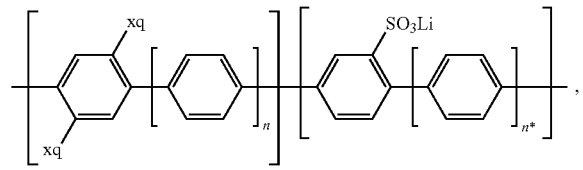

in particular where n and n* stand for the repetition numbers of the unsubstituted phenylene units, and for example 0≤n≤3 and 0≤n*≤3, and/or the alkylene-alkylene copolymer of the general chemical formula:

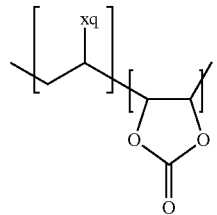

For example, the at least one second repeating unit may include a polymer backbone-forming structural unit, for example selected from the group of siloxane unit/s and/or phosphazene unit/s and/or methyl methacrylate unit/s and/or methacrylate unit/s and/or phenylene unit/s, for example having a side group which contains a carbonate group and/or an alkylene oxide group, for example an oligoalkylene oxide. The side group containing the carbonate group and/or alkylene oxide group may, for example, be bound to an atom of the polymer backbone-forming structural unit. However, the side group containing the carbonate group and/or alkylene oxide group, in particular the carbonate group, may also be cyclically bound to two atoms of the polymer backbone-forming structural unit. The polymer backbone that is formed may itself include carbonate groups or alkylene oxide groups, for example a polycarbonate or a polyalkylene oxide, or may also be free of carbonate groups or alkylene oxide groups.

Within the scope of one particular embodiment, however, the at least one second repeating unit includes a repeating unit, which is different from the at least one first repeating unit, of the general chemical formula:

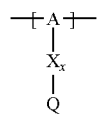

For example, the at least one second repeating unit may include or be one of the particular repeating units described above.

For example, polymer backbone-forming unit -[A]-, for example -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]-, the at least one first repeating unit, and polymer backbone-forming unit -[A]-, for example -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]-, and the at least one second repeating unit may be selected from different polymer classes, for example the siloxane units (polysiloxanes) and the alkylene oxide units (polyalkylenes, polyethers), and/or may differ from one another by different functionalizations.

However, polymer backbone-forming unit -[A]-, for example -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]-, the at least one first repeating unit, and polymer backbone-forming unit -[A]-, for example -[A$_I$]-, -[A$_{II}$]-, -[A$_{III}$]-, -[A$_{IV}$]-, -[A$_V$]-, -[A$_{VI}$]-, -[A$_{VII}$]-, -[A$_{VIII}$]-, -[A$_{IX}$]-, -[A$_a$]-, -[A$_b$]-, -[A$_c$]-, -[A$_d$]-, -[A$_e$]-, -[A$_f$]-, -[A$_Z$]-, or -[A$_{Z1}$]-, and the at least one second repeating unit may in particular be selected from the same polymer class, for example the siloxane unit/s (polysiloxanes) and/or phosphazene unit/s (polyphosphazenes) and/or methyl methacrylate unit/s (methyl methacrylates) and/or methacrylate unit/s (methacrylates) and/or the phenylene unit/s (polyphenylenes) or the alkylene units (polyolefins), and may differ from one another by different functionalizations or lack of functionalizations, for example different groups Q and/or different spacers.

Within the scope of another specific embodiment, the polymer electrolyte includes or is at least one copolymer (P), for example a block copolymer, for example a multiblock copolymer, and/or an alternating copolymer and/or a statistical copolymer, in particular a block copolymer, for example a comb copolymer, of the general chemical formula:

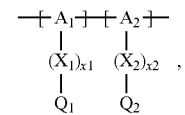

whereby the repeating units

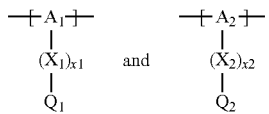

are repeating units, which are different from one another, of the general chemical formula:

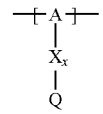

For example, the repeating units may include or be the particular repeating units described above.

Within the scope of one embodiment of this specific embodiment, the repeating units

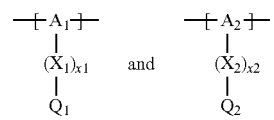

include repeating units, which are different from one another, of the general chemical formula:

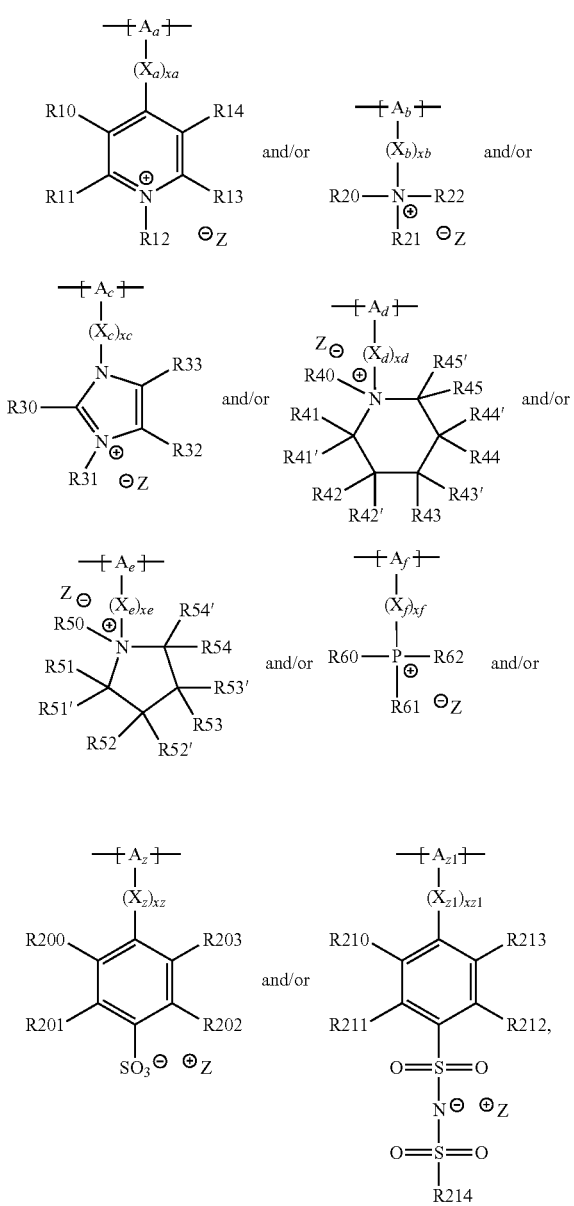

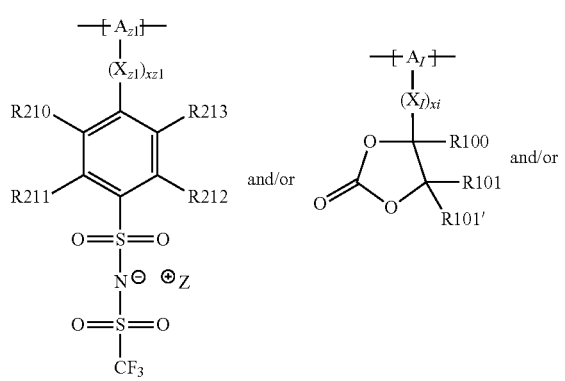

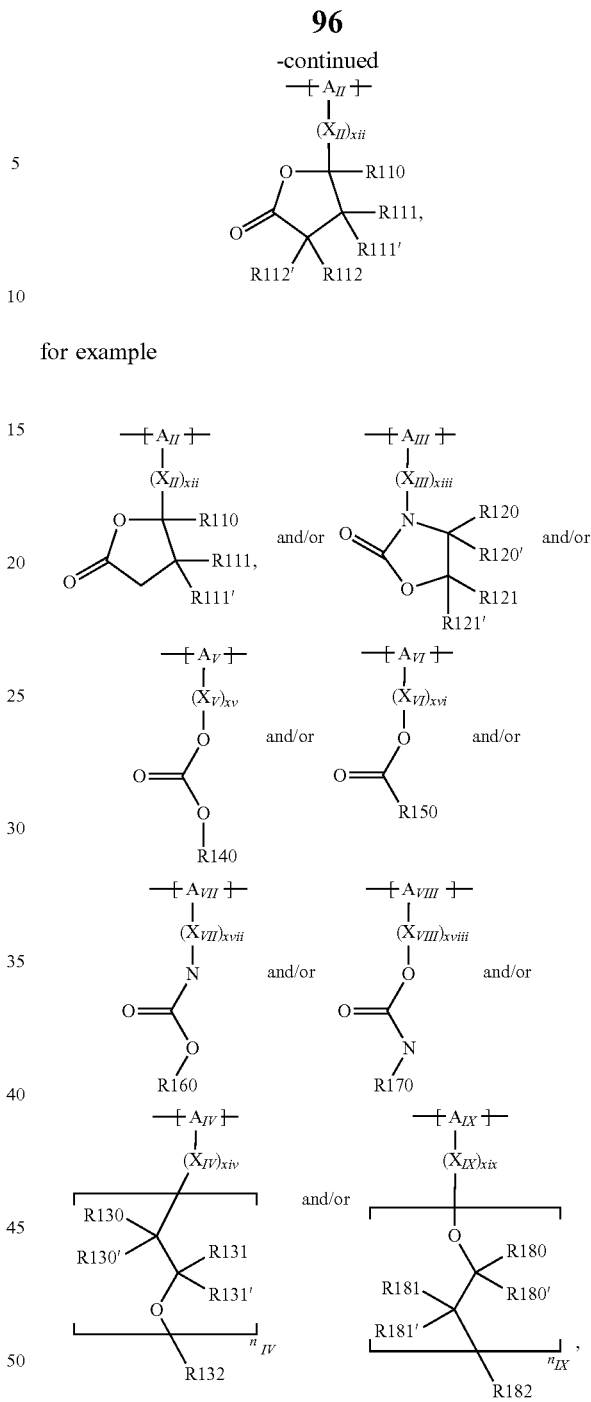

for example or stand for at least one repeating unit of the above general chemical formulas. The combination of the above repeating units may, compared to the corresponding homopolymers, result in an increase in the ion conductivity, in particular the lithium ion conductivity, optionally in a mixture with a lithium salt. The molecular weight or the average number of repeating units of the polymers may be closely correlated with the glass [transition] temperature of the pure polymer, which may decisively determine the resulting lithium ion conductivity of the polymer/salt mixture.

Within the scope of one particular embodiment of this specific embodiment, the at least one first repeating unit, for example the repeating unit:

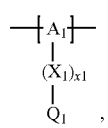

includes or stands for (at least) one repeating unit of the general chemical formula:

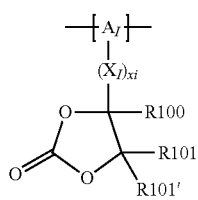 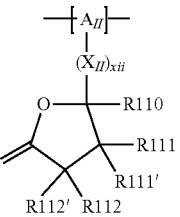

for example

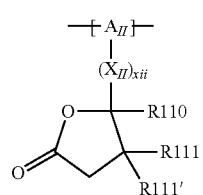 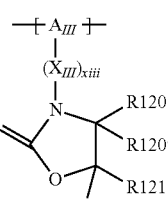

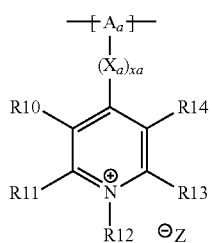 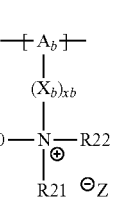

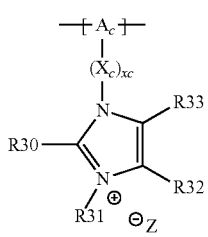 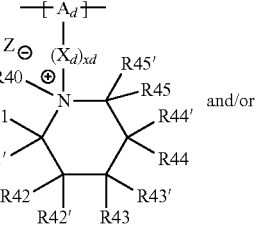

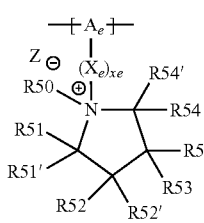 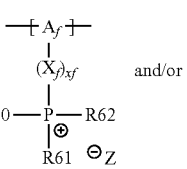

-continued

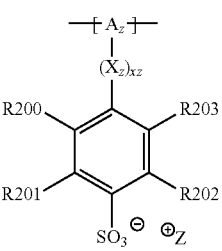 and/or 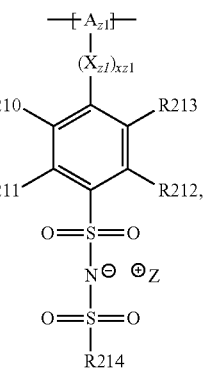

for example

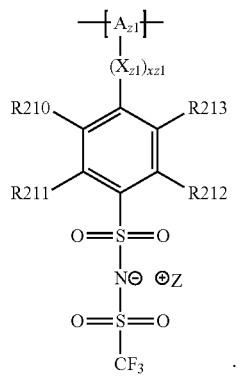

In addition, the combination of the above repeating units with repeating units which bear an oligoethylene oxide function, for example an (oligo)ethylene oxide group with $1 \leq n_{IV}$ or $n_{IX} \leq 15$, for example $2 \leq n_{IV}$ or $n_{IX} \leq 6$, repeating units, may, compared to the corresponding homopolymers, result in an increase in the ion conductivity, in particular the lithium ion conductivity, optionally in a mixture with a lithium salt.

The at least one second repeating unit, for example the repeating unit:

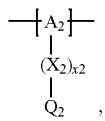

may therefore include or be, for example, one or multiple repeating units which bear an oligoethylene oxide function, for example an (oligo)ethylene oxide group, with $1 \leq n \leq 15$, for example $2 \leq n \leq 6$, repeating units.

Within the scope of another, additional or alternative, particular embodiment of this specific embodiment, the at least one second repeating unit, for example the repeating unit:

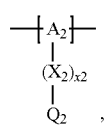

includes or stands for (at least) one repeating unit of the general chemical formula:

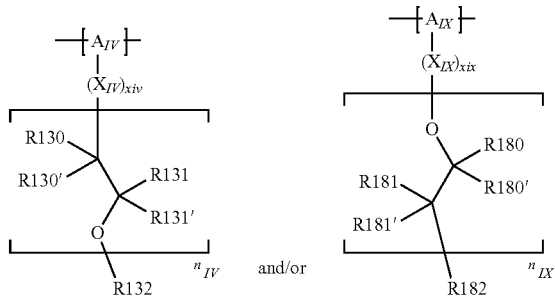

To keep the dissolution of polysulfides preferably low, for example the proportion of ethylene oxide units may be low, for example as low as possible. However, the polysulfide solubility may be reduced by fluorinating the ethylene oxide units or also polyethers, in particular polyethylene oxide and/or polypropylene oxide. In particular, the at least one second repeating unit may therefore contain perfluorinated alkylene oxide units, in particular perfluorinated ethylene oxide units, or a perfluoropolyether. For example, group R130-132 or group R180-R182 could be perfluorinated and/or stand for a fluorine atom.

As explained above, for these reasons spacer X, $(X_I)$, $(X_{II})$, $(X_{III})$, $(X_{VI})$, $(X_V)$, $(X_{VI})$, $(X_{VII})$, $(X_{VIII})$, $(X_{IX})$, $(X_a)$, $(X_b)$, $(X_c)$, $(X_d)$, $(X_e)$, $(X_f)$, $(X_Z)$, or $(X_{Z1})$ and/or polymer backbone-forming unit -[A]-, $[A_I]$-, $[A_{II}]$-, -$[A_{III}]$-, -$[A_{IV}]$-, -$[A_V]$-, -$[A_{VI}]$-, -$[A_{VII}]$-, -$[A_{VIII}]$-, -$[A_{IX}]$-, -$[A_a]$-, -$[A_b]$-, -$[A_c]$-, -$[A_d]$-, -$[A_e]$-, -$[A_f]$-, -$[A_Z]$-, or -$[A_{Z1}]$- and/or group Q or $Q^+$ or $Q^-$ or the groups containing R10-R213 may also have perfluorinated alkylene oxide groups, in particular perfluorinated ethylene oxide groups and/or perfluorinated propylene oxide groups, for example perfluorinated oligoalkylene oxide groups, for example perfluorinated oligoethylene oxide groups and/or perfluorinated oligopropylene oxide groups, and/or may be perfluorinated.

Within the scope of one particular embodiment, the polymer electrolyte includes or is (at least) one copolymer (P), for example a block copolymer, for example a multiblock copolymer and/or an alternating copolymer and/or a statistical copolymer, in particular a block copolymer, for example a comb copolymer, of the general chemical formula:

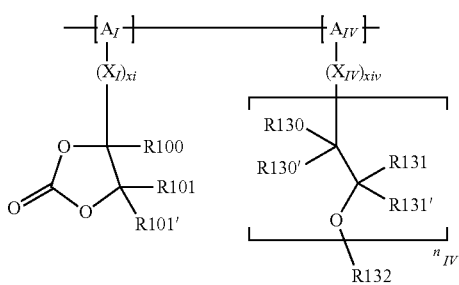

For example, the polymer electrolyte may be based on or be a copolymer, for example a block copolymer, for example a multiblock copolymer, and/or an alternating copolymer and/or a statistical copolymer of this general chemical formula. For example, the copolymer may be a block copolymer or an alternating copolymer or a statistical copolymer, for example a block copolymer or an alternating copolymer. In particular, the copolymer of this general chemical formula may be a block copolymer. A comparatively high lithium ion conductivity may advantageously be achieved by use of such a copolymer, for example block copolymers, for example a comb copolymer.

For example, the polymer electrolyte may include, for example be based on, or for example be, a copolymer, for example a block copolymer, for example a multiblock copolymer, and/or an alternating copolymer and/or a statistical copolymer, in particular a block copolymer, of the general chemical formula:

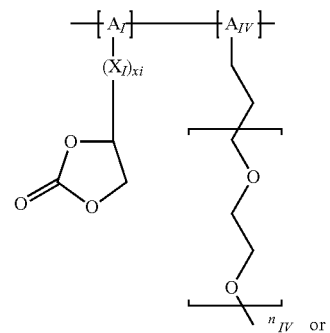

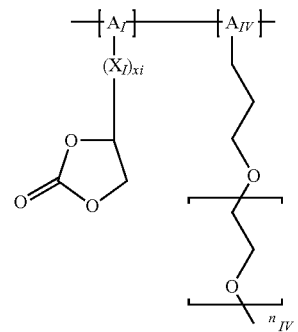

Within the scope of one particular embodiment, the polymer electrolyte includes or is (at least) one copolymer (P), for example a block copolymer, for example a multiblock copolymer, and/or an alternating copolymer and/or a statistical copolymer, in particular a block copolymer, for example a comb copolymer, of the general chemical formula:

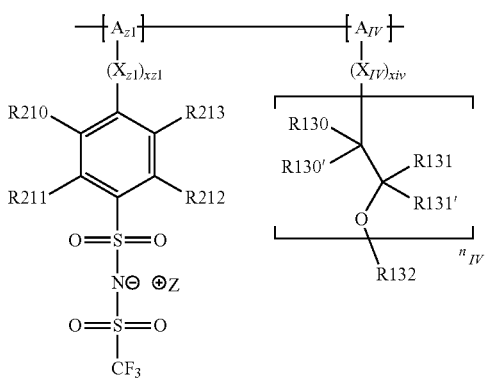

For example, the polymer electrolyte may be based on or be a copolymer, for example a block copolymer, for example a multiblock copolymer, and/or an alternating copolymer and/or a statistical copolymer of this general chemical formula. For example, the copolymer may be a block copolymer or an alternating copolymer or a statistical copolymer, for example a block copolymer or an alternating copolymer. In particular, the copolymer of this general chemical formula may be a block copolymer. A comparatively high lithium ion conductivity may advantageously be achieved by use of such a copolymer, for example block copolymers, for example a comb copolymer.

For example, the polymer electrolyte may include, for example be based on, or for example be, a copolymer, for example a block copolymer, for example a multiblock copolymer, and/or an alternating copolymer and/or a statistical copolymer, in particular a block copolymer, for example a comb copolymer, of the general chemical formula:

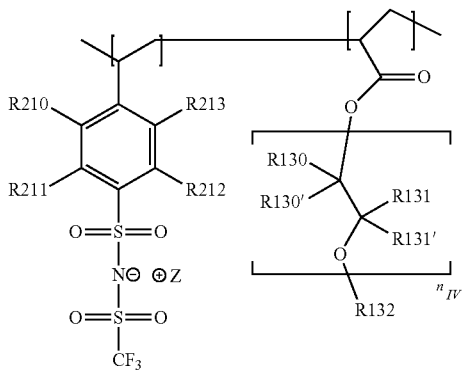

Within the scope of another specific embodiment, the polymer electrolyte (additionally) includes at least one (singly or multiply) fluorinated, for example perfluorinated, and/or lithium sulfonate-substituted polymer. For example, the at least one fluorinated and/or lithium sulfonate-substituted polymer may be a perfluoropolyether and/or a lithium sulfonate-substituted, in particular fluorinated, for example perfluorinated, polyolefin, for example a tetrafluoroethylene polymer, and/or a lithium sulfonate-substituted, in particular fluorinated, for example perfluorinated, polyether, for example a lithium ion-containing, for example a lithium ion-exchanged, Nafion, and/or a lithium sulfonate-substituted, in particular fluorinated, for example perfluorinated, polyphenylene. The lithium conductivity may optionally be further increased in this way. Lithium sulfonate-substituted and/or fluorinated polymers such as lithium-Nafion, and/or polyphenylenes substituted with lithium sulfonate, and/or fluorinated, in particular perfluorinated, polyethers (perfluoropolyethers) may advantageously be used in lithium-sulfur cells, for example with a sulfur-carbon composite, for example SPAN, as cathode active material, in particular since a reduced polysulfide solubility may thus be achieved. Fluorinated, in particular perfluorinated, polyethers (perfluoropolyethers) may be used in a particularly advantageous manner in combination with at least one lithium conducting salt in lithium-sulfur cells, for example with a sulfur-carbon composite, for example SPAN, as cathode active material. Lithium-Nafion may have, for example, a repeating unit combination of an unsubstituted tetrafluoroethylene unit and a lithium sulfonate-substituted tetrafluoroethylene unit, for example with an oligoalkylene oxide spacer, and for example may be based on the general chemical formula:

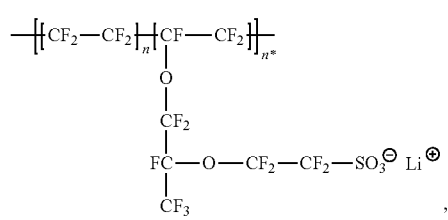

where n stands for the repetition number of the unsubstituted tetrafluoroethylene units and n* stands for the repetition number of the repeating unit combination.

Another example of a lithium sulfonate-substituted, for example fluorinated, for example perfluorinated, polymer is a lithium sulfonate-substituted polyphenylene with a lithium sulfonate-substituted phenylene unit and optionally an unsubstituted phenylene unit, for example which is based on the general chemical formula:

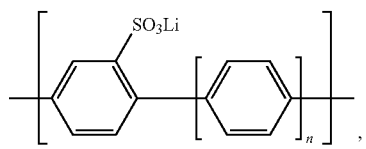

in particular where n stands for the repetition number of the unsubstituted phenylene units, for example $0 \leq n \leq 3$.

Within the scope of another specific embodiment, the polymer electrolyte includes a polymer mixture, in particular a polymer blend, of at least one first polymer and at least one second polymer. The at least one first polymer may include or be (at least) one polymer according to the present invention, for example a homopolymer and/or copolymer, for example a block copolymer, for example a multiblock copolymer, and/or an alternating copolymer and/or a statistical copolymer, in particular a block copolymer, for example a comb copolymer, in particular which includes at least one repeating unit of the general chemical formula:

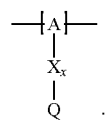

A, X, x, and Q may be configured as described above. For example, the polymer mixture copolymer may include at least one of the particular repeating units described above. In particular, the at least one first repeating unit may include or be one of the particular repeating units described above.

The at least one second polymer may, for example, be (at least) one arbitrary polymer. For example, the at least one second polymer may include or be a polyalkylene oxide (polyether), in particular a perfluoropolyether, and/or a polycarbonate and/or a polysiloxane and/or a polyphosphazene and/or a polymethyl methacrylate and/or a polymethacrylate and/or a polyphenylene and/or a polyphenylene oxide and/or a polybenzylene and/or a polyolefin and/or a polystyrene. For example, the at least one second polymer may include or be a polyalkylene oxide and/or a polysiloxane and/or a polyphosphazene and/or a polymethyl methacrylate and/or a polymethacrylate and/or a polyolefin and/or a polyphenylene, in particular a polyalkylene oxide and/or polyolefin and/or a polyphenylene.

For example, the at least one second polymer may include no group Q, and may, for example, be an in particular single polyalkylene oxide (polyether), in particular a perfluoropolyether and/or polycarbonate and/or polysiloxane and/or polyphosphazene and/or polymethyl methacrylate and/or polymethacrylate and/or polyphenylene and/or polyphenylene oxide and/or polybenzylene unit, and/or polyolefin, for example a polyalkylene oxide (polyether) and/or polyphenylene, for example a para-polyphenylene, and/or a polystyrene or some other polymer.

Perfluoropolyethers, optionally in combination with at least one lithium conducting salt, may advantageously be used as polymer electrolyte in particular in lithium-sulfur cells, in particular with SPAN as cathode material. (Poly)phenylene units and/or (poly)styrene units, which may result in higher glass transition temperatures, may be advantageous with regard to mechanical properties, in particular as a lithium ion-conductive matrix for SPAN.

However, within the scope of one particular embodiment, the at least one second polymer includes or is (at least) one polymer according to the present invention, in particular a homopolymer and/or copolymer, with at least one repeating unit that is different from the at least one repeating unit of the at least one first polymer, in particular of the general chemical formula:

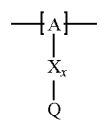

and/or at least one fluorinated and/or lithium sulfonate-substituted polymer, in particular a perfluoropolyether and/or a lithium sulfonate-substituted, in particular fluorinated, polyolefin, and/or a lithium sulfonate-substituted, in particular fluorinated, polyether, and/or a lithium sulfonate-substituted, in particular fluorinated, polyphenylene, for example a lithium ion-containing, for example lithium ion-exchanged, Nafion. A, X, x, and Q may be configured as described above. The lithium conductivity may optionally be further increased in this way.

Within the scope of another specific embodiment, the at least one polymer electrolyte includes or is at least one polymer, in particular polymer electrolyte, which includes at least one repeating unit of the general chemical formula:

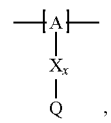

where -[A]- stands for a polymer backbone-forming unit, X stands for a spacer, x stands for the number of spacers X and is 1 or 0, and Q stands for a negatively charged group $Q^-$ and a counterion $Z^+$, or Q stands for a positively charged group $Q^+$ and a counterion $Z^-$. This has proven to be particularly advantageous, since the ion dissociation may be increased and the polysulfide solubility may be reduced in this way.

Within the scope of one embodiment of this specific embodiment, the at least one polymer electrolyte includes or is:

(at least) one copolymer, for example a block copolymer, for example a multiblock copolymer, and/or an alternating copolymer and/or a statistical copolymer, in particular a block copolymer, for example a comb copolymer, which includes at least one first repeating unit and at least one second repeating unit that is different from the at least one first repeating unit, the at least one first repeating unit having the general chemical formula:

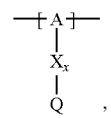

and/or a polymer mixture, in particular a polymer blend, of at least one first polymer and at least one second polymer, the at least one first polymer including at least one repeating unit of the general chemical formula:

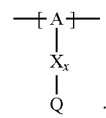

A, X, x, and Q may be configured as described above. For example, the (co)polymer or the polymer mixture may include at least one of the particular repeating units described above.

Repeating units with a positively charged group $Q^+$ and a counterion $Z^-$, and/or with a negatively charged group $Q^-$ and a counterion $Z^+$ in combination with uncharged, ion-conductive, or ion-conducting, groups, for example alkylene oxide groups and/or cyclic and/or acyclic carbonate groups and/or cyclic and/or acyclic carboxylic acid ester groups, for example lactone groups, and/or cyclic and/or acyclic carbamate groups, in particular alkylene oxide groups, such as oligoalkylene oxide groups and/or polyethers, may [be used] in a particularly advantageous manner, since the ion dissociation may be increased by positively charged group $Q^+$ or negatively charged group $Q^-$, and the ion mobility may be increased by uncharged group Q, which overall may result in a significant increase in the ion conductivity, for example the lithium ion conductivity.

Therefore, the at least one second repeating unit and/or the at least one second polymer in particular may include an alkylene oxide and/or a cyclic carbonate group and/or a lactone group and/or a cyclic carbamate group and/or an acyclic carbonate group and/or an acyclic carboxylic acid ester group and/or an acyclic carbamate group.

Within the scope of one embodiment of this specific embodiment,
- the at least one second repeating unit is an alkylene oxide unit and/or a repeating unit which bears an alkylene oxide function (alkylene oxide group), and/or
- the at least one second polymer is and/or includes a polyalkylene oxide (polyether) and/or a repeating unit which bears an alkylene oxide function (alkylene oxide group).

A combination of a positively or negatively charged group $Q^+$, $Q^-$, respectively, and an alkylene oxide, for example an alkylene oxide unit and/or an alkylene oxide function, and/or a polyalkylene oxide, has been proven to be particularly advantageous, since the ion dissociation may be increased by positively charged group $Q^+$ or negatively charged group $Q^-$, and the ion mobility may be increased by the alkylene oxide, which overall may result in a significant increase in the ion conductivity, for example the lithium ion conductivity.

In particular, the copolymer may be a block copolymer, for example a multiblock copolymer. In particular, the length of the blocks may be selected in such a way that the conducting salt, in particular the lithium conducting salt, is present in dissociated form, and at the same time a sufficient mobility of the ions, in particular lithium ions, in the alkylene oxide, for example polyether, is present.

The at least one second repeating unit may in particular be an alkylene oxide unit and/or a repeating unit which bears an alkylene oxide function, for example an oligoalkylene oxide function, for example with 1 or 2 to 15, for example 2 to 6, repeating units. For example, the at least one second repeating unit may be an ethylene oxide unit and/or a propylene oxide unit and/or a repeating unit which bears an ethylene oxide function and/or a propylene oxide function, for example an oligoethylene oxide function and/or an oligopropylene oxide function, for example with 1 or 2 to 15, for example 2 to 6, repeating units.

In particular, the at least one second repeating unit may be an ethylene oxide unit and/or a repeating unit which bears an ethylene oxide function, for example an oligoethylene oxide function, for example an (oligo)ethylene oxide group with 1 or 2 to 15, for example 2 to 6, repeating units.

The at least one second polymer may in particular be a polyalkylene oxide (polyether), and/or may include a repeating unit which bears an alkylene oxide function, for example an oligoalkylene oxide function, for example with 1 or 2 to 15, for example 2 to 6, repeating units. For example, the at least one second polymer may be a polyethylene oxide (PEO) and/or polypropylene oxide, and/or may include a repeating unit which bears an ethylene oxide function and/or a propylene oxide function, for example an oligoethylene oxide function and/or an oligopropylene oxide function, for example with 1 or 2 to 15, for example 2 to 6, repeating units. In particular, the at least one second polymer may be a polyethylene oxide (PEO), and/or may include a repeating unit which bears an ethylene oxide function, for example an oligoethylene oxide function, for example an (oligo)ethylene oxide group with 1 or 2 to 15, for example 2 to 6, repeating units.

The at least one second repeating unit and/or the at least one second polymer may optionally be fluorinated and/or substituted with lithium sulfonate. For example, the at least one second repeating unit and/or the at least one second polymer may include or be a perfluoropolyether and/or a lithium sulfonate-substituted, in particular fluorinated, polyolefin, and/or a lithium sulfonate-substituted, in particular fluorinated, polyether, and/or a lithium sulfonate-substituted, optionally fluorinated, polyphenylene.

Within the scope of one particular embodiment of this specific embodiment,
- the at least one second repeating unit is a partially or completely fluorinated, in particular perfluorinated, alkylene oxide unit, and/or a repeating unit which bears a partially or completely fluorinated, in particular perfluorinated, alkylene oxide function, for example oligoalkylene oxide function, and/or
- the at least one second polymer is a partially or completely fluorinated, in particular perfluorinated, polyalkylene oxide (perfluoropolyether), and/or includes a repeating unit which bears a partially or completely fluorinated, in particular perfluorinated, alkylene oxide function, for example oligoalkylene oxide function.

The polysulfide solubility may advantageously be reduced by fluorination.

The at least one second repeating unit may in particular be a partially or completely fluorinated, in particular perfluorinated, alkylene oxide unit, and/or a repeating unit which bears a partially or completely fluorinated, in particular perfluorinated, alkylene oxide function, for example an oligoalkylene oxide function, for example with 1 or 2 to 15, for example 2 to 6, repeating units. For example, the at least one second repeating unit may be a partially or completely fluorinated, in particular perfluorinated, ethylene oxide unit and/or propylene oxide unit, and/or may be a repeating unit which bears a partially or completely fluorinated, in particular perfluorinated, ethylene oxide function and/or propylene oxide function. In particular, the at least one second repeating unit may be a partially or completely fluorinated, in particular perfluorinated, ethylene oxide unit, and/or may be a repeating unit which bears a partially or completely fluorinated, in particular perfluorinated, ethylene oxide function, for example an oligoethylene oxide function.

The at least one second polymer may in particular be a partially or completely fluorinated, in particular perfluorinated, polyalkylene oxide (polyether), and/or may include a repeating unit which bears a partially or completely fluorinated, in particular perfluorinated, alkylene oxide function, for example an oligoalkylene oxide function, for example with 1 or 2 to 15, for example 2 to 6, repeating units. For example, the at least one second polymer may be a partially or completely fluorinated, in particular perfluorinated, polyethylene oxide and/or propylene oxide, and/or may include a repeating unit which bears a partially or completely fluorinated, in particular perfluorinated, ethylene oxide function and/or propylene oxide function. In particular, the at least one second polymer may be a partially or completely fluorinated, in particular perfluorinated, polyethylene oxide, and/or may include a repeating unit which bears a partially or completely fluorinated, in particular perfluorinated, ethylene oxide function, for example an oligoethylene oxide function.

Within the scope of one particular embodiment of this specific embodiment, the at least one polymer electrolyte, in particular of the cathode material includes or is at least one repeating unit of the general chemical formula:

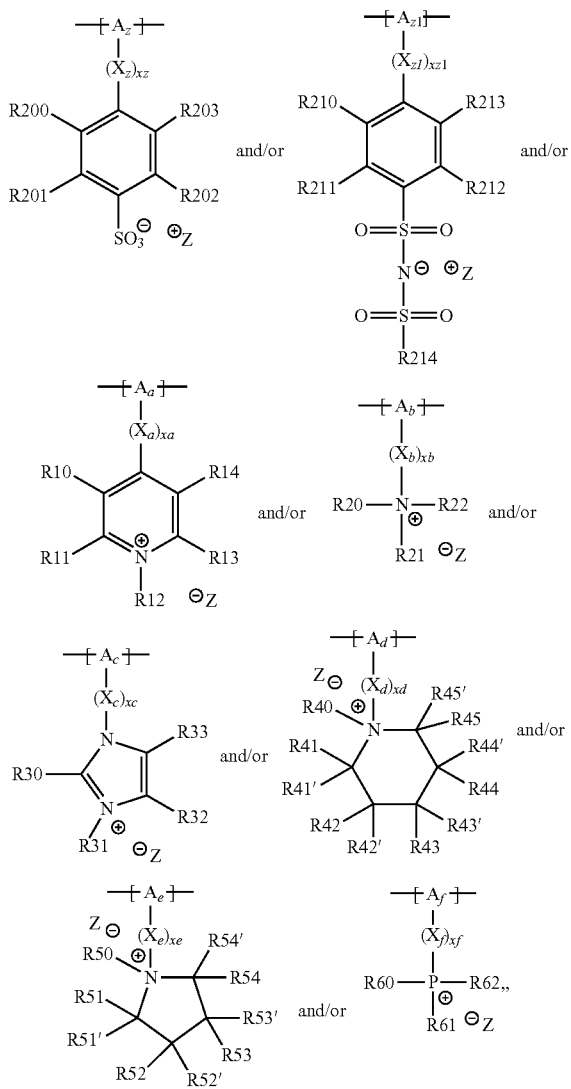

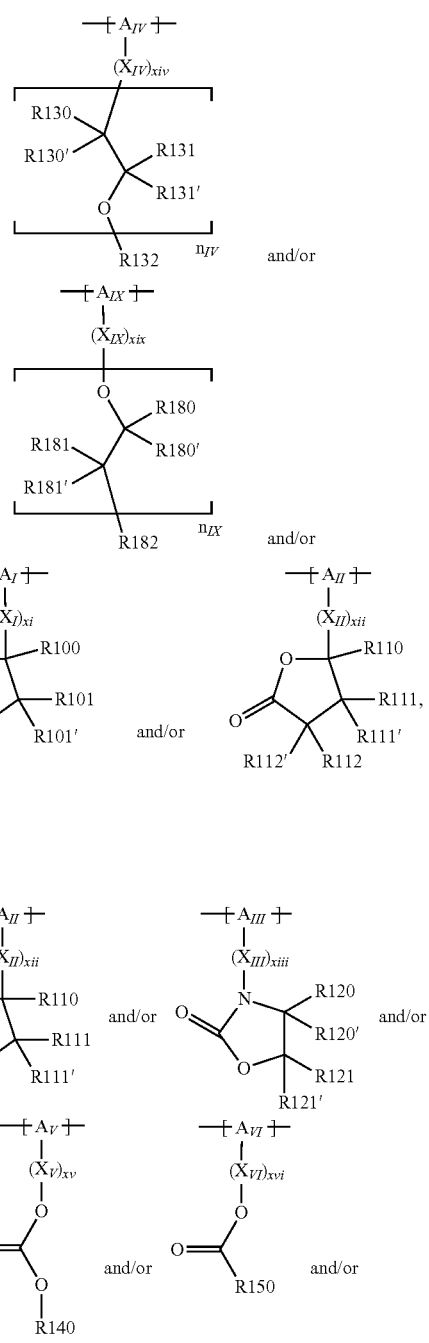

for example in particular the at least one first repeating unit, for example the repeating unit:

$$\mathrm{-\!\!+\!\!A_1\!\!+\!\!-}\\ |\\ (X_1)_{x1}\\ |\\ Q_1\ ,$$

and/or the at least one first polymer including at least one repeating unit of the above general chemical formula. The at least one second repeating unit, for example the repeating unit:

$$\mathrm{-\!\!+\!\!A_2\!\!+\!\!-}\\ |\\ (X_2)_{x2}\\ |\\ Q_2\ ,$$

may, for example, include or stand for (at least) one repeating unit of the general chemical formula:

In particular, the at least one second repeating unit, for example the repeating unit:

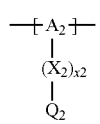

may, for example, include or stand for (at least) one repeating unit of the general chemical formula:

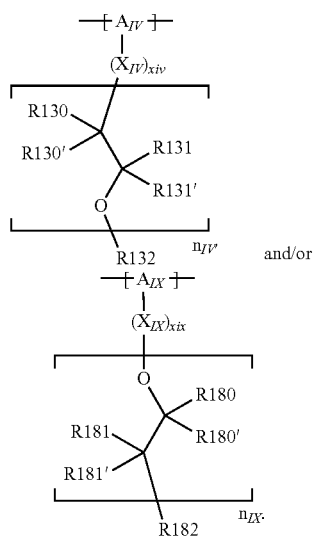

and/or

For example, the copolymer may be poly[(4-styrenesulfonyl) (trifluoromethanesulfonyl)imide].

Optionally, copolymer (P) may also include at least one third repeating unit, and/or the polymer mixture may also include at least one third polymer which in particular is different from the first polymer and the second polymer.

Within the scope of another specific embodiment, the polymer electrolyte also includes at least one conducting salt, in particular a lithium conducting salt. The ion conductivity, in particular the lithium ion conductivity, may thus optionally be further increased. Depending on the block copolymer, a small admixture of a conducting salt, in particular a lithium conducting salt, may be advantageous, despite a large transfer number, in order to reduce the glass transition temperature of the block copolymer and thus increase the overall mobility of the lithium ions in the system, which, however, may occur at the expense of a reduction of the transfer number. Ideally, in this case a conducting salt, in particular a lithium conducting salt, whose anion interacts well with group Q may be used. For example, lithium bis(trifluoromethanesulfonyl)imide (LiTFSI) may be used when there is a sulfonylimide group. The conducting salt may, for example, be a lithium conducting salt or a sodium conducting salt, in particular a lithium conducting salt. Common lithium conducting salts may be used as lithium salts. For example, the at least one lithium conducting salt may include or be lithium hexafluorophosphate ($LiPF_6$) and/or lithium bis(trifluoromethanesulfonyl)imide (LiTFSI) and/or lithium bisoxalatoborate (LiBOB) and/or trifluoromethanesulfonate (Li triflate) and/or lithium perchlorate ($LiClO_4$) and/or lithium difluorooxalatoborate (LiDFOB) and/or lithium tetrafluoroborate ($LiBF_4$) and/or lithium bromide (LiBr) and/or lithium iodide (LiI) and/or lithium chloride (LiCl). Anion $Z^-$ and the anion of the at least one lithium conducting salt may be different or identical.

Within the scope of one embodiment of this specific embodiment, the anion of the at least one conducting salt, in particular lithium conducting salt, and $Z^-$ or $Q^-$ are selected from the same anion class, for example the sulfonylimides, for example trifluoromethanesulfonylimide and/or pentafluoroethanesulfonylimide and/or fluorosulfonylimide, in particular trifluoromethanesulfonylimide. Undesirable side reactions may thus advantageously be avoided, and in particular the anion of the at least one conducting salt and $Z^-$ or $Q^-$ alkali ions, in particular lithium ions, may be strongly coordinated in a similar manner, for example identically, which may have an advantageous effect on the ion mobility.

Within the scope of one particular embodiment of this specific embodiment, the at least one conducting salt, in particular lithium conducting salt, includes counterion $Z^-$ or $Z^+$ of the polymer or polymer electrolyte, in particular of positively charged group $Q^+$ or of negatively charged group $Q^-$. For example, anion $Z^-$ may be the same as the anion of the at least one conducting salt, in particular lithium conducting salt.

The lithium salt concentration may be a function in particular of the number of oxygen atoms in the polymer or polymer electrolyte. In particular, the stoichiometric ratio of lithium ions of the at least one lithium conducting salt to oxygen atoms of the polymer or polymer electrolyte or of the polymer may be in a range of 1:2 to 1:100, in particular 1:5 or 1:10 to 1:25, for example 1:10 to 1:15. This may advantageously be an optimal range with regard to the effective mobile charge carriers and the mobility as a function of the glass [transition] temperature. The stoichiometric ratio of lithium ions of the at least one lithium conducting salt to repeating units of the polymer electrolyte or of the polymer may be in a range of 2:1 to 1:100, for example.

Within the scope of another specific embodiment, the particles are coated with an ion-conductive or ion-conducting, in particular lithium ion-conductive or lithium ion-conducting, polymer or polymer electrolyte, for example of the general chemical formula:

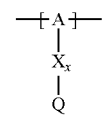

and/or with polyethylene glycol and/or polyethylene oxide. Polysulfides may thus advantageously be hindered, in a particularly effective manner, from diffusing out. A, X, x, and Q may be configured as described above. The coating may, for example, include or be formed from a polymer or polymer electrolyte described above. For example, the polymer of the coating may include at least one of the particular repeating units described above.

In addition, it is possible to increase the conductivity by admixing ionic liquids.

Within the scope of another specific embodiment, the at least one polymer electrolyte or the cathode material therefore also includes at least one ionic liquid. The mobility in the system may thus advantageously be increased, or the glass [transition] temperature reduced, and the ion conductivity, in particular the lithium ion conductivity, may thus be increased. In particular, the ionic liquid may include at least one cation selected from the group made up of pyridinium cations and/or in particular quaternary ammonium cations and/or imidazolium cations and/or piperidinium cations and/or pyrrolidinium cations and/or in particular quaternary phosphonium cations and/or guanidinium cations and/or morpholinium cations and/or uronium cations and/or thiouronium cations, and/or at least one anion selected from the group made up of trifluoromethanesulfonate (triflate) and/or tetrafluoroborate and/or bisoxalatoborate and/or hexafluorophosphate and/or bis(trifluoromethanesulfonyl)imide and/or bis(perfluoroethanesulfonyl)imide and/or bis(fluoromethanesulfonyl)imide and/or difluorooxalatoborate and/or perchlorate and/or bromide and/or iodide and/or chloride. Anion $Z^-$ and the anion of the at least one lithium conducting salt and/or the ionic liquid may be different or the same. In particular, however, anion $Z^-$ may be the same as the anion of the at least one lithium conducting salt and/or the ionic liquid. Undesirable side reactions or crystallizing out of lithium salt may thus advantageously be avoided.

In addition, it is possible to increase the conductivity by admixing nonaqueous solvents and/or components that are used in liquid electrolytes, for example carbonate-based and/or ether-based substances or solvents.

The polymer electrolyte or the cathode material may also optionally include at least one carbonate-based and/or ether-based additive, for example at least one carbonate-based and/or ether-based solvent.

Within the scope of one particular embodiment, the polymer electrolyte includes at least one repeating unit of the general chemical formula:

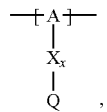

where -[A]- stands for a polymer backbone-forming unit,
X stands for a spacer, x stands for the number of spacers X and is 1 or 0, and
Q stands for a positively charged group $Q^+$ and a counterion $Z^-$, in particular where $Q^+$ stands for a group based on a cation of an ionic liquid, for example where $Q^+$ stands for a pyridinium group or an ammonium group or an imidazolium group or a piperidinium group or a pyrrolidinium group or a phosphonium group or a guanidinium group or a morpholinium group or a uronium group or a thiouronium group, and/or $Z^-$ stands for an anion, in particular a lithium conducting salt anion, or
where Q stands for a negatively charged group $Q^-$ and a counterion $Z^+$, in particular where $Q^-$ stands for a group based on a lithium conducting salt anion and/or an anion of an ionic liquid or a sulfonate group, for example where $Q^-$ stands for a sulfonylimide group and/or a sulfonate group, and/or $Z^+$ stands for an alkali ion, for example a lithium ion and/or sodium ion, in particular a lithium ion, or
where Q stands for a cyclic carbonate group or a lactone group or a cyclic carbamate group or an acyclic carbonate group or an acyclic carboxylic acid ester group or an acyclic carbamate group or an alkylene oxide group, in particular where Q stands for a cyclic carbonate group or a lactone group or a cyclic carbamate group or an acyclic carbonate group or an acyclic carboxylic acid ester group or an acyclic carbamate group, and where polymer backbone-forming unit -[A]- includes at least one polyfunctionalized siloxane unit and/or polyfunctionalized phosphazene unit and/or polyfunctionalized phenylene unit, for example a polyfunctionalized siloxane unit.

In particular, polymer backbone-forming unit -[A]- may stand for or include a polyfunctionalized polymer backbone-forming unit of the general chemical formula:

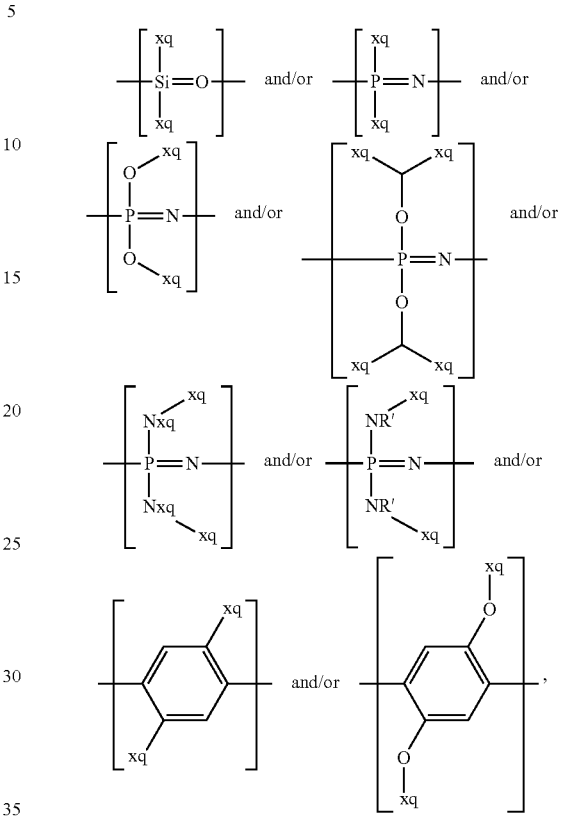

where xq in each case stands for a binding site at which a group Q, in particular $Q^+$ or $Q^-$ or Q, is bound in each case to polymer backbone-forming unit -[A]- via a spacer $X_x$, in particular where R' stands for hydrogen or an alkyl group.

Polymer backbone-forming unit -[A]- and/or spacer X and/or group Q, for example $Q^+$ or $Q^-$ or Q, and/or anion $Z^-$ and/or cation $Z^+$ may be configured as described above. For example, the at least one repeating unit may include or be (at least) one particular repeating unit described above.

Within the scope of another particular embodiment, the polymer electrolyte includes at least one copolymer (P), in particular block copolymer, for example multiblock copolymer, which includes at least one first repeating unit and at least one second repeating unit that is different from the at least one first repeating unit, the at least one first repeating unit having the general chemical formula:

where -[A]- stands for a polymer backbone-forming unit,
X stands for a spacer, x stands for the number of spacers X and is 1 or 0, and
Q stands for a positively charged group $Q^+$ and a counterion $Z^-$, in particular where $Q^+$ stands for a group based on a cation of an ionic liquid, for example where $Q^+$ stands for a pyridinium group or an ammonium group or an imidazolium group or a piperidinium group or a pyrrolidinium group or a phosphonium group or a guanidinium group or a morpholinium group or a uronium group or a thiouronium group, and/or where $Z^-$ stands for an anion, in particular a lithium conducting salt anion, in particular where spacer X includes at least one further positively charged group $Q^+$, in particular based on a cation of an ionic liquid, in particular at least one ammonium ion group and/or at least one pyridinium group and/or at least one imidazolium group and/or at least one piperidinium group and/or at least one pyrrolidinium group and/or at least one phosphonium group and/or at least one guanidinium group and/or at least one morpholinium group and/or at least one uronium group and/or at least one thiouronium group, in particular at least one ammonium group and/or at least one pyridinium group and/or at least one imidazolium group, for example at least one ammonium group and/or at least one pyridinium group, or where Q stands for a negatively charged group $Q^-$ and a counterion $Z^+$, for example an alkali ion, in particular a lithium ion, in particular where $Q^-$ stands for a group based on a lithium conducting salt anion and/or an anion of an ionic liquid or a sulfonate group, for example where $Q^-$ stands for a sulfonylimide group and/or a sulfonate group, and/or $Z^+$ stands for an alkali ion, for example a lithium ion and/or sodium ion, in particular a lithium ion, where spacer X includes at least one further negatively charged group $Q^-$, in particular based on a lithium conducting salt anion and/or an anion of an ionic liquid and/or a sulfonate group, in particular at least one sulfonylimide group and/or at least one sulfonate group.

The at least one second repeating unit may have the general chemical formula:

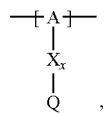

where -[A]- stands for a polymer backbone-forming unit, X stands for a spacer, x stands for the number of spacer X and is 1 or 0,
but Q stands for an uncharged group Q, for example an alkylene oxide group or a cyclic carbonate group or a lactone group or a cyclic carbamate group or an acyclic carbonate group or an acyclic carboxylic acid ester group or an acyclic carbamate group, in particular an alkylene oxide group.

Polymer backbone-forming unit -[A]- and/or spacer X and/or group Q, for example $Q^+$ or $Q^-$ or Q, and/or anion $Z^-$ and/or cation $Z^+$ may be configured as described above. For example, the at least one first and/or second repeating unit may include or be (at least) one particular repeating unit described above.

Within the scope of another specific embodiment, the at least one polymer electrolyte used as cathode material binder includes at least one repeating unit of the general chemical formula:

Polymer backbone-forming unit -[A]- and/or spacer X and/or group Q, for example $Q^+$ or $Q^-$ or Q, and/or anion $Z^-$ and/or cation $Z^+$ may be configured as described above. The at least one polymer electrolyte used as cathode material binder may be the same as or different from the at least one polymer electrolyte described above.

Related to the total weight of the cathode material, the cathode material may, for example, include ≥50% by weight to ≤90% by weight, for example ≥50% by weight to ≤80% by weight, in particular ≥60% by weight to <70% by weight, of cathode active material and ≥5% by weight to ≤30% by weight, for example ≥20% by weight to ≤30% by weight of solid electrolyte, in particular made of the at least one inorganic ion conductor and the at least one polymer electrolyte or polymer. The cathode material may also optionally include ≥5% by weight to ≤10% by weight of supplements and/or additives, for example conductivity supplements and/or additives, related to the total weight of the cathode material. For example, the solid electrolyte may include ≥50% by weight to ≤90% by weight, in particular ≥70% by weight to ≤90% by weight, of the at least one sulfidic ion conductor and ≥10% by weight to ≤50% by weight, in particular ≥10% by weight to ≤30% by weight, of the at least one in particular ion-conductive or ion-conducting polymer. For example, the cathode material may include at least one conductivity supplement and/or additive, in particular for increasing the electrical conductivity in the cathode.

Within the scope of another specific embodiment, the cathode material includes at least one, in particular electrical, conductivity supplement or conductivity additive. For example, the cathode active material may include at least one carbon modification, for example conductive carbon such as carbon black, carbon fibers, graphite, etc.

Alternatively or additionally, the cathode material may include at least one conducting salt, in particular lithium conducting salt. The cathode material may also optionally include at least one ionic liquid The cathode material may in particular be designed for a cell according to the present invention.

With regard to further technical features and advantages of the cathode material according to the present invention, explicit reference is hereby made to the explanations in conjunction with the cell according to the present invention and the battery according to the present invention, and to the figures and the description of the figures.

A further subject matter relates to an electrochemical cell, for example for an alkali metal cell, for example a lithium cell and/or sodium cell, in particular a lithium cell, in particular an alkali metal-sulfur cell, for example a lithium-sulfur cell and/or sodium-sulfur cell, in particular a lithium-sulfur cell, which includes a cathode material according to the present invention.

The cell includes in particular a cathode and an anode. The cathode includes in particular a cathode material according to the present invention.

The anode may include lithium and/or sodium, for example. In particular, the anode may include lithium. In particular, the anode may be a metallic anode and may include metallic lithium or a lithium alloy, for example. The cell may include a separator and/or a protective layer, for example an anode protective layer, in particular between the anode and the cathode.

Within the scope of one specific embodiment of the cell, the cell includes a separator and/or a protective layer, for example an anode protective layer and/or a cathode protective layer, in particular between the anode and the cathode.

Within the scope of one embodiment of this specific embodiment, the separator and/or the protective layer, for example the anode protective layer and/or cathode protective layer, include(s) a block copolymer. The block copolymer may be a diblock copolymer or triblock copolymer, for example. In particular, the separator and/or the protective layer, for example the anode protective layer, may be made of the block copolymer, in particular the diblock copolymer or triblock copolymer. The block copolymer may in particular include an ionically conductive phase and a mechanically stable phase which are chemically joined together and which form a bicontinuous network by self-organization. The cathode material according to the present invention, for example based on a sulfur-polymer composite with sulfur that is bound, for example covalently and/or ionically, in particular ionically, to the polymer of the composite, for example based on a sulfur-polyacrylonitrile composite, for example SPAN, may be used with these types of block copolymers in a particularly advantageous manner, since the use of low-molecular ether compounds or ether solvents, which, for example, could otherwise swell block copolymers and convert them into a polymer gel, may be dispensed with, and swelling of the block copolymer of the separator and/or the protective layer, for example the anode protective layer, may thus be prevented, and their functionality may be ensured.

Within the scope of one particular embodiment of this specific embodiment, the separator and/or the protective layer, for example the anode protective layer and/or the cathode protective layer, include(s) at least one polystyrene-polyalkylene oxide block copolymer, in particular polystyrene-polyethylene oxide block copolymer, for example poly(styrene-b-ethylene oxide), in particular having a molar mass of the blocks of ≥5,000 Dalton, for example having a total molar mass of ≥150,000 Dalton, in particular having a total molar mass of ≥350,000 Dalton. In particular, the separator and/or the protective layer may be made of the polystyrene-polyalkylene oxide block copolymer, in particular polystyrene-polyethylene oxide block copolymer, for example poly(styrene-b-ethylene oxide), in particular having a molar mass of the blocks of ≥5,000 Dalton, for example having a total molar mass of ≥150,000 Dalton, in particular having a total molar mass of ≥350,000 Dalton. However, the separator and/or the protective layer, for example the anode protective layer and/or the cathode protective layer, may also include or be made of a block copolymer, for example a triblock copolymer, which includes at least one polystyrene component and at least one polyethylene oxide component and at least one further polymer component, for example a polyisoprene component. Polystyrene-polyethylene oxide block copolymers may advantageously have an ionic conductivity of $>10^{-5}$ S/cm at operating temperatures of electrochemical cells, in particular lithium-sulfur cells.

Within the scope of another, alternative or additional, particular embodiment of this specific embodiment, the separator and/or the protective layer, for example the anode protective layer and/or the cathode protective layer, include(s) at least one polyacrylate-polyalkylene oxide block copolymer, in particular polyacrylate-polyethylene oxide block copolymer, for example poly(acrylate-ethylene oxide), in particular having a molar mass of the blocks of ≥5,000 Dalton, for example having a total molar mass of ≥150,000 Dalton, in particular having a total molar mass of ≥350,000 Dalton. In particular, the separator and/or the protective layer may be made of the polyacrylate-polyalkylene oxide block copolymer, in particular polyacrylate-polyethylene oxide block copolymer, for example poly(acrylate-ethylene oxide), in particular having a molar mass of the blocks of ≥5,000 Dalton, for example having a total molar mass of ≥150,000 Dalton, in particular having a total molar mass of ≥350,000 Dalton. However, the separator and/or the protective layer, for example the anode protective layer and/or the cathode protective layer, may also include or be made of a block copolymer, for example a triblock copolymer, which includes at least one polyacrylate component and at least one polyethylene oxide component and at least one further polymer component, for example a polyisoprene component. Polystyrene-polyethylene oxide block copolymers may likewise advantageously have a high conductivity of $≥10^{-5}$ S/cm at operating temperatures of electrochemical cells, in particular lithium-sulfur cells.

Within the scope of another, alternative or additional, particular embodiment of this specific embodiment, the separator and/or the protective layer, for example the anode protective layer and/or the cathode protective layer, include(s) at least one polymer, for example in the form of a block copolymer, which includes at least one repeating unit of the general chemical formula:

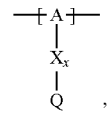

where -[A]- stands for a polymer backbone-forming unit, X stands for a spacer, x stands for the number of spacers X and is 1 or 0, and Q stands for a positively charged group $Q^+$ and a counterion $Z^-$, or Q stands for a negatively charged group $Q^-$ and a counterion $Z^+$, or Q stands for an uncharged group Q, in particular a cyclic carbonate group or a lactone group or a cyclic carbamate group or an acyclic carbonate group or an acyclic carboxylic acid ester group or an acyclic carbamate group or an alkylene oxide group.

Polymer backbone-forming unit -[A]- and/or spacer X and/or group Q, for example $Q^+$ or $Q^-$ or Q, and/or anion $Z^-$ and/or cation $Z^+$ may be configured as described above. For example, the at least one repeating unit may include or be (at least) one particular repeating unit described above.

For example, the cathode may include a cathode current collector. The cathode current collector may be made of aluminum or carbon, for example. The cathode current collector may optionally be provided with a coating for improving the adhesion and/or the electrical contacting and/or the chemical stability and/or the corrosion stability. The coating may, for example, be a polymer layer, in particular a carbon modification polymer layer, optionally containing one or multiple additives such as adhesion promoters, corrosion protection additives, etc. For example, the coating may include a polymer electrolyte according to the present invention and/or may be a protective layer according to the present invention, in particular a cathode protective layer and/or anode protective layer.

The cathode may be produced, for example, by mixing cathode components in a dissolver, for example, with at least one solvent to form a slurry, and thus coating a substrate, for example a film, for example an aluminum film, in particular a film coated with a carbon modification, for example aluminum film. The coating may take place via doctoring. The coating may be subsequently dried and/or calandered. This may take place in particular in such a way that the porosity is minimized.

Alternatively, the cathode may be produced by dry coating, i.e., solvent-free coating.

With regard to further technical features and advantages of the cell according to the present invention, explicit reference is hereby made to cathode material according to the present invention and the battery according to the present invention, and to the figures and the description of the figures.

Moreover, the present invention relates to an alkali metal battery, for example a lithium battery and/or sodium battery, for example a lithium battery, in particular an alkali metal-sulfur battery, for example a lithium-sulfur battery and/or sodium-sulfur battery, in particular a lithium-sulfur battery, which includes one or multiple cells according to the present invention.

With regard to further technical features and advantages of the battery according to the present invention, explicit reference is hereby made to the cathode material according to the present invention and the cell according to the present invention, and to the figures and the description of the figures.

Further advantages and advantageous embodiments of the subject matter according to the present invention are elucidated by the drawing and explained in the following description. It is pointed out that the drawing is only descriptive in nature, and is not intended to limit the present invention in any way.

BRIEF DESCRIPTION OF THE DRAWINGS

FIG. 1c shows a perspective view of FIG. 1a.

DETAILED DESCRIPTION

Figure 1A:
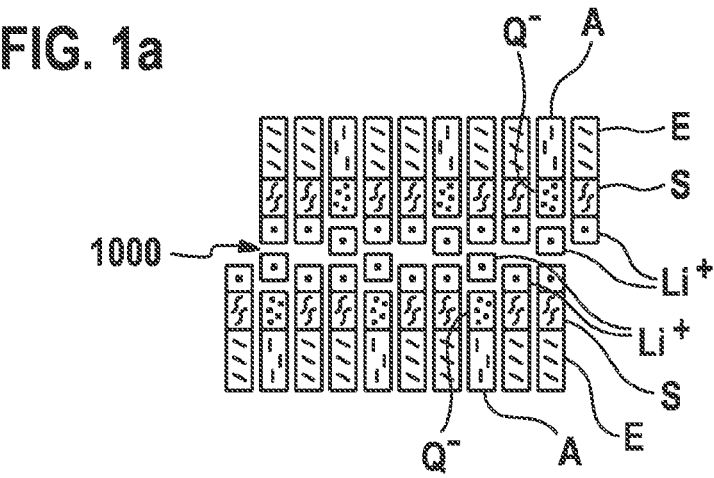
FIG. 1a, 1b show schematic cross sections for illustrating lithium ion-conducting channels and/or planes in specific embodiments of the cathode material according to the present invention.
Figure 1B:
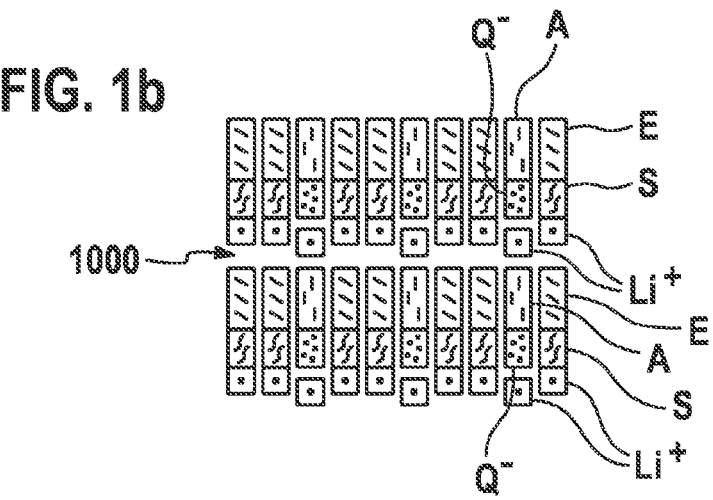
Figure 1C:
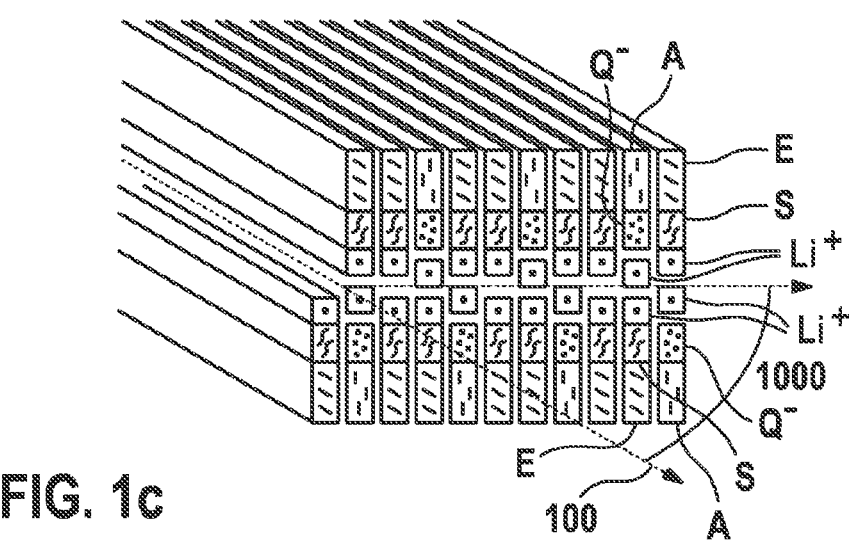

Within the scope of the specific embodiments shown in FIGS. 1a through 1c, the at least one cathode active material ES is provided in the form of a polymer E containing covalently bound sulfur S. The at least one polymer electrolyte AQLi includes a polymer backbone-forming unit A, a negatively charged group Q covalently bound thereto, and lithium ions $Li^+$ as counterion.

FIGS. 1a through 1c illustrate that during discharge of the cell, lithium ions $Li^+$ are ionically bound to the sulfur S, which is bound in particular covalently to polymer E.

FIGS. 1a through 1c illustrate that polymer E containing covalently bound sulfur, and the at least one polymer electrolyte AQLi form lithium ion-conductive or lithium ion-conducting channels 100 and/or planes 1000 at the molecular level. Lithium ion-conductive or lithium ion-conducting channels 100 and/or planes 1000 are formed in particular by polar areas SLi of polymer E with sulfur S that is bound, in particular covalently, and polar areas QLi of the least one polymer electrolyte AQLi. These channels 100 and/or planes 1000 may, for example, extend continuously through particles 11 shown in FIG. 3, and in particular up to the outer surface of these particles 11.

FIGS. 1a through 1c illustrate that lithium ion-conductive or lithium ion-conducting channels 100 and/or planes 1000 accommodate sulfur S which is bound, in particular covalently, to polymer E, and polysulfides (not illustrated) that are optionally formed therefrom during discharge of the cell, as well as lithium ions Li and negatively charged groups $Q^-$ of the at least one polymer electrolyte AQLi.

FIGS. 1a through 1c illustrate that lithium ion-conductive or lithium ion-conducting channels 100 and/or planes 1000 extend between polymer E containing covalently bound sulfur S and the at least one polymer electrolyte AQLi, and between polymer sections of polymer E containing covalently bound sulfur S. In particular, channels 100 and/or planes 1000 extend between repeating units of polymer E containing covalently bound sulfur S and repeating units of the at least one polymer electrolyte AQLi, and between repeating units of different polymer sections of polymer E containing covalently bound sulfur. Lithium ion-conductive or lithium ion-conducting channels 100 and/or planes 1000 are formed in particular in a zone at a phase boundary between polymer E containing covalently bound sulfur S and the at least one polymer electrolyte AQLi, and in a zone between polymer sections of polymer E containing covalently bound sulfur S.

FIGS. 1a through 1c also illustrate that polymer backbone E of polymer E containing covalently bound sulfur S, and polymer backbone A of the at least one polymer electrolyte AQLi form a structural plane.

FIGS. 1a through 1c show that polymer E containing covalently bound sulfur S and the at least one polymer electrolyte AQLi form a lamellar arrangement. A lithium ion-conductive or lithium ion-conducting lamellar domain 100, 1000 is thus formed in particular by polar areas SLi of polymer E containing covalently bound sulfur S, and polar areas QLi of the at least one polymer electrolyte AQLi, whereby polymer backbone E of polymer E containing covalently bound sulfur S, and polymer backbone A of the at least one polymer electrolyte AQLi form a structural lamellar domain. Lithium ion-conductive or lithium ion-conducting lamellar domains 100, 1000 are formed in particular between structural lamellar domains EA, so that channels 100 and/or planes 1000 extend between adjacent lamellar structural domains AE.

FIGS. 1a through 1c also illustrate that polymer E containing covalently bound sulfur S, and the at least one polymer electrolyte AQLi are mixed at the molecular level, in particular also within the lamellar domains. Polymer E containing covalently bound sulfur S and the at least one polymer electrolyte AQLi may in particular form a bicontinuous network.

FIG. 1a illustrates that within the scope of one specific embodiment, polar areas SLi, QLi of two identical, adjacent structural lamellar domains EA, in particular upper and lower polar areas SLi, QLi, face one another and interact with one another or adhere to one another, and may form a single lithium ion-conductive or lithium ion-conducting lamellar domain 1000.

FIG. 1b illustrates that within the scope of another specific embodiment, in each case only polar areas SLi, QLi that are connected to one of the two structural lamellar domains EA form a lithium ion-conductive or lithium ion-conducting lamellar domain 1000 between two adjacent structural lamellar domains EA.

FIG. 1c depicts a perspective view of FIG. 1a, and shows that channels 100 extend in particular along polymer backbone E of polymer E containing covalently bound sulfur S, and the at least one polymer electrolyte AQLi, and due to the lamellar arrangement, in particular a large lithium ion-conducting plane 1000 having a lithium ion conductivity is formed which is lithium ion-conducting in two spatial directions.

Figure 2:
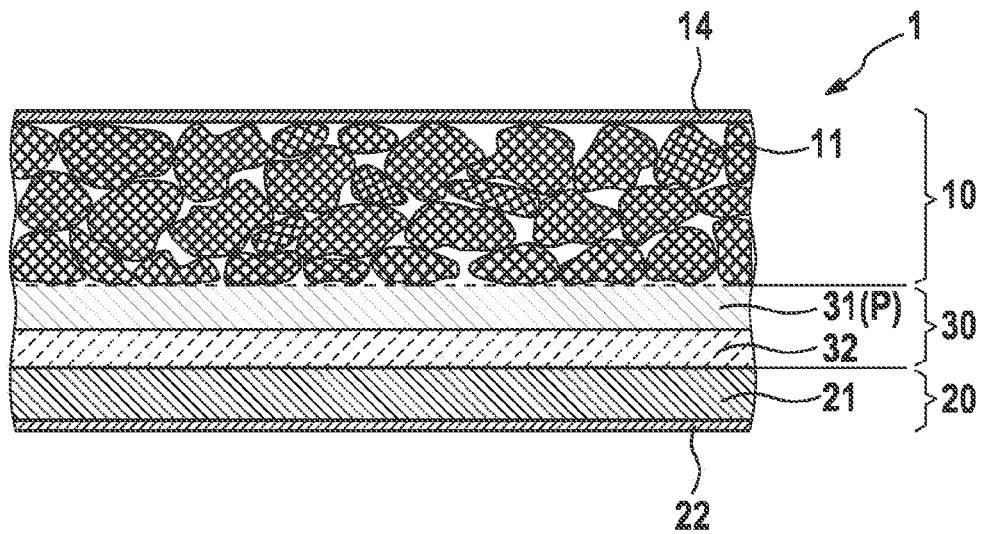
FIG. 2 shows a schematic cross section of one specific embodiment of a cell according to the present invention.

FIG. 2 shows a lithium-sulfur cell 1 which includes a cathode 10, an anode 20, and an area 30 between cathode 10 and anode 20.

FIG. 2 illustrates that cathode 10 includes a particulate cathode active material 11. Particles 11 include at least one sulfur-containing cathode active material and at least one lithium ion-conducting or lithium ion-conductive polymer electrolyte, and/or at least one inorganic ion conductor (not illustrated in detail in FIG. 2). The at least one cathode active material may include in particular a polymer containing in particular covalently bound sulfur. For example, the polymer of the at least one cathode active material may be produced by sulfidation of a polymer, in particular polyacrylonitrile. For example, the at least one cathode active material may for example be a sulfur-carbon composite, in particular a sulfur-polyacrylonitrile composite, for example SPAN. As explained in greater detail in conjunction with FIGS. 1a through 1c, the at least one cathode active material, in particular the polymer containing in particular covalently bound sulfur, and the at least one polymer electrolyte and/or the at least one inorganic ion conductor may form lithium ion-conductive or lithium ion-conducting channels and/or in particular lithium ion-conductive or lithium ion-conducting planes, in particular at the molecular level (not illustrated in detail in FIG. 2; see FIGS. 1a through 1c).

FIG. 2 shows that cell 1 also includes a cathode current collector 14. Cathode current collector 14 may be made of aluminum, for example, and used in particular for electrical contacting and also as a support.

FIG. 2 illustrates that particles 11 are directly joined, for example pressed, together. Since particles 11 themselves are ion-conducting, the ion conduction may advantageously take place directly from particle 11 to particle 11. This advantageously allows the quantity of polymer electrolyte used as cathode material binder to be significantly reduced, or even for a polymer electrolyte used as cathode material binder to be dispensed with. Within the scope of the specific embodiment shown in FIG. 2, cathode material 10 is therefore free from polymer electrolyte that is used as cathode material binder.

FIG. 2 also shows that anode 20 includes an anode active material 21, for example metallic lithium or a lithium alloy, and an anode current collector 22 made of copper, for example.

Figure 3:
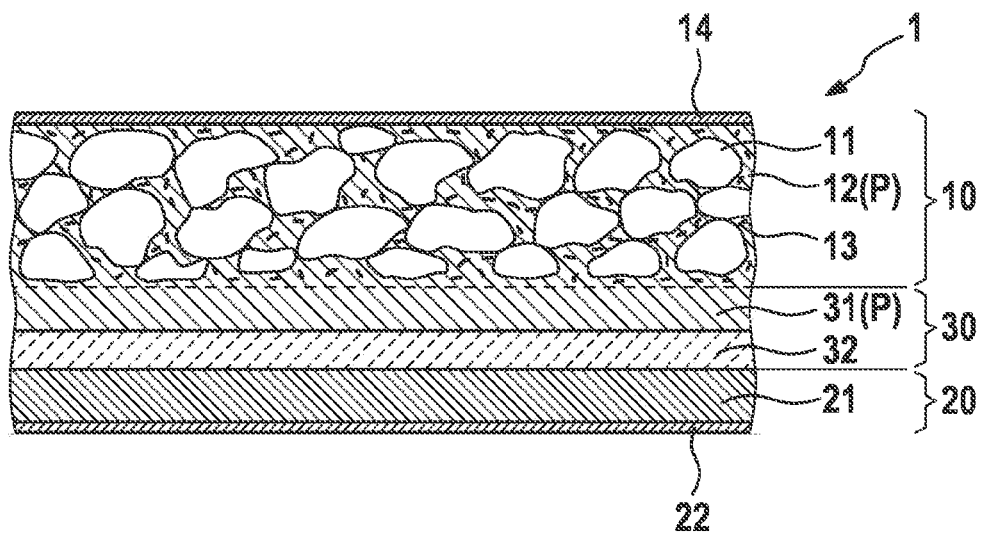
FIG. 3 shows a schematic cross section of another specific embodiment of a cell according to the present invention.

FIG. 2 illustrates that between 30 cathode 10 and anode 20, a layer 31 (P) made of a block copolymer is formed which is used as a separator and/or protective layer. FIG. 3 shows that an anode protective layer 32, for example made of an inorganic, for example ceramic and/or vitreous, material may additionally be provided which is used, for example, as a barrier layer against dendrite growth. However, layer 31 (P) may optionally also be used as the sole layer between anode 20 and cathode 10, which replaces anode protective layer 32 (not illustrated).

The specific embodiment shown in FIG. 3 differs from the specific embodiment shown in FIG. 2 essentially in that particles 11 are incorporated and/or embedded in at least one polymer electrolyte 12 (P), which in particular is used as cathode material binder, or in a solid electrolyte 12 (P). The at least one polymer electrolyte of particles 11, and polymer electrolyte 12 (P) which in particular is used as cathode material binder, may be the same or different.

FIG. 3 illustrates that in addition, particulate cathode material 10 is blended with a particulate, in particular electrical, conductivity additive 13, for example a carbon modification, which is likewise connected, for example elastically, to particles 11 of the cathode active material and to cathode current collector 14 with the aid of polymer electrolyte 12 (P), which is used as a binder 12.

What is claimed is:

1. A cathode material for an alkali metal-sulfur cell or a lithium-sulfur cell, comprising:
   at least one cathode active material, wherein the at least one cathode active material includes a polymer containing covalently bound sulfur;
   at least one lithium ion-conducting or lithium ion-conductive polymer electrolyte and/or at least one inorganic ion conductor; and
   (a) at least one metal sulfide, wherein the at least one metal sulfide is one of (i) at least one transition metal sulfide, or (ii) at least one metal sulfide of at least one metal of the third, fourth, and/or fifth main group; and/or (b) at least one electrically conductive metal compound, wherein the at least one electrically conductive metal compound is one of (i) at least one electrically conducting metal oxide or (ii) at least one electrically conducting metal carbide,
   wherein the at least one metal sulfide includes electrochemically active sulfur, contains more than one sulfur atom for each metal atom, or contains more than one metal atom for each sulfur atom.

2. The cathode material of claim 1, wherein the at least one transition metal sulfide and/or the at least one metal sulfide of at least one metal of the third, fourth, and/or fifth main group is contained or incorporated, in the at least one cathode active material, in the polymer containing covalently bound sulfur.

3. An alkali metal-sulfur cell or a lithium-sulfur cell, comprising:
   a cathode material, including:
      at least one cathode active material;
      at least one lithium ion-conducting or lithium ion-conductive polymer electrolyte and/or at least one inorganic ion conductor;
         wherein the at least one cathode active material includes a polymer containing covalently bound sulfur, and
         wherein the polymer containing covalently bound sulfur, and the at least one polymer electrolyte and/or the at least one inorganic ion conductor form ion-conductive or ion-conducting channels that extend along a polymer backbone of the polymer containing covalently bound sulfur and/or of the at least one polymer electrolyte;
   a cathode;
   an anode; and
   a separator and/or a protective layer between the cathode and the anode,
   wherein the separator and/or the protective layer includes
      at least one polystyrene-polyethylene oxide block copolymer that includes at least one polystyrene component, at least one polyethylene oxide component, and at least one polyisoprene component,
      at least one polyacrylate-polyethylene oxide block copolymer that includes at least one polyacrylate component, at least one polyethylene oxide component, and at least one polyisoprene component, and at least one polymer electrolyte, which includes at least one repeating unit of the general chemical formula:

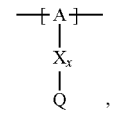

wherein:
-[A]- stands for a polymer backbone-forming unit,
X stands for a spacer,
x stands for the number of spacers X and is 1 or 0, and
Q stands for a positively charged group $Q^+$ and a counterion $Z^-$, or Q stands for a negatively charged group Q and a counterion $Z^+$, or Q stands for an uncharged group.

* * * * *